US012367311B2

(12) United States Patent
Zhou et al.

(10) Patent No.: US 12,367,311 B2
(45) Date of Patent: Jul. 22, 2025

(54) LEVERAGING QUESTION AND ANSWER PAIR EXTRACTION FROM LINKED DOCUMENTS TO IMPROVE PERMISSIONS-AWARE AUTOMATED RESPONSES

(71) Applicant: Glean Technologies, Inc., Palo Alto, CA (US)

(72) Inventors: Eddie Zhou, Palo Alto, CA (US); Mrinal Mohit, San Francisco, CA (US); Calvin Qi, Redwood City, CA (US); Sumeet Sobti, Fremont, CA (US); Sharvanath Pathak, Sunnyvale, CA (US); Debarghya Das, Mountain View, CA (US); Arvind Jain, Los Altos, CA (US); Piyush Prahladka, Los Altos, CA (US)

(73) Assignee: Glean Technologies, Inc., Palo Alto, CA (US)

( * ) Notice: Subject to any disclaimer, the term of this patent is extended or adjusted under 35 U.S.C. 154(b) by 0 days.

(21) Appl. No.: 18/759,162

(22) Filed: Jun. 28, 2024

(65) Prior Publication Data
US 2024/0354438 A1 Oct. 24, 2024

Related U.S. Application Data

(63) Continuation of application No. 17/489,787, filed on Sep. 30, 2021, now Pat. No. 12,050,712.

(51) Int. Cl.
*G06F 21/62* (2013.01)
*G06F 16/31* (2019.01)
(Continued)

(52) U.S. Cl.
CPC .......... *G06F 21/6227* (2013.01); *G06F 16/31* (2019.01); *G06F 16/383* (2019.01);
(Continued)

(58) Field of Classification Search
CPC .... G06F 21/6227; G06F 16/31; G06F 16/383; G06F 2221/2135; G06F 2221/2141; G06F 21/6218; G06N 5/04; G06N 3/04
See application file for complete search history.

(56) References Cited

U.S. PATENT DOCUMENTS

| 9,767,094 | B1 * | 9/2017 | Beller | G06F 40/30 |
| 2019/0260694 | A1 * | 8/2019 | Londhe | H04L 51/216 |
| 2021/0397634 | A1 * | 12/2021 | Gerber, Jr. | G06F 16/313 |

* cited by examiner

*Primary Examiner* — El Hadji M Sall

(57) ABSTRACT

Methods and apparatuses for providing a real-time enterprise knowledge assistant that automatically responds to user comments and questions via a graphical user interface are described. The enterprise knowledge assistant may display automated responses to questions provided by users within a persistent chat channel (or other communications channel). The information displayed or referenced (e.g., via a linked electronic document) within an automated response to a user's factual question may be determined based on access rights to linked documents and the number of electronic interactions between users, such as the number of times that users co-edited or collaborated on documents (e.g., programming code). Upon detection that at least a portion of a user's message within a chat channel has been classified as a factual question, the enterprise knowledge assistant may access question and answer pairings stored within a frequently asked questions database and display an authorized answer.

20 Claims, 30 Drawing Sheets

(51) Int. Cl.
*G06F 16/383* (2019.01)
*G06N 5/04* (2023.01)

(52) U.S. Cl.
CPC ....... *G06N 5/04* (2013.01); *G06F 2221/2135* (2013.01); *G06F 2221/2141* (2013.01)

| Semantically Equivalent Questions | Ranked Potential Answers |
|---|---|
| "Where is the search commands document for Phoenix" 732 Group: Phoenix | Document "Phoenix Design document" at location Sdrive/docs/ phoenix-design.docx 722 |

| Semantically Equivalent Questions | Ranked Potential Answers |
|---|---|
| "Where is the search commands document for Phoenix" ~732<br>Group: Phoenix | Document "Phoenix Design document" at location Sdrive/docs/phoenix-design.docx ~722 |
| "Where to find the list of search commands [for Phoenix]" ~734<br>Group: Phoenix | Document "search-commands.docx" at location Sdrive/docs/search-commands.docx ~724 |

FIG. 7C

| Semantically Equivalent Questions | Ranked Potential Answers |
|---|---|
| "Where is the search commands document for Phoenix" ~732<br>Group: Phoenix | Document "Phoenix Design document" at location Sdrive/docs/phoenix-design.docx ~722 |
|  | Document "search-commands.docx" at location Sdrive/docs/search-commands.docx ~724 |
|  | Document "some-commands.docx" at location Sdrive/docs/some-commands.docx ~726 |

FIG. 7D

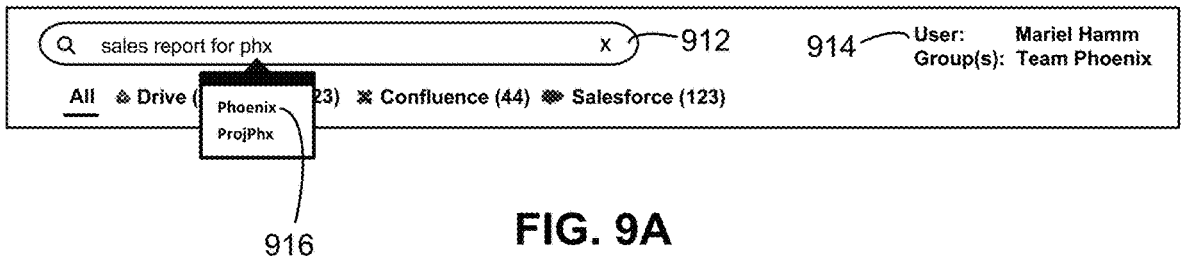

FIG. 9A

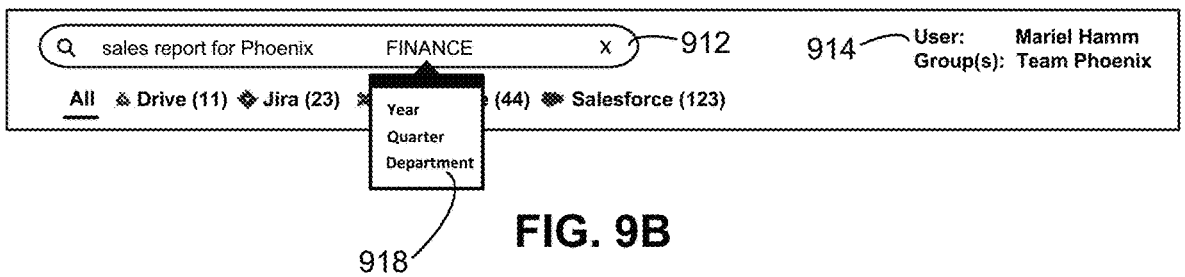

FIG. 9B

First Sentence

Document pinning is also available with Project Phoenix.

First Sentence with Term Masking  ⎰—902

Document pinning is also available with Project [masked term].

Phoenix = 85%
PHX = 10%
Winslow = 2%

FIG. 9C

Second Sentence

Yes, PHX allows document pins to be specified by authorized users.

904—

Second Sentence with Term Masking

Yes, [masked term] allows document pins to be specified by authorized users.

PHX = 80%
Phoenix = 10%
ProjPHX = 7%

FIG. 9D

LEVERAGING QUESTION AND ANSWER PAIR EXTRACTION FROM LINKED DOCUMENTS TO IMPROVE PERMISSIONS-AWARE AUTOMATED RESPONSES

CLAIM OF PRIORITY

This application claims the benefit of and priority to U.S. patent application Ser. No. 17/489,787, entitled "Enterprise Knowledge Assistant with Permissions-Aware Automated Responses," filed Sep. 30, 2021, which is herein incorporated by reference in its entirety.

BACKGROUND

Individuals associated with an enterprise (e.g., a company or business entity) may have restricted access to electronic documents and other sources of data that are stored across various repositories and data stores, such as enterprise databases and cloud-based data storage services. The data may comprise unstructured data or structured data (e.g., the data may be stored within a relational database). A search engine may allow the data to be indexed, searched, and displayed to authorized users that have permission to access or view the data. A user of the search engine may provide a textual search query to the search engine and in return the search engine may display the most relevant search results for the search query as links to electronic documents, web pages, images, videos, and other digital content. To determine the most relevant search results, the search engine may search for relevant information within a search index for the data and then score and rank the relevant information. In some cases, an electronic document indexed by the search engine may have an associated access control list (ACL) that includes access control entries that identify the access rights that the user has to the electronic document. The most relevant search results for the search query that are displayed to the user may comprise links to electronic documents and other digital content that the user is authorized to access in accordance with access control lists for the underlying electronic documents and other digital content.

BRIEF DESCRIPTION OF THE DRAWINGS

Like-numbered elements may refer to common components in the different figures.

FIG. 7A depicts one embodiment of an enterprise social graph.

FIGS. 7B-7D depict embodiments of question and answer pairs stored within a database.

FIG. 9A depicts one embodiment of a portion of a user interface that automatically displays suggested word substitutions for search terms in order to improve the quality of search results.

FIG. 9B depicts one embodiment of a portion of a user interface that allows structured queries with search operators for custom fields associated with preliminary non-displayed search result documents.

FIG. 9C depicts one embodiment of a first term within a first sentence being masked so that a language model can be used to generate a set of term replacements and their corresponding probabilities as the correct term replacement.

FIG. 9D depicts one embodiment of a second term within a second sentence being masked so that the language model can be used to generate a second set of term replacements and their corresponding probabilities as the correct term replacement.

DETAILED DESCRIPTION

Figure 1:
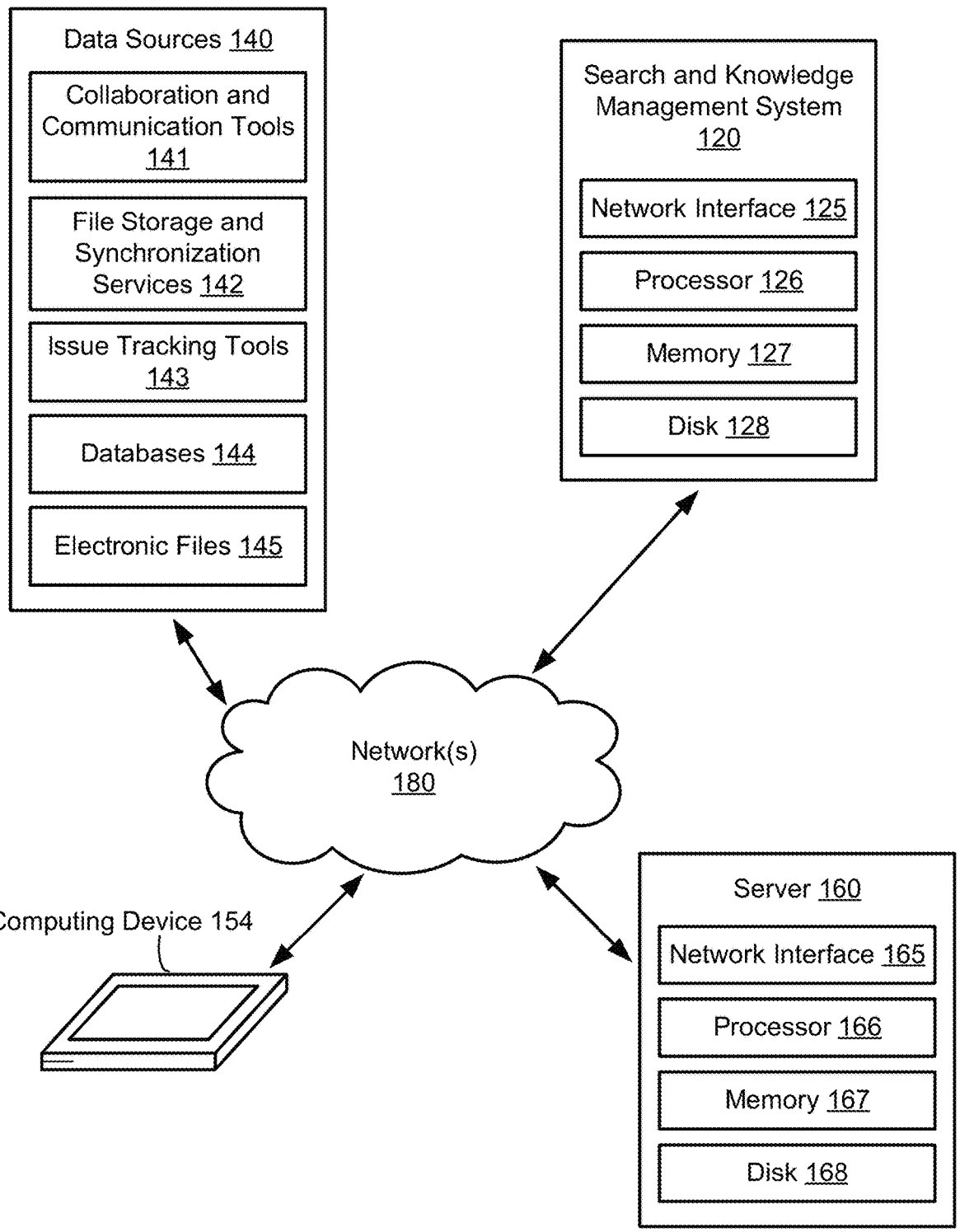
FIG. 1 depicts one embodiment of a networked computing environment.

Technology is described for providing a permissions-aware search and knowledge management system that includes a real-time enterprise knowledge assistant that automatically responds to user comments and questions via a graphical user interface. The enterprise knowledge assistant may display automated responses to questions asked by users within a persistent chat channel. The information displayed or referenced (e.g., via reference to a linked electronic document) within an automated response to a user question may be determined based on access rights to linked documents and the number of electronic interactions between users of the permissions-aware search and knowledge management system. The electronic interactions between users may include co-editing of documents (e.g., programming code), wikis, and support tickets. The electronic interactions between users may also include the number of question and answer interactions between users within the persistent chat channel. The enterprise knowledge assistant may automatically identify and update question and answer pairings within a frequently asked questions database based on messaging exchanges within the persistent chat channel. Upon detection that at least a portion of a user's message within a chat channel has been classified as a factual question, the enterprise knowledge assistant may access the question and answer pairings stored within the frequently asked questions database and display an authorized answer that includes a link to a document that the user has authority to access.

In some embodiments, the enterprise knowledge assistant may attach to a chat channel and utilize machine learning and natural language processing (NLP) techniques to automatically identify the presence of factual questions within user messages and display suggested answers to those factual questions including pointers or links to relevant content (e.g., to electronic documents) based on content that is accessible by users within the chat channel. In one embodiment, the enterprise knowledge assistant may identify a first question within the chat channel and in response display a first answer referencing a first document to a first user within the chat channel and display a second answer referencing a second document different from the first document to a second user within the chat channel. The first document may comprise the highest ranking answer to the first question that is viewable or accessible by the first user. The second document may comprise the highest ranking answer to the first question that is viewable or accessible by the second user. Within the frequently asked questions database, a question may map to or pair with one or more answers. Each answer may comprise a document and/or text. Each answer may be assigned access rights, which may be specified using a list of users or groups of users that have permission to view the answer. The access rights may correspond with the file permissions for a linked document. Each answer may be assigned a user identifier associated with the user who provided the answer. If two or more answers have been mapped to a common question within the frequently asked questions database, then the two or more answers may be ranked based on the age of the answer (e.g., time stamps may be stored with each answer and newer answers may be boosted over older answers) and the number of electronic interactions between the user asking the question and another user corresponding with the user identifier for the individual who provided the answer (e.g., a larger number of electronic interactions between the user asking a question and the other user who provided the answer may boost the ranking of the answer).

In some embodiments, the enterprise knowledge assistant may acquire text with potential answers from various sources, such as messaging applications, chat channels, and/or documents that have been identified as sources of answers (e.g., an HR questions and answers document). The documents may comprise non-chat documents (e.g., word processing documents and static web pages) that are scanned or searched by the enterprise knowledge assistant to identify question and answer pairs, along with surrounding context that is located close to the answer (e.g., the existence of names or user identifiers located within one or two sentences of the answer). The surrounding context may comprise personal names, email addresses, and project names related to the answer that are located within a threshold number of words from the answer text (e.g., within fifty words before the answer text or within fifty words after the answer text). The question and answer pairs extracted from the scanned documents along with any surrounding context may be stored within the frequently asked questions database and used to display suggested answers as responses to user questions along with the surrounding context. In some cases, a user may explicitly request that the enterprise knowledge assistant provide an automated response to their question, such as question 626 in FIG. 6B, and in response the enterprise knowledge assistant may identify an extracted question and answer pair from the frequently asked questions database, display the answer for the question and answer pair, and display any surrounding context for the answer if the user's question is classified as being semantically equivalent to an extracted question stored within the frequently asked questions database.

Over time, the enterprise knowledge assistant may identify and store question and answer pairs within a frequently asked questions (FAQ) database. The question and answer pairs may be automatically added to (e.g., if a question is deemed answered within the chat channel or a question and answer pair is identified within a non-chat document), classified (e.g., as a finance or engineering related question or as belonging to a particular group within an enterprise), or removed from the FAQ database. In one example, a question and answer pair may be automatically removed from the FAQ database if the question and answer pair has aged at least a threshold amount of time (e.g., is older than six months) without the answer being automatically displayed in response to the question being asked within a chat channel or if a threshold number of users provided feedback that the answer was not the correct answer (e.g., at least two users provided a thumbs down or negative review of the answer provided by the enterprise knowledge assistant).

The permissions-aware search and knowledge management system may automatically generate and store question and answer pairs within the FAQ database upon detection that a messaging exchange within a communication channel has involved a question that is both factual (e.g., was classified as not an opinion question using machine learning techniques) and unlikely to become stale quickly (e.g., that the answer does not contain keywords associated with an answer that is only valid for today or tomorrow). In one example, each question of a set of training questions may be labeled as either an opinion question or a factual question and a machine learning model or an NLP model may be trained using the labeled set of training questions to automatically classify questions as either opinion questions or factual questions. Upon detection of a potential question and answer pair to be added to the FAQ database, the permissions-aware search and knowledge management system may determine whether the potential question to be added is semantically equivalent to another question already stored within the FAQ database. In some cases, if the potential question is deemed to be semantically equivalent to another question already stored within the FAQ database, then the identified potential answer is checked for semantic equivalence with the answer to the already stored question. In the case that the potential answer comprises an electronic document or a link to the electronic document, then the electronic document may be compared with the document corresponding with the answer to the already stored question. In some embodiments, if the potential question is deemed to be semantically equivalent to another question already stored within the FAQ database, but the answers to the two questions are not semantically equivalent or comprise two different electronic documents, then the permissions-aware search and knowledge management system may add the identified potential answer as a conflicting answer.

Prior to automatically displaying an answer to a question asked within a communication channel, conflicting answers may be ranked based on the most popular answer provided overall for the question and/or the number of subject matter experts that provided positive feedback for a particular answer to the question. In some cases, if there is not a clear winner for the appropriate answer, then the permissions-aware search and knowledge management system may request resolution from a subject matter expert (e.g., from someone in the finance department for a finance related question) based on a group classification for the question. The FAQ database may also include question and answer pairs that were directly created or verified by subject matter experts and labeled with expiration dates as to when the question and answer pairs should be removed from the FAQ database.

In some embodiments, an automated search intent classification may be performed on a search query (e.g., entered into a search bar or as a question in a chat channel) that applies NLP techniques to identify whether the search query is more navigational (e.g., a user is looking for a known document) or informational (e.g., the user is looking for the answer to a question). The amount of information displayed with the search results may vary depending on whether the query is deemed navigational or informational. In one example, if the search query is classified as being navigational, then the number of search results displayed and the amount of information provided with each search result may be reduced (e.g., cut in half). If the search query is instead identified as an informational question that is not already in the FAQ database and the number of search results scrolled through by a user exceeds a threshold number (e.g., more than ten search results), then a suggested subject expert and contact information may be identified and displayed. If the subject matter expert verifies the answer to a question within the FAQ database, then that question and answer pair may be automatically selected as a user suggested result for the search query.

The permissions-aware search and knowledge management system may enable digital content (or content) stored across a variety of local and cloud-based data stores to be indexed, searched, and displayed to authorized users. The searchable content may comprise data or text embedded within electronic documents, hypertext documents, text documents, web pages, electronic messages, instant messages, database fields, digital images, and wikis. An enterprise or organization may restrict access to the digital content over time by dynamically restricting access to different sets of data to different groups of people using access control lists (ACLs) or authorization lists that specify which users or groups of users of the permissions-aware search and knowledge management system may access, view, or alter particular sets of data. A user of the permissions-aware search and knowledge management system may be identified via a unique username or a unique alphanumeric identifier. In some cases, an email address or a hash of the email address for the user may be used as the primary identifier for the user. To determine whether a user executing a search query has sufficient access rights to view particular search results, the permissions-aware search and knowledge management system may determine the access rights via ACLs for sets of data (e.g., for multiple electronic documents) underlying the particular search results at the time that the search is executed by the user or prior to the display of the particular search results to the user (e.g., the access rights may have been set when the sets of data underlying the particular search results were indexed).

To determine the most relevant search results for the user's search query, the permissions-aware search and knowledge management system may identify a number of relevant documents within a search index for the searchable content that satisfy the user's search query. The relevant documents (or items) may then be ranked by determining an ordering of the relevant documents from the most relevant document to the least relevant document. A document may comprise any piece of digital content that can be indexed, such as an electronic message or a hypertext document. A variety of different ranking signals or ranking factors may be used to rank the relevant documents for the user's search query. In some embodiments, the identification and ranking of the relevant documents for the user's search query may take into account user suggested results from the user and/or other users (e.g., from co-workers within the same group as the user or co-located at the same level within a management hierarchy), the amount of time that has elapsed since a user suggested result was established, whether the underlying content was verified by a content owner of the content as being up-to-date or approved content, the amount of time that has elapsed since the underlying content was verified by the content owner, and the recent activity of the user and/or related group members (e.g., a co-worker within the same group as the user recently discussed a particular subject related to the executed search query within a messaging application within the past week).

One type of user suggested result comprises a document pinning, in which a user or a document owner "pins" a user-specified search query to a document for a user-specified period of time. In one example, a user Sally may attach a user-specified search query, such as "my favorite cookie recipe," to a particular document for one month. In some cases, the permissions-aware search and knowledge management system may identify possessive pronouns and/or possessive adjectives within the user-specified search query (e.g., via a list of common possessive pronouns and adjectives) and replace the possessive pronouns and possessive adjectives with corresponding user identifiers (e.g., replacing "my" with "SallyB123-45-6789"). In another example, a document owner of a recipe document may pin the user-specified search query of "Sally's cookies from summer camp" to the recipe document for a three-month time period. In some cases, the permissions-aware search and knowledge management system may identify personal names within the user-specified search query and replace the personal names with corresponding user identifiers (e.g., replacing "Sally" with "SallyB123-45-6789"). The user-specified search query for the pinned document specified by the document owner may include terms that do not appear within the pinned document. Therefore, document pinning allows a user or document owner to add searchable context to the pinned document that cannot be derived from the document itself. For example, the user-specified search query for the pinned document may include a term that comprises neither a word match nor a synonym for any word within the pinned document. One technical benefit of allowing a user of the permissions-aware search and knowledge management system or a document owner to pin a user-specified search query to a document for a particular period of time (e.g., for the next three months) is that terms that are not found in the document or that cannot be derived from the contents of the document may be specified and subsequently searched in order to find the document, thereby improving the quality and relevance of search results.

In some embodiments, the permissions-aware search and knowledge management system may allow a user to search for content and resources across different workplace applications and data sources that are authorized to be viewed by the user. The permissions-aware search and knowledge management system may include a data ingestion and indexing path that periodically acquires content and identity information from different data sources and then adds them to a search index. The data sources may include databases, file systems, document management systems, cloud-based file synchronization and storage services, cloud-based applications, electronic messaging applications, and workplace collaboration applications. In some cases, data updates and new content may be pushed to the data ingestion and indexing path. In other cases, the data ingestion and indexing path may utilize a site crawler or periodically poll the data sources for new, updated, and deleted content. As the content from different data sources may contain different data formats and document types, incoming documents may be converted to plain text or to a normalized data format. The search index may include portions of text, text summaries, unique words, terms, and term frequency information per indexed document. In some cases, the text summaries may only be provided for documents that are frequently searched or accessed. A text summary may include the most relevant sentences, key words, personal names, and locations that are extracted from a document using natural language processing (NLP). The search index may include enterprise specific identifiers, such as employee names, employee identification numbers, and workplace group names, related to the searchable content per indexed document. The search index may also store user permissions or access rights information for the searchable content per indexed document.

The permissions-aware search and knowledge management system may aggregate ranking signals across the different workplace applications and data sources. The ranking signals may include recent search and messaging activity of co-workers of a search user. The ranking signals may also include user suggested results, such as document "pinning" in which an electronic document or message is pinned to a particular search query (e.g., a user-specified set of relevant key words) for a specified period of time (e.g., the document pin will expire after 60 days). The pin may automatically renew if the electronic document or message is accessed at least at a threshold number of times within the specified period of time or if the electronic document or message has been set into a verified state by an owner of the electronic document or message. The user suggested results may also include user "starring" in which a search user may select from a displayed search results page what their preferred search result is for a given search query. The user suggested results including user pinning and user starring may be used to boost the ranking of search results for a particular user, as well as to boost the ranking of search results for others within the same workgroup as the particular user. The permissions-aware search and knowledge management system may utilize natural language processing (NLP) and deep-learning models in order to identify semantic meaning within documents and search queries.

In some embodiments, the permissions-aware search and knowledge management system may identify user activity information associated with searchable content, such as the number of recent edits, downloads, likes, shares, accesses, and views for the searchable content. For a searchable document, the popularity of the document based on the user activity information may be time dependent and may be determined on a per group basis. The recent activity of a user and fellow group members (e.g., co-workers within the same department or group as the user) may be used to compute a document popularity for the group (or sub-group). A user may be a member of a child group (e.g., an engineering sub-group) that is a member of a parent group (e.g., a group comprising all engineering sub-groups). The document popularity values per group may be stored within the search index and the determination of the appropriate document popularity value to apply during ranking may be determined at search time. In some cases, the time period for gathering user activity statistics may be adjusted based on group size. For example, the time period for gathering user activity statistics may be adjusted from 60 days to 30 days if a sub-group is more than ten people; in this case, smaller groups of less than ten people will utilize user activity statistics over a longer time duration. The level of granularity for the user activity statistics applied to scoring a document may be determined based on the number of people within the sub-group or the number of searches performed by the sub-group.

The permissions-aware search and knowledge management system may also incorporate crosslinking by leveraging an organization's communications channel to generate ranking signals for documents (e.g., using whether a document was referenced or linked in an electronic message or posting as a user activity signal for the document). In one example, the message text for a message within a persistent chat channel may comprise user generated content that is linked with a referenced document that is referenced within the message to improve search results for the referenced document. In some cases, the crosslinking of the user generated content comprising the message text with the referenced document may only be created if the message text was generated by the document owner or someone within the same group as the document owner. In one example, a document owner may provide message text (e.g., a description of a referenced document) within a persistent chat channel along with a link to the referenced document; in this case, a crosslinking of the message text with the referenced document may be created because the message text was submitted by the document owner. In some cases, a document owner may be more knowledgeable about the contents of a document and may be more likely to provide a reliable description for the contents of the document. In other cases, the crosslinking of the user generated content comprising the message text with the referenced document may be created irrespective of document ownership of the referenced document.

There are several search user interactions that may be used to establish associations between search queries and corresponding searchable documents for ranking purposes. The associations between a search query and one or more searchable documents may be stored within a table, database, or search index. If a semantically similar search query is subsequently issued, then the ranking of searchable documents with previously established associations may be boosted. These search user interactions may include a user pinning the document to a search query, a user starring a document as the best search result for a search query, a user clicking on a search result link to a document after submitting a search query, and a user discussing a document or linking to the document during a question and answer exchange within a communication channel (e.g., within a persistent chat channel or an electronic messaging channel). If the answer to a question during a conversation exchange within the communication channel included a link or other reference to a document, then the message text associated with the question may be associated with the referenced document.

FIG. 1 depicts one embodiment of a networked computing environment 100 in which the disclosed technology may be practiced. The networked computing environment 100 includes a search and knowledge management system 120, one or more data sources 140, server 160, and a computing device 154 in communication with each other via one or more networks 180. The networked computing environment 100 may include a plurality of computing devices interconnected through one or more networks 180. The networked computing environment 100 may correspond with or provide access to a cloud computing environment providing Software-as-a-Service (SaaS) or Infrastructure-as-a-Service (IaaS) services. The one or more networks 180 may allow computing devices and/or storage devices to connect to and communicate with other computing devices and/or other storage devices. In some cases, the networked computing environment 100 may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, a data storage system, or a cloud-based data storage system. The one or more networks 180 may include a cellular network, a mobile network, a wireless network, a wired network, a secure network such as an enterprise private network, an unsecure network such as a wireless open network, a local area network (LAN), a wide area network (WAN), the Internet, or a combination of networks.

In some embodiments, the computing devices within the networked computing environment 100 may comprise real hardware computing devices or virtual computing devices, such as one or more virtual machines. The storage devices within the networked computing environment 100 may comprise real hardware storage devices or virtual storage devices, such as one or more virtual disks. The read hardware storage devices may include non-volatile and volatile storage devices.

The search and knowledge management system 120 may comprise a permissions-aware search and knowledge management system that utilizes user suggested results, document verification, and user activity tracking to generate or rank search results. The search and knowledge management system 120 may enable content stored in storage devices throughout the networked computing environment 100 to be indexed, searched, and displayed to authorized users. The search and knowledge management system 120 may index content stored on various computing and storage devices, such as data sources 140 and server 160, and allow a computing device, such as computing device 154, to input or submit a search query for the content and receive authorized search results with links or references to portions of the content. As the search query is being typed or entered into a search bar on the computing device, potential additional search terms may be displayed to help guide a user of the computing device to enter a more refined search query. This autocomplete assistance may display potential word completions and potential phrase completions within the search bar.

As depicted in FIG. 1, the search and knowledge management system 120 includes a network interface 125, processor 126, memory 127, and disk 128 all in communication with each other. The network interface 125, processor 126, memory 127, and disk 128 may comprise real components or virtualized components. In one example, the network interface 125, processor 126, memory 127, and disk 128 may be provided by a virtualized infrastructure or a cloud-based infrastructure. Network interface 125 allows the search and knowledge management system 120 to connect to one or more networks 180. Network interface 125 may include a wireless network interface and/or a wired network interface. Processor 126 allows the search and knowledge management system 120 to execute computer readable instructions stored in memory 127 in order to perform processes described herein. Processor 126 may include one or more processing units, such as one or more CPUs and/or one or more GPUs. Memory 127 may comprise one or more types of memory (e.g., RAM, SRAM, DRAM, EEPROM, Flash, etc.). Disk 128 may include a hard disk drive and/or a solid-state drive. Memory 127 and disk 128 may comprise hardware storage devices.

In one embodiment, the search and knowledge management system 120 may include one or more hardware processors and/or one or more control circuits for performing a permissions-aware search in which a ranking of search results is outputted or displayed in response to a search query. The search results may be displayed using snippets or summaries of the content. In some embodiments, the search and knowledge management system 120 may be implemented using a cloud-based computing platform or cloud-based computing and data storage services.

The data sources 140 include collaboration and communication tools 141, file storage and synchronization services 142, issue tracking tools 143, databases 144, and electronic files 145. The data sources 140 may include a communication platform not depicted that provides online chat, threaded conversations, videoconferencing, file storage, and application integration. The data sources 140 may comprise software and/or hardware used by an organization to store its data. The data sources 140 may store content that is directly searchable, such as text within text files, word processing documents, presentation slides, and spreadsheets. For audio files or audiovisual content, the audio portion may be converted to searchable text using an audio to text converter or transcription application. For image files and videos, text within the images may be identified and extracted to provide searchable text. The collaboration and communication tools

141 may include applications and services for enabling communication between group members and managing group activities, such as electronic messaging applications, electronic calendars, and wikis or hypertext publications that may be collaboratively edited and managed by the group members. The electronic messaging applications may provide persistent chat channels that are organized by topics or groups. The collaboration and communication tools 141 may also include distributed version control and source code management tools. The file storage and synchronization services 142 may allow users to store files locally or in the cloud and synchronize or share the files across multiple devices and platforms. The issue tracking tools 143 may include applications for tracking and coordinating product issues, bugs, and feature requests. The databases 144 may include distributed databases, relational databases, and NoSQL databases. The electronic files 145 may comprise text files, audio files, image files, video files, database files, electronic message files, executable files, source code files, spreadsheet files, and electronic documents that allow text and images to be displayed consistently independent of application software or hardware.

The computing device 154 may comprise a mobile computing device, such as a tablet computer, that allows a user to access a graphical user interface for the search and knowledge management system 120. A search interface may be provided by the search and knowledge management system 120 to search content within the data sources 140. A search application identifier may be included with every search to preserve contextual information associated with each search. The contextual information may include the data sources and search rankings that were used for the search using the search interface.

A server, such as server 160, may allow a client device, such as the computing device 154, to download information or files (e.g., executable, text, application, audio, image, or video files) from the server or to enable a search query related to particular information stored on the server to be performed. The search results may be provided to the client device by a search engine or a search system, such as the search and knowledge management system 120. The server 160 may comprise a hardware server. In some cases, the server may act as an application server or a file server. In general, a server may refer to a hardware device that acts as the host in a client-server relationship or to a software process that shares a resource with or performs work for one or more clients. The server 160 includes a network interface 165, processor 166, memory 167, and disk 168 all in communication with each other. Network interface 165 allows server 160 to connect to one or more networks 180. Network interface 165 may include a wireless network interface and/or a wired network interface. Processor 166 allows server 160 to execute computer readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, EEPROM, Flash, etc.). Disk 168 may include a hard disk drive and/or a solid-state drive. Memory 167 and disk 168 may comprise hardware storage devices.

The networked computing environment 100 may provide a cloud computing environment for one or more computing devices. In one embodiment, the networked computing environment 100 may include a virtualized infrastructure that provides software, data processing, and/or data storage services to end users accessing the services via the networked computing environment. In one example, networked computing environment 100 may provide cloud-based work productivity applications to computing devices, such as computing device 154. The networked computing environment 100 may provide access to protected resources (e.g., networks, servers, storage devices, files, and computing applications) based on access rights (e.g., read, write, create, delete, or execute rights) that are tailored to particular users of the computing environment (e.g., a particular employee or a group of users that are identified as belonging to a particular group or classification). An access control system may perform various functions for managing access to resources including authentication, authorization, and auditing. Authentication may refer to the process of verifying that credentials provided by a user or entity are valid or to the process of confirming the identity associated with a user or entity (e.g., confirming that a correct password has been entered for a given username). Authorization may refer to the granting of a right or permission to access a protected resource or to the process of determining whether an authenticated user is authorized to access a protected resource. Auditing may refer to the process of storing records (e.g., log files) for preserving evidence related to access control events. In some cases, an access control system may manage access to a protected resource by requiring authentication information or authenticated credentials (e.g., a valid username and password) before granting access to the protected resource. For example, an access control system may allow a remote computing device (e.g., a mobile phone) to search or access a protected resource, such as a file, web page, application, or cloud-based application, via a web browser if valid credentials can be provided to the access control system.

In some embodiments, the search and knowledge management system 120 may utilize processes that crawl the data sources 140 to identify and extract searchable content. The content crawlers may extract content on a periodic bases from files, websites, and databases and then cause portions of the content to be transferred to the search and knowledge management system 120. The frequency at which the content crawlers extract content may vary depending on the data source and the type of data being extracted. For example, a first update frequency (e.g., every hour) at which presentation slides or text files with infrequent updates are crawled may be less than a second update frequency (e.g., every minute) at which some websites or blogging services that publish frequent updates to content are crawled. In some cases, files, websites, and databases that are frequently searched or that frequently appear in search results may be crawled at the second update frequency (e.g., every two minutes) while other documents that have not appeared in search results within the past two days may be crawled at the first update frequency (e.g., once every two hours). The content extracted from the data sources 140 may be used to build a search index using portions of the content or summaries of the content. The search and knowledge management system 120 may extract metadata associated with various files and include the metadata within the search index. The search and knowledge management system 120 may also store user and group permissions within the search index. The user permissions for a document with an entry in the search index may be determined at the time of a search query or at the time that the document was indexed. A document may represent a single object that is an item in the search index, such as a file, folder, or a database record.

After the search index has been created and stored, then search queries may be accepted and ranked search results to the search queries may be generated and displayed. Only documents that are authorized to be accessed by a user may be returned and displayed. The user may be identified based on a username or email address associated with the user. The search and knowledge management system 120 may acquire one or more ACLs or determine access permissions for the documents underlying the ranked search results from the search index that includes the access permissions for the documents. The search and knowledge management system 120 may process a search query by passing over the search index and identifying content information that matches the search terms of the search query and synonyms for the search terms. The content associated with the matched search terms may then be ranked taking into account user suggested results from the user and others, whether the underlying content was verified by a content owner within a past threshold period of time (e.g., was verified within the past week), and recent messaging activity by the user and others within a common grouping. The authorized search results may be displayed with links to the underlying content or as part of personalized recommendations for the user (e.g., displaying an assigned task or a highly viewed document by others within the same group).

To generate the search index, a full crawl in which the entire content from a data source is fetched may be performed upon system initialization or whenever a new data source is added. In some cases, registered applications may push data updates; however, because the data updates may not be complete, additional full crawls may be performed on a periodic basis (e.g., every two weeks) to make sure that all data changes to content within the data sources are covered and included within the search index. In some cases, the rate of the full crawl refreshes may be adjusted based on the number of data update errors detected. A data update error may occur when documents associated with search results are out of date due to content updates or when documents associated with search results have had content changes that were not reflected in the search index at the time that the search was performed. Each data source may have a different full crawl refresh rate. In one example, full crawls on a database may be performed at a first crawl refresh rate and full crawls on files associated with a website may be performed at a second crawl refresh rate greater than the first crawl refresh rate.

An incremental crawl may fetch only content that was modified, added, or deleted since a particular time (e.g., since the last full crawl or since the last incremental crawl was performed). In some cases, incremental crawls or the fetching of only a subset of the documents from a data source may be performed at a higher refresh rate (e.g., every hour) on the most searched documents or for documents that have been flagged as having a at least a threshold number of data update errors, or that have been newly added to the organization's corpus that are searchable. In other cases, incremental crawls may be performed at a higher refresh rate (e.g., content changes are fetched every ten minutes) on a first set of documents within a data source in which content deletion occurs at a first deletion rate (e.g., some content is deleted at least every hour) and performed at a lower refresh rate (e.g., content changes are fetched every hour) on a second set of documents within the data source in which content deletion occurs at a second deletion rate (e.g., content deletions occur on a weekly basis). One technical benefit of performing incremental crawls on a subset of documents within a data source that comprise frequently searched documents or documents that have a high rate of data deletions is that the load on the data source may be reduced and the number of application programming interface (API) calls to the data source may be reduced.

Figure 2A:
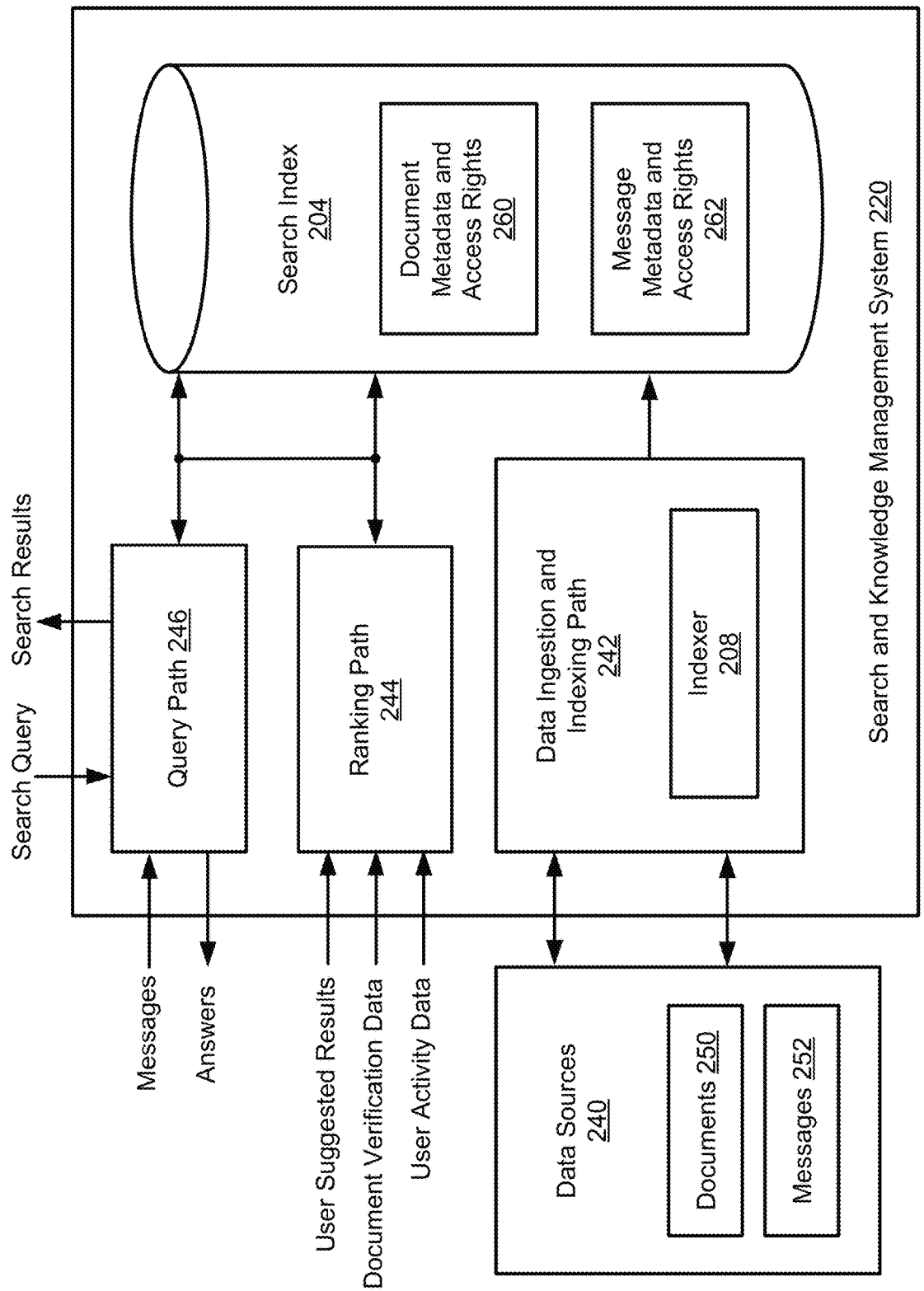
FIG. 2A depicts one embodiment of a search and knowledge management system in communication with one or more data sources.

FIG. 2A depicts one embodiment of a search and knowledge management system 220 in communication with one or more data sources 240. In one embodiment, the search and knowledge management system 220 may comprise one implementation of the search and knowledge management system 120 in FIG. 1 and the data sources 240 may correspond with the data sources 140 in FIG. 1. The data sources 240 may include one or more electronic documents 250 and one or more electronic messages 252 that are stored over various networks, document and content management systems, file servers, database systems, desktop computers, portable electronic devices, mobile phones, cloud-based applications, and cloud-based services.

The search and knowledge management system 220 may comprise a cloud-based system that includes a data ingestion and index path 242, a ranking path 244, a query path 246, and a search index 204. The search index 204 may store a first set of index entries for the one or more electronic documents 250 including document metadata and access rights 260 and a second set of index entries for the one or more electronic messages 252 including message metadata and access rights 262. The data ingestion and index path 242 may crawl a corpus of documents within the data sources 240, index the documents and extract metadata for each document fetched from the data sources 240, and then store the metadata in the search index 204. An indexer 208 within the data ingestion and index path 242 may write the metadata to the search index 204. In one example, if a fetched document comprises a text file, then the metadata for the document may include information regarding the file size or number of words, an identification of the author or creator of the document, when the document was created and last modified, key words from the document, a summary of the document, and access rights for the document. The query path 246 may receive a search query from a user computing device, such as the computing device 154 in FIG. 1, and compare the search query and terms derived from the search query (e.g., synonyms and related terms) with the search index 204 to identify relevant documents for the search query. The query path 246 may also include or interface with an automated digital assistant that may interact with a user of the user computing device in a conversational manner in which answers are outputted in response to messages or questions provided to the automated digital assistant.

The relevant documents may be ranked using the ranking path 244 and then a set of search results responsive to the search query may be outputted to the user computing device corresponding with the ranking or ordering of the relevant documents. The ranking path 244 may take into consideration a variety of signals to score and rank the relevant documents. The ranking path 244 may determine the ranking of the relevant documents based on the number of times that a search query term appears within the content or metadata for a document, whether the search query term matches a key word for a document, and how recently a document was created or last modified. The ranking path 244 may also determine the ranking of the relevant documents based on user suggested results from an owner of a relevant document or the user executing the search query, the amount of time that has passed since the user suggested result was established, whether a document was verified by a content owner, the amount of time that has passed since the relevant document was verified by the content owner, and the amount and type of activity performed with a past period of time (e.g., within the past hour) by the user executing the search query and related group members.

Figure 2B:
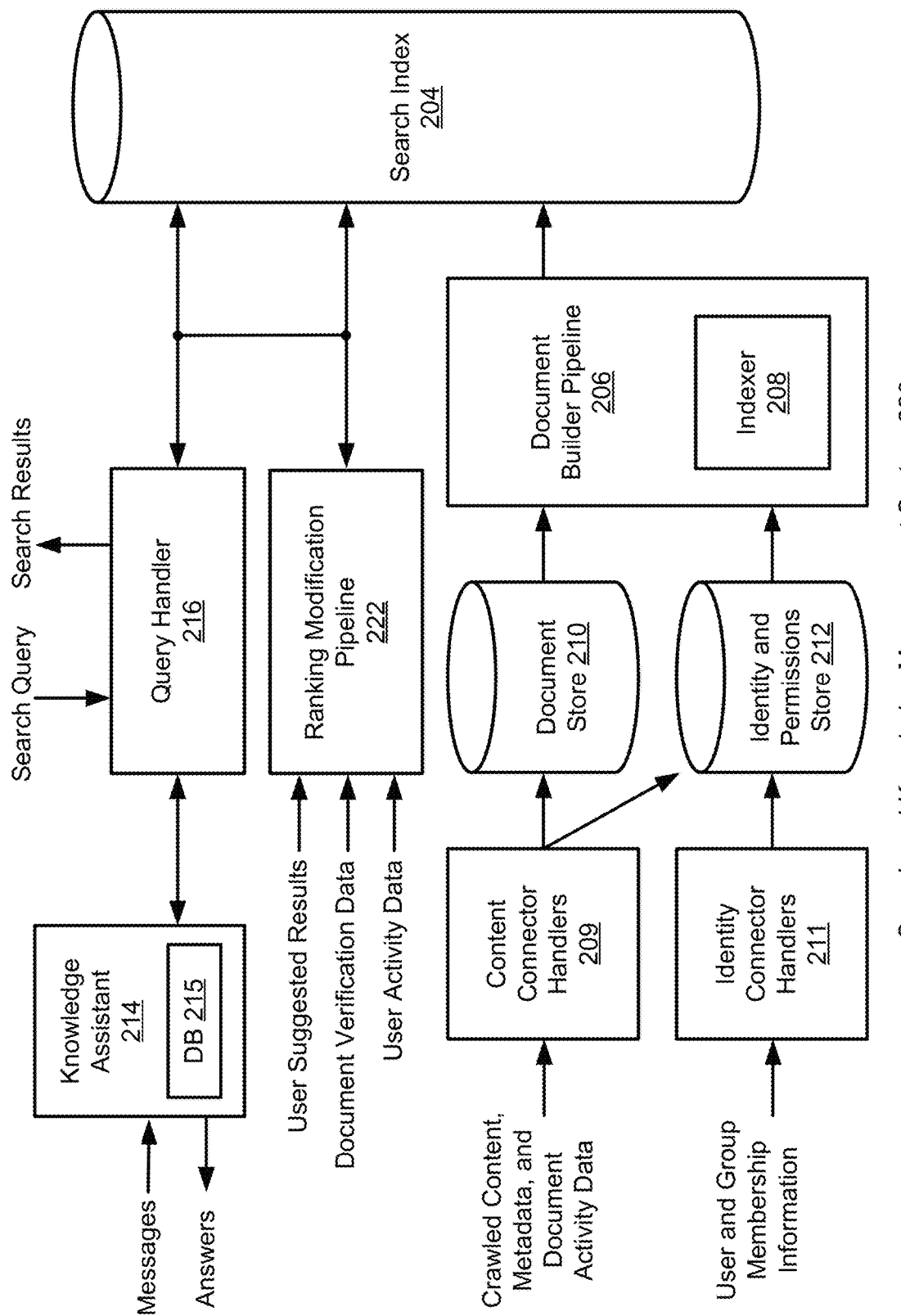
FIG. 2B depicts one embodiment of the search and knowledge management system of FIG. 2A.

FIG. 2B depicts one embodiment of the search and knowledge management system 220 of FIG. 2A. The search and knowledge management system 220 may comprise a cloud-based system that includes a data ingestion and indexing path, a ranking path, a query path, and a search index 204. The components of the search and knowledge management system 220 may be implemented using software, hardware, or a combination of hardware and software. In some cases, a cloud-based task service for asynchronous execution, cloud-based task handlers, or a cloud-based system for managing the execution, dispatch, and delivery of distributed tasks may be used to implement the fetching and processing of content from various data sources, such as data sources 240 in FIG. 2A. In some cases, a cloud-based task service or a cloud-based system for managing the execution, dispatch, and delivery of distributed tasks may be used to acquire and synchronize user and group identifications associated with content fetched from the various data sources. The data sources may have dedicated task queues or shared task queues depending on the size of the data source and the rate requirements for fetching the content. In one example, a data source may have a dedicated task queue if the data source stores more than a threshold number of documents or more than a threshold amount of content (e.g., stores more than 100 GB of data).

The data ingestion and indexing path is responsible for periodically acquiring content and identity information from the data sources 240 in FIG. 2A and adding the content and identity information or portions thereof to the search index 204. The data ingestion and indexing path includes content connector handlers 209 in communication with document store 210. The document store 210 may comprise a key value store database or a cloud-based database service. The content connector handlers 209 may comprise software programs or applications that are used to traverse and fetch content from one or more data sources. The content connector handlers 209 may make API calls to various data sources, such as the data sources 240 in FIG. 2A, to fetch content and data updates from the data sources. Each data source may be associated with one content connector for that data source. The content connector handlers 209 may acquire content, metadata, and activity data corresponding with the content. For example, the content connector handlers 209 may acquire the text of a word processing document, metadata for the word processing document, and activity data for the word processing document. The metadata for the word processing document may include an identification of the owner of the document, a timestamp associated with when the document was last modified, a file size for the document, and access permissions for the document. The activity data for the word processing document may include the number of views for the document within a threshold period of time (e.g., within the past week or since the last update to the document occurred), the number of likes for the document, the number of downloads for the document, and the number of shares associated with the document. The content connector handlers 209 may store the fetched content, metadata, and activity data in the document store 210 and publish the fetch event to a publish-subscribe (pubsub) system not depicted so that the document builder pipeline 206 may be notified that the fetch event has occurred. In response to the notification, the document builder pipeline 206 may process the fetched content and add the fetched content and information derived from the fetched content to the search index 204. The document builder pipeline 206 may transform or augment the fetched content prior to storing the information derived from the fetched content in the search index 204. In one example, the document builder pipeline 206 may augment the fetched content with identity information and synonyms.

Some data sources may utilize APIs that provide notification (e.g., via webhook pings) to the content connector handlers 209 that content within a data source has been modified, added, or deleted. For data sources that are not able to provide notification that content updates have occurred or that cannot push content changes to the content connector handlers 209, the content connector handlers 209 may perform periodic incremental crawls in order to identify and acquire content changes. In some cases, the content connector handlers 209 may perform periodic incremental crawls or full crawls even if a data source has provided webhook pings in the past in order to ensure the integrity of the acquired content and that the search and knowledge management system 220 is consistent with the actual state of the content stored in the data source. Some data sources may allow applications to register for callbacks or push notifications whenever content or identity information has been updated at the data source.

As depicted in FIG. 2B, the data ingestion and indexing path also includes identity connector handlers 211 in communication with identity and permissions store 212. The identity and permissions store 212 may comprise a key value store database or a cloud-based database service. The identity connector handlers 211 may acquire user and group membership information from one or more data sources and store the user and group membership information in the identity and permissions store 212 to enable search results that respect data source specific privacy settings for the content stored using the one or more data sources. The user information may include data source specific user information, such as a data source specific user identification or username. The identity connector handlers 211 may comprise software programs or applications that are used to acquire and synchronize user and/or group identities to a primary identity used by the search and knowledge management system 220 to uniquely identify a user. Each user of the search and knowledge management system 220 may be canonically represented via a unique primary identity, which may comprise a hash of an email address for the user. In some cases, the search and knowledge management system 220 may map an email address that is used as the primary identity for a user to an alphanumeric username used by a data source to identify the same user. In other cases, the search and knowledge management system 220 may map a unique alphanumeric username that is used as the primary identity for a user to two different usernames that are used by a data source to identify the same user, such as one username associated with regular access permissions and another username associated with administrative access permissions. If a data source does not identify a user by the user's primary identity within the search and knowledge management system 220, then an external identity that identifies the user for that data source may be determined by the search and knowledge management system 220 and mapped to the primary identity.

In some cases, the content connector handlers 209 may fetch access rights and permissions settings associated with the fetched content during the content crawl and store the access rights and permission settings using the identity and permissions store 212. For some data sources, the identity crawl to obtain user and group membership information may be performed before the content crawl to obtain content associated with the user and group membership information. When a document is fetched during the content crawl, the content connector handlers 209 may also fetch the ACL for the document. The ACL may specify the allowed users with the ability to view or access the document, the disallowed users that do not have access rights to view or access the document, allowed groups with the ability to view or access the document, and disallowed groups that do not have access rights to view or access the document. The ACL for the document may indicate access privileges for the document including which individuals or groups have read access to the document.

In some cases, a particular set of data may be associated with an ACL that determines which users within an organization may access the particular set of data. In one example, to ensure compliance with data security and retention regulations, the particular set of data may comprise sensitive or confidential information that is restricted to viewing by only a first group of users. In another example, the particular set of data may comprise source code and technical documentation for a particular product that is restricted to viewing by only a second group of users.

As depicted in FIG. 2B, the document store 210 may store crawled content from various data sources, along with any transformation or processing of the content that occurs prior to indexing the crawled content. Every piece of content acquired from the data sources may correspond with a row in the document store 210. For example, when the content connector handlers 209 fetch a spreadsheet or word processing document from a data source, the raw content for the spreadsheet or word processing document may be stored as a row in the document store 210. In addition to the raw content, a row in the document store 210 may also include interaction or activity data associated with the content, such as the number of views, the number of comments, the number of likes, and the number of users who interacted with the content along with their corresponding user identifications. A row in the document store 210 may also include document metadata for the stored content, such as keywords or classification information, and permissions or access rights information for the stored content.

The identity and permissions store 212 may store the primary identity for a user (e.g., a hash of an email address) within the search and knowledge management system 220 and corresponding usernames or data source identifiers used by each data source for the same user. A row in the identity and permissions store 212 may include a mapping from the user identifier used by a data source to the corresponding primary identity for the user for the search and knowledge management system 220. The identity and permissions store 212 may also store identifications for each user assigned to a particular group or associated with a particular group membership. The ACLs that are associated with a fetched document may include allowed user identifications and allowed group identifications. Each user of the search and knowledge management system 220 may correspond with a unique primary identity and each primary identity may be mapped to all groups that the user is a member of across all data sources.

As depicted in FIG. 2B, the data ingestion and indexing path includes document builder pipeline 206 in communication with search index 204. The document builder pipeline 206 may comprise software programs or applications that are used to transform or augment the crawled content to generate searchable documents that are then stored within the search index 204. The document builder pipeline 206 may include an indexer 208 that writes content derived from the fetched content, structured metadata for the fetched content, and access rights for the fetched content to the search index 204.

The searchable documents generated by the document builder pipeline 206 may comprise portions of the crawled content along with augmented data, such as access right information, document linking information, search term synonyms, and document activity information. In one example, the document builder pipeline 206 may transform the crawled content by extracting plain text from a word processing document, a hypertext markup language (HTML) document, or a portable document format (PDF) document and then directing the indexer 208 to write the plain text for the document to the search index 204. A document parser may be used to extract the plain text for the document or to generate clean text for the document that can be indexed (e.g., with HTML tags or text formatting tags removed). The document builder pipeline 206 may also determine access rights for the document and write the identifications for the users and groups with access rights to the document to the search index 204. The document builder pipeline 206 may determine document linking information for the crawled document, such as a list of all the documents that reference the crawled document and their anchor descriptions, and store the document linking information in the search index 204. The document linking information may be used to determine document popularity (e.g., based on how many times a document is referenced or the number of outlinks from the document) and preserve searchable anchor text for target documents that are referenced. The words or terms used to describe an outgoing link in a source document may provide an important ranking signal for the linked target document if the words or terms accurately describe the target document. The document builder pipeline 206 may also determine document activity information for the crawled document, such as the number of document views, the number of comments or replies associated with the document, and the number of likes or shares associated with the document, and store the document activity information in the search index 204.

The document builder pipeline 206 may be subscribed to publish-subscribe events that get written by the content connector handlers 209 every time new documents or updates are added to the document store 210. Upon notification that the new documents or updates have been added to the document store 210, the document builder pipeline 206 may perform processes to transform or augment the new documents or portions thereof prior to generating the searchable documents to be stored within the search index 204.

As depicted in FIG. 2B, the query path includes a query handler 216 in communication with the search index 204 and the ranking modification pipeline 222. A knowledge assistant 214 interacts with the query handler 216 to provide a real-time automated digital assistant that may interact with a user of the search and knowledge management system 220 via a graphical user interface in a conversational manner using natural language dialog. The automated digital assistant may comprise a computer-implemented assistant that may access and display only information that a user's access rights permit. The knowledge assistant 214 may include a frequently asked questions (FAQ) database that includes question and answer pairs for questions identified within a chat channel that were classified as factual questions. The FAQ database may be stored in database DB 215 or in a solid-state memory not depicted.

The query handler 216 may comprise software programs or applications that detect that a search query has been submitted by an authenticated user identity, parse the search query, acquire query metadata for the search query, identify a primary identity for the authenticated user identity, acquire ranked search results that satisfy the search query using the primary identity and the parsed search query, and output (e.g., transfer or display) the ranked search results that satisfy the search query or that comprise the highest ranking of relevant information for the search query and the query metadata. The search query may be parsed by acquiring an inputted search query string for the search query and identifying root terms or tokenized terms within the search query string, such as unigrams and bigrams, with corresponding weights and synonyms. In some cases, natural language processing algorithms may be used to identify terms within a search query string for the search query. The search query may be received as a string of characters and the natural language processing algorithms may identify a set of terms (or a set of tokens) from the string of characters. Potential spelling errors for the identified terms may be detected and corrected terms may be added or substituted for the potentially misspelled terms.

The query metadata may include synonyms for terms identified within the search query and nearest neighbors with semantic similarity (e.g., with sematic similarity scores above a threshold that indicate their similarity to each other at the semantic level). The semantic similarity between two texts (e.g., each comprising one or more words) may refer to how similar the two texts are in meaning. A supervised machine learning approach may be used to determine the semantic similarity between the two texts in which training data for the supervised step may include sentence or phrase pairs and the associated labels that represent the semantic similarly between the sentence or phrase pairs. The query handler 216 may consume the search query as a search query string, and then construct and issue a set of queries related to the search query based on the terms identified within the search query string and the query metadata. In response to the set of queries being issued, the query handler 216 may acquire a set of relevant documents for the set of queries from the search index 204. The set of relevant documents may be provided to the ranking modification pipeline 222 to be scored and ranked for relevance to the search query. After the set of relevant documents have been ranked, a subset of the set of relevant documents may be identified (e.g., the top thirty ranked documents) based on the ranking and summary information or snippets may be acquired from the search index 204 for each document of the subset of the set of relevant documents. The query handler 216 may output the ranked subset of the set of relevant documents and their corresponding snippets to a computing device used by the authenticated user, such as the computing device 154 in FIG. 1.

Moreover, when a user issues a search query, the query handler 216 may determine the primary identity for the authenticated user and then query the identity and permissions store 212 to acquire all groups that the user is a member of across all data sources. The query handler 216 may then query the search index 204 with a filter that restricts the retrieved set of relevant documents such that the ACLs for the retrieved documents permit the user to access or view each of the retrieved set of relevant documents. In this case, each ACL should either specify that the user comprises an allowed user or that the user is a member of an allowed group.

The search index 204 may comprise a database that stores searchable content related to documents stored within the data sources 240 in FIG. 2A. The search index 204 may store text, title strings, chat message bodies, metadata, and access rights related to searchable content. For each searchable document, portions of text associated with the document, extracted key words, document classifications, and document summaries may be stored within the search index 204. For searchable electronic messages (e.g., searchable chat messages or email messages), the title, the message body of the original message, and the message bodies of related messages may be stored within the search index 204. For searchable question and answer responses, the message body of the question and the message body of the answer may be stored within the search index 204. A question and answer pair may derive from questions and answers made by the user or made by other users (e.g., co-workers) during a conversation exchange within a persistent chat channel or from dialog between an artificial intelligence powered digital assistant and the user within a chat channel. One example of an artificial intelligence powered digital assistant is the knowledge assistant 214 that may automatically output answers to messages or questions provided to the digital assistant. Text associated with other documents linked to or referenced by a searchable document, electronic message, or question and answer pair may also be stored within the search index 204 to provide context for the searchable content. Content access rights including which users and groups are allowed to access the content may be stored within the search index 204 for each piece of searchable content.

As depicted in FIG. 2B, the ranking modification pipeline 222 may comprise software programs or applications that are used to score and rank documents and portions of documents. The scoring of a set of relevant documents may weight different attributes of the documents differently. In one example, literal matches or lexical matches of search query terms within the body of a message or document may correspond with a first weighting while semantic matches of the search query terms may correspond with a second weighting different from the first weighting (e.g., greater than the first weighting). The matching of search query terms or their synonyms within a message body may be given a first weighting while the matching of the search query terms within a title field or within the text of a referencing document (e.g., anchor text within a source document) may be given a second weighting different from the first weighting (e.g., greater than the first weighting). The scoring and ranking of a set of relevant documents may take into consideration document popularity, which may change over time as a document ages or as the number of views for a document within a past period of time (e.g., within the past week) increases or decreases. A higher document popularity score may increase the ranking of a document, while a lower document popularity score may signal that the document has become stale and that its importance should be demoted. The ranking modification pipeline 222 may score and rank a set of relevant documents based on user suggested results submitted by owners of the relevant documents, the document verification statuses of the relevant documents, and the amount and type of user activity performed within a past period of time (e.g., within the past 24 hours) by the user executing a search query and others that are part of a common grouping with the user (e.g., co-workers on the same team or assigned to the same group).

Figure 3A:
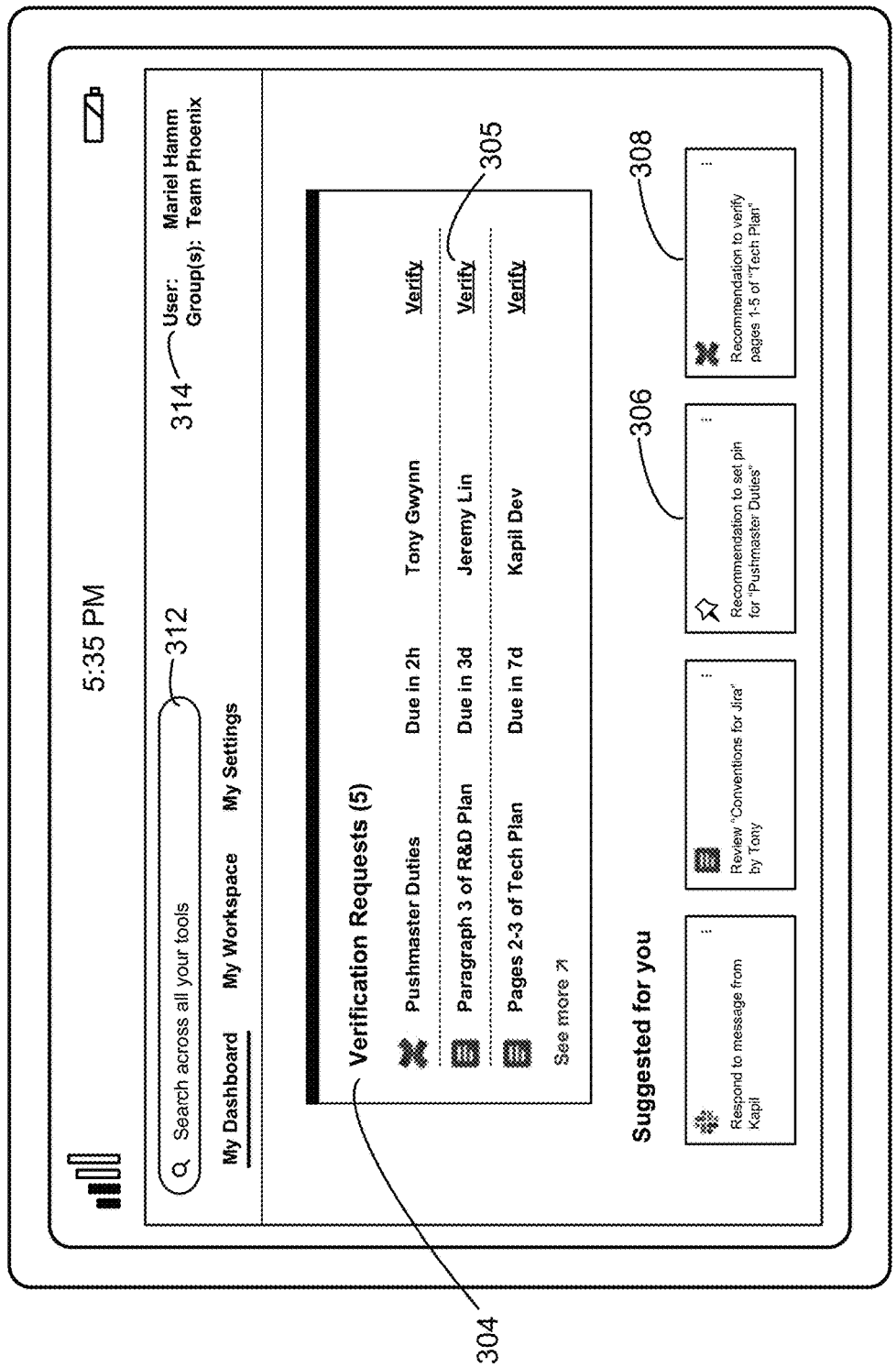
FIG. 3A depicts one embodiment of a mobile device providing a user interface for interacting with a permissions-aware search and knowledge management system.

FIG. 3A depicts one embodiment of a mobile device 302 providing a user interface for interacting with a permissions-aware search and knowledge management system. In one example, the mobile device 302 may correspond with the computing device 154 in FIG. 1. The mobile device 302 may include a touchscreen display that displays a user interface to an end user of the mobile device 302. The mobile device 302 may display device status information regarding wireless signal strength, time, and battery life associated with the mobile device, as well as the user interface for controlling or interacting with the permissions-aware search and knowledge management system. The user interface may be provided via a web-browser or an application running on the mobile device. The user interface may include a search bar 312 that the end user of the mobile device 302 may use to enter and submit a search query with search terms and criteria for the permissions-aware search and knowledge management system. The end user of the mobile device 302 may be associated with a unique user identifier or username 314. The username 314 may map to one or more group identifiers or group names. For example, the username "Mariel Hamm" may map to a single group identifier "Team Phoenix." A username may map to one or more group identifiers (e.g., a username may map to three different group identifiers associated with three different groups).

As depicted in FIG. 3A, a dashboard page "My Dashboard" may display a customized set of items that require urgent action by the user corresponding with the username 314 or that are commonly accessed by the user corresponding with the username 314. The customized set of items include verification requests 304 that comprise document verification requests from other users of the permissions-aware search and knowledge management system for particular documents that are owned by the username 314 to be verified as being up-to-date and approved by the user "Mariel Hamm." The username 314 has ownership permissions or is deemed a document owner for the documents "Pushmaster Duties," "R&D Plan," and "Tech Plan." The document verification requests may request that an entire document be verified or that a portion of a document be verified. For example, as depicted in FIG. 3A, the user "Jeremy Lin" has requested that only paragraph three of the document "R&D Plan" be verified and the user "Kapil Dev" has requested that pages two and three of the document "Tech Plan" be verified. The user of the graphical user interface may select to view and/or verify paragraph three of the document "R&D Plan" by selecting the verify widget or button 305. Along with the document verification requests submitted by the other users, four suggested actions are displayed including a first suggested action 306 that provides an automated recommendation to set a document pin for the document "Pushmaster Duties" and a second suggested action 308 that provides an automated recommendation to verify pages 1-5 of the document "Tech Plan."

In one embodiment, the first suggested action 306 to set a document pin may be automatically generated upon detection that at least a threshold number of other users have accessed (e.g., read or viewed) the document "Pushmaster Duties" and/or at least a threshold number of other users (e.g., at least ten other users) have starred the document "Pushmaster Duties" when performing searches. In another embodiment, the first suggested action 306 to set a document pin may be automatically generated upon detection that at least a threshold number of other users have starred the document "Pushmaster Duties" as their best search result for a given search query when the document "Pushmaster Duties" did not appear within a first number of the search results (e.g., did not appear within the first five search results). In one example, the first suggested action 306 to set a document pin for the document "Pushmaster Duties" may be automatically generated and displayed on the dashboard page in response to detecting that at least ten other users starred the document "Pushmaster Duties" when the document was not within the first three search results for their given search query.

In one embodiment, the second suggested action 308 to verify a portion of a document may be automatically generated upon detection that at least a threshold number of other users have accessed (e.g., read or viewed) the document "Tech Plan" or accessed a particular portion (e.g., a particular page) of the document "Tech Plan." In another embodiment, the second suggested action 308 to verify pages one through five out of fifty total pages for the document "Tech Plan" may be automatically generated upon detection that at least a threshold number of data changes have occurred (e.g., that at least fifty words have been added, deleted, or altered) within pages one through five and/or at least a threshold number of other users have accessed the document "Tech Plan" within a past period of time (e.g., within the past three days).

Figure 3B:
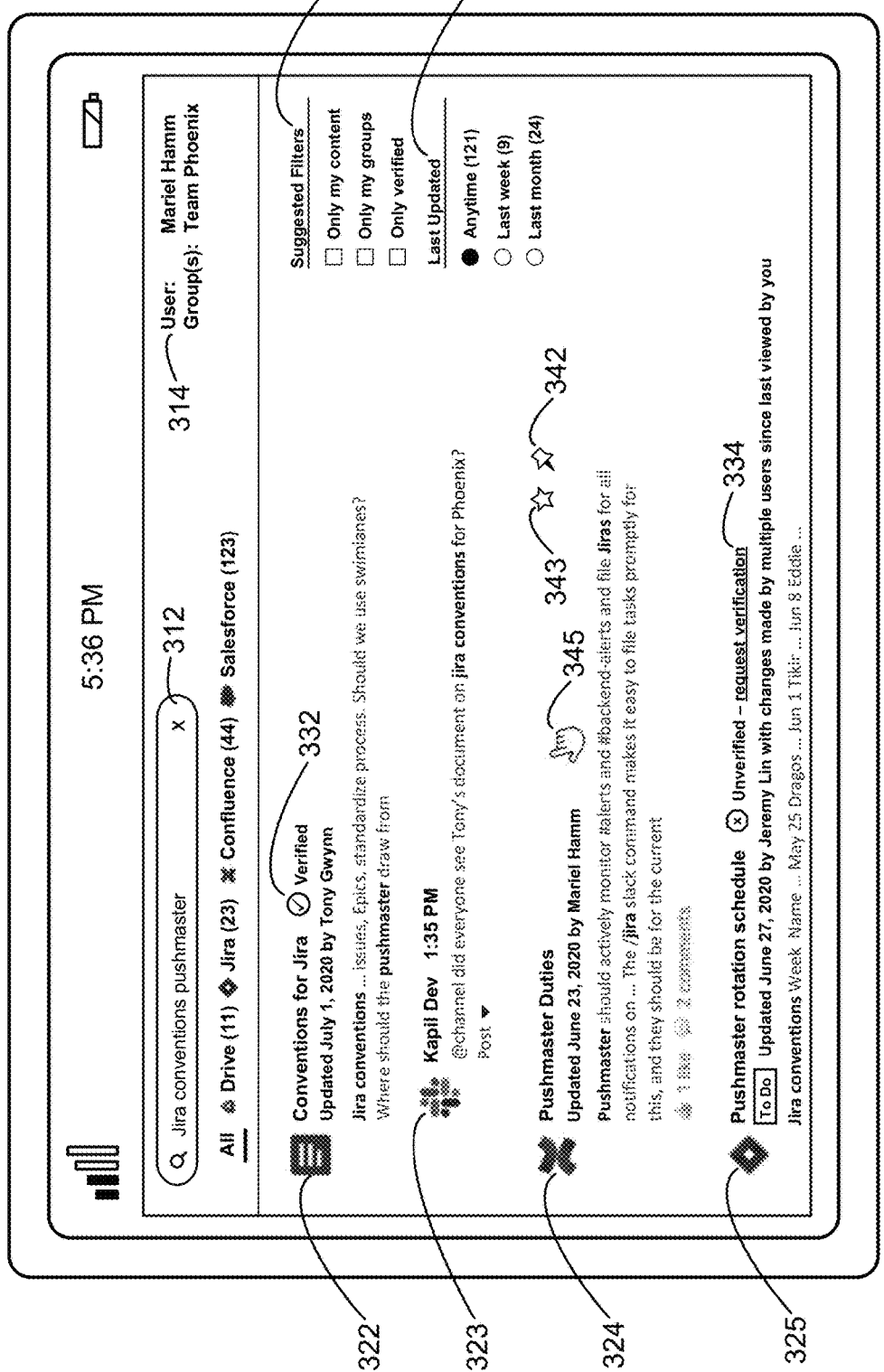
FIG. 3B depicts one embodiment of the mobile device in FIG. 3A providing a user interface for interacting with the permissions-aware search and knowledge management system.

FIG. 3B depicts one embodiment of the mobile device 302 in FIG. 3A providing a user interface for interacting with the permissions-aware search and knowledge management system. As depicted, the user corresponding with the username 314 has entered a search query with the search terms "Jira conventions pushmaster." In response to the entered search query, the permissions-aware search and knowledge management system has generated and displayed four search results that comprise the four most relevant and highest ranked search results for the search query. Each search result may include a link to an underlying document, message, or web page and a snippet or summary of the relevant information found within the search result. Along with the displayed search results, the user interface also displays suggested filters 346 that allow the user to further narrow or filter the search results to only include "Only my content" content that comprises content that is owned or controlled by the user (e.g., only content for which the user has both read and write permissions), to only include "Only my groups" content that comprises content that is owned or controlled by either the user or other users who belong to the same groups as the user, or to only include "Only verified" content that comprises content that has been verified by the content owners or that has been set into a verified state by their content owners. The user interface also displays a last updated filter 348 that allows the user to further narrow or filter the search results based on when the content was last updated and/or created.

As depicted in FIG. 3B, the search results include a first search result 322 that includes a link to an electronic document "Conventions for Jira" that was last updated on Jul. 1, 2020 by another user "Tony Gwynn." The electronic document "Conventions for Jira" was verified by the document owner and is currently in a verified state as indicated by the verified symbol 332. The search results include a second search result 323 that includes a link to an electronic message that was submitted by another user "Kapil Dev." The electronic message references the electronic document "Conventions for Jira" from the first search result 322 and therefore the display of the second search result 323 is indented to indicate a relationship in which the second search result 323 references or links to the first search result 322. The search results include a third search result 324 that includes a link to a web-based wiki that is authored by the user "Mariel Hamm." As the user has hovered over or positioned a mouse pointer 345 over the third search result 324, the user has the ability to select the pin icon 342 to "pin" the content to a particular search query or to select the star icon 343 to select the third search result 324 as the user's best search result for the entered search query. The particular search query specified by the user may be added to a search index as a key phrase for describing the content. As individuals within an organization may be deemed to be trustworthy, during subsequent searches, matching of the particular search query and/or the terms within the particular search query may cause boosted ranking scores even if the terms within the particular search query do not appear within the underlying content.

As depicted in FIG. 3B, the search results also include a fourth search result 325 that includes a link to an issue and project tracking entry. As the issue and project tracking entry has been visited or accessed by the user and/or other users within the same group "Team Phoenix" as the user at least a threshold number of times (e.g., at least five times), an automatic reminder that the link points to unverified content has been displayed and a verification request widget or button 334 has been provided to send a verification request to the content owners of the issue and project tracking entry. In some embodiments, an electronic document may comprise a collaborative document in which a plurality of users may have read and write access rights; in this case, a verification request may be automatically sent to each of the plurality of users or to only a single designated content owner.

Figure 3C:
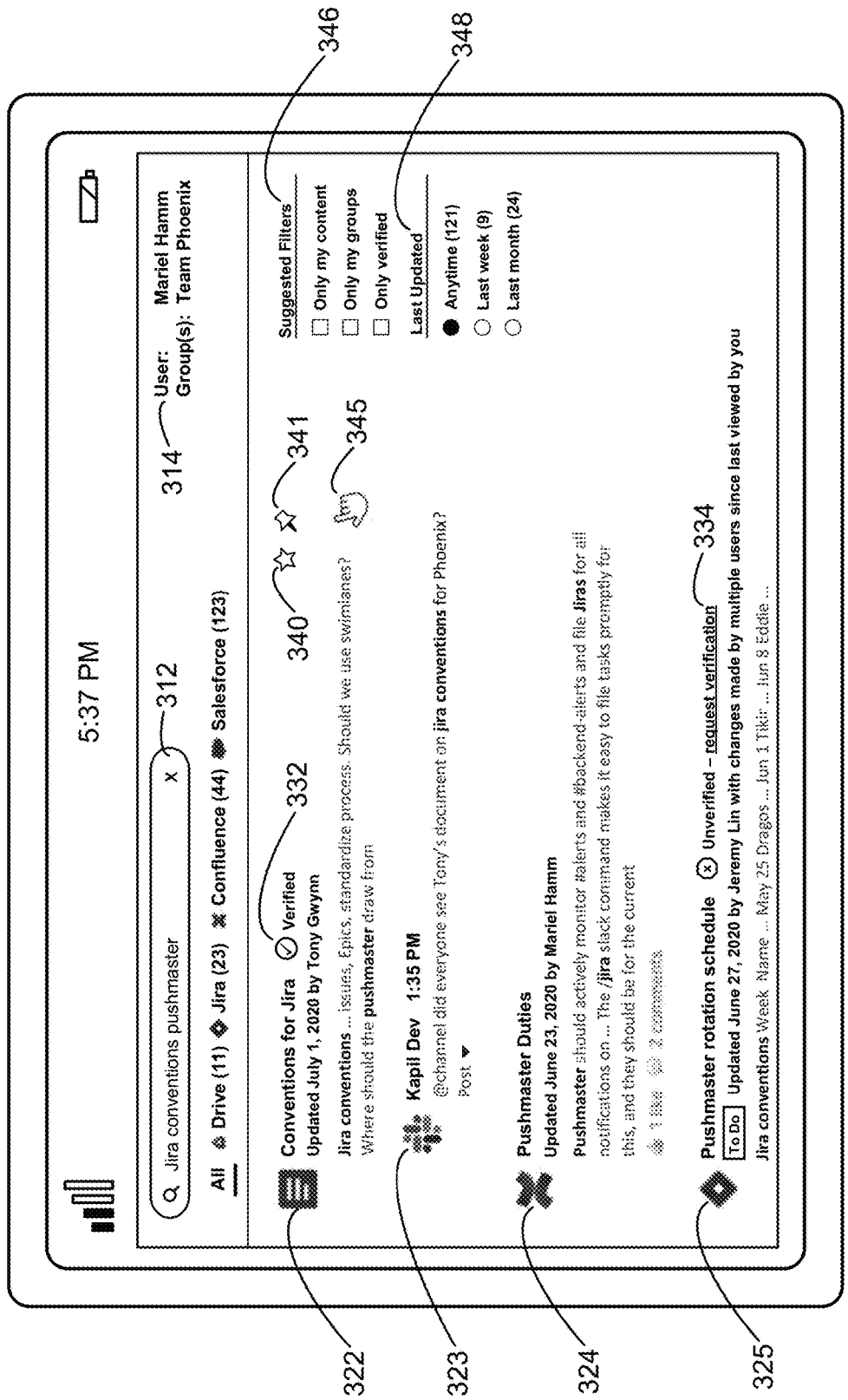
FIG. 3C depicts one embodiment of the mobile device in FIG. 3B after the user has selected and viewed content.

FIG. 3C depicts one embodiment of the mobile device 302 in FIG. 3B after the user has selected and viewed content from the first search result 322 and the fourth search result 325. In some embodiments, after the user has selected a link and accessed the linked contents of a search result, the user interface may display a star icon, such as star icon 340 associated with the first search result 322. In other embodiments, the star icon 340 may be displayed if the search user has hovered over or positioned a mouse pointer 345 over the first search result 322. The user may select the star icon 340 in order to select the first search result 322 as the user's best search result for the entered search query. In one embodiment, the star icon 340 may be automatically selected if the user selected and followed the first search result 322 without returning to the search results page. In another embodiment, a star icon may be automatically selected if the user enters the same search query twice and subsequently follows the same search result twice without returning to the search results page.

Figure 3D:
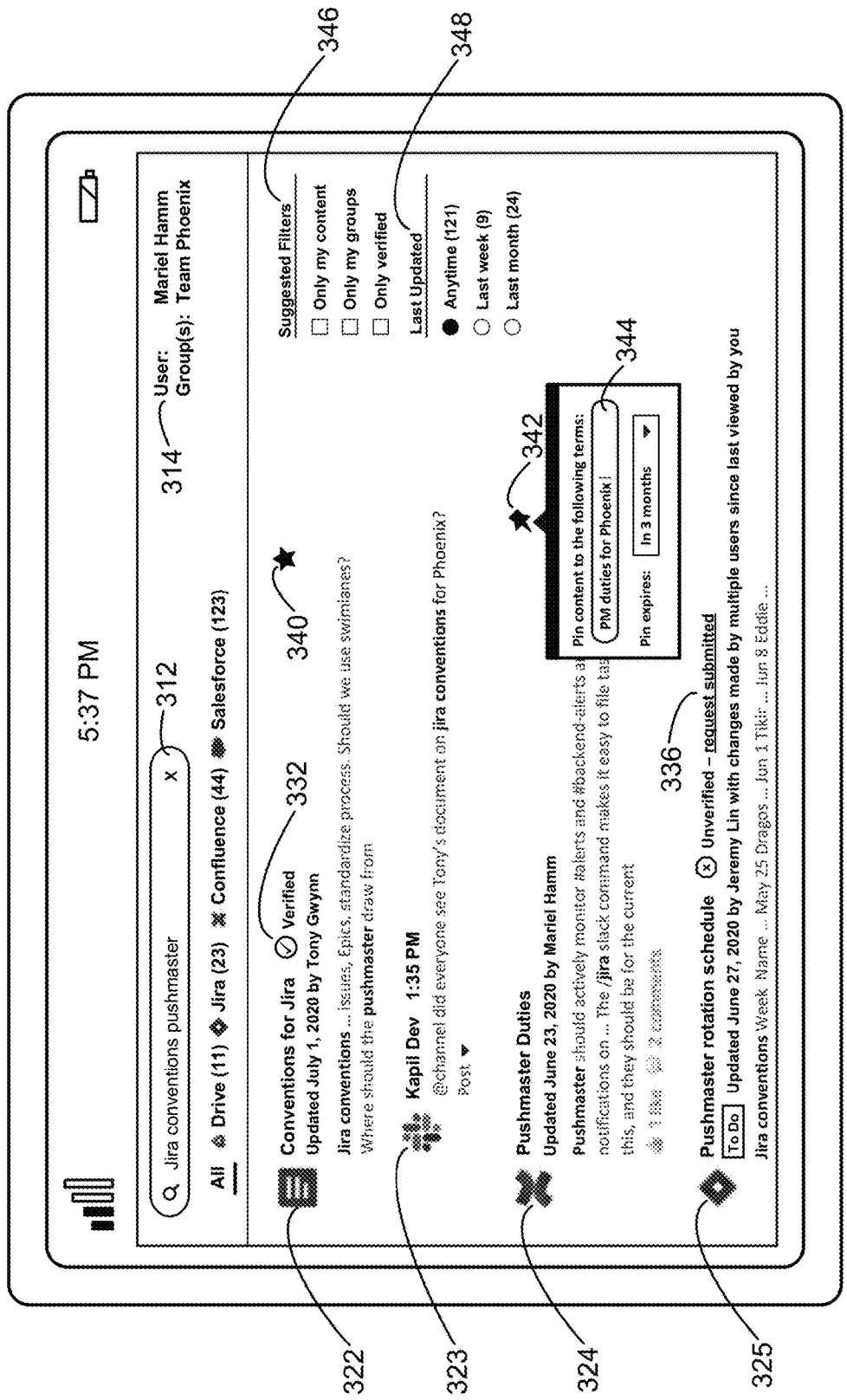
FIG. 3D depicts one embodiment of the mobile device in FIG. 3C after the user has starred a search result and submitted a verification request.

FIG. 3D depicts one embodiment of the mobile device 302 in FIG. 3C after the user has selected the star icon 340 and selected the verification request widget or button 334 in FIG. 3C. In response, the user interface displays that the fourth search result 325 remains unverified and displays a verification request submission widget or button 336 to indicate that a verification request has been submitted to an owner of the content for the fourth search result 325. As depicted, the user has selected the pin icon 342 to pin the content underlying the third search result 324 to the user-specified search query 344 of "PM duties for Phoenix" for a period of three months. In some cases, the user may specify either a particular date or a particular period of time until the pin expires. The user-specified search query 344 includes the acronym "PM" and a term "Phoenix" that are not included within the linked content and that are not derivable from the linked content. The term "Phoenix" may be deemed to not be derivable from the linked content if a semantic match does not exist between the term and the linked content. In some embodiments, the content for the third search result 324 may be pinned to the user-specified search query through the search results page, the dashboard page, or applications for editing or displaying the content.

Figure 3E:
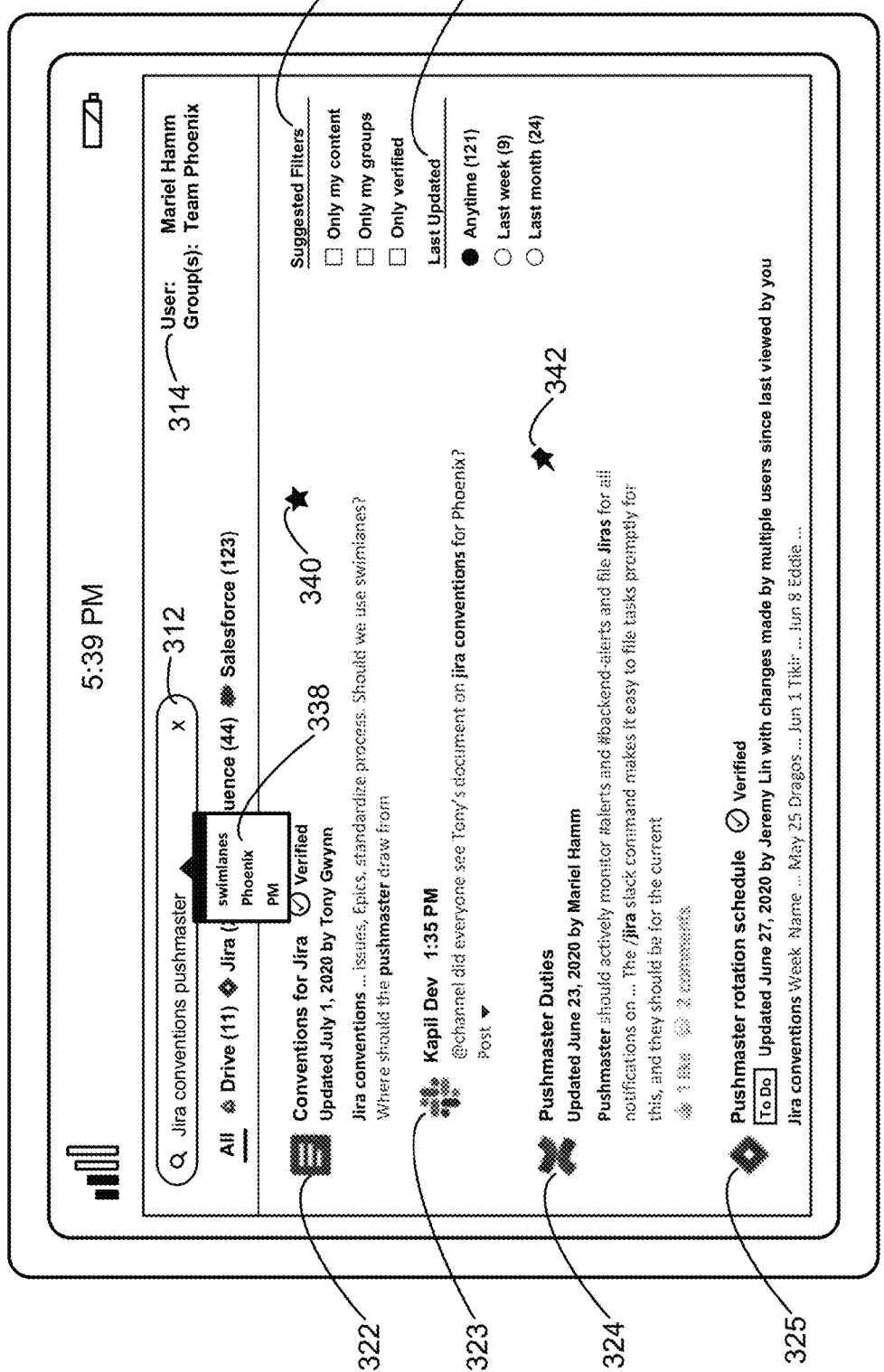
FIG. 3E depicts one embodiment of the mobile device in FIG. 3D after the user has pinned content to a user-specified search query.

FIG. 3E depicts one embodiment of the mobile device 302 in FIG. 3D after the user has pinned the content for the third search result 324 to the user-specified search query 344 in FIG. 3D. As depicted, the user interface may provide potential additional search terms 338 including "swimlanes," "Phoenix," and "PM" to be displayed such that the user may easily view and select a suggested search term to be included within the search terms in the search bar 312. The potential additional search terms 338 may include terms or words that appear in pinned search queries. For example, the acronym "PM" and the term "Phoenix" may be added as potential additional search terms because of the pinned user-specified search query 344 in FIG. 3D. The automatically suggested additional search terms may be customized on a per user or per group basis such that terms coined by the user and terms that are unique to the lexicography of the user's group associations are captured (e.g., acronyms that have meaning to members of Team Phoenix). The potential additional search terms 338 may include terms or words that are only derivable from pinned search queries, such as when those terms or words only appear in pinned search queries from either the user or group members (e.g., other users that are assigned to the same group or group identifier). The potential additional search terms 338 may include terms or words that do not appear or exist within either the underlying content or the metadata for the content. In one embodiment, the potential additional search terms 338 may include terms or words from pinned search queries only if the underlying content has been verified by the content owners.

Figure 3F:
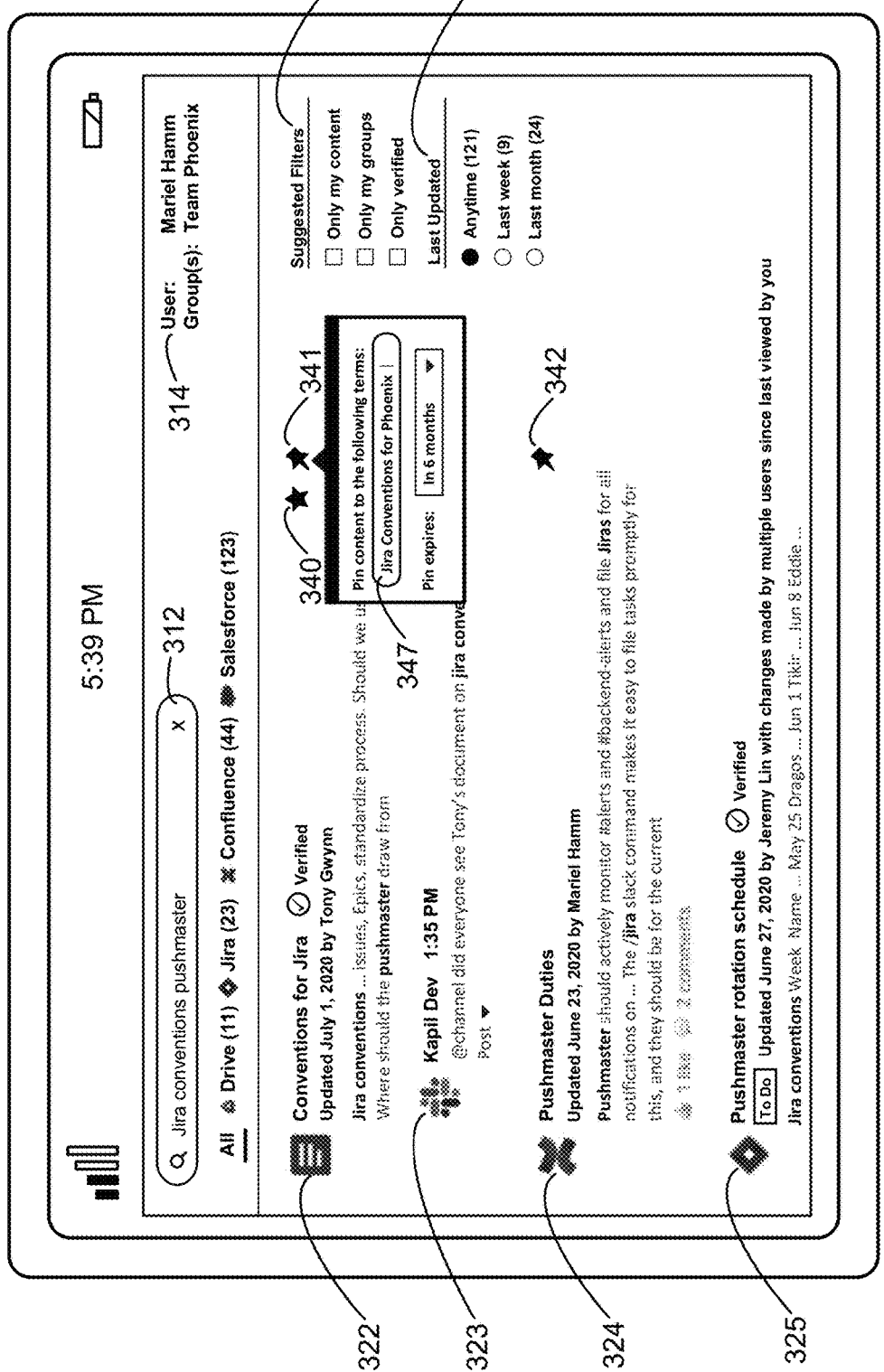
FIG. 3F depicts one embodiment of the mobile device in FIG. 3E after the user has pinned the content for a first search result to a user-specified search query.

FIG. 3F depicts one embodiment of the mobile device 302 in FIG. 3E after the user has pinned the content for the first search result 322 to the user-specified search query 347. As depicted, the user has selected the pin icon 341 to pin the content underlying the first search result 322 to the user-specified search query 347 of "Jira Conventions for Phoenix" for a period of six months. Thus, the search user may pin content to which they do not have ownership permissions to a user-specified search query.

Figure 4A:
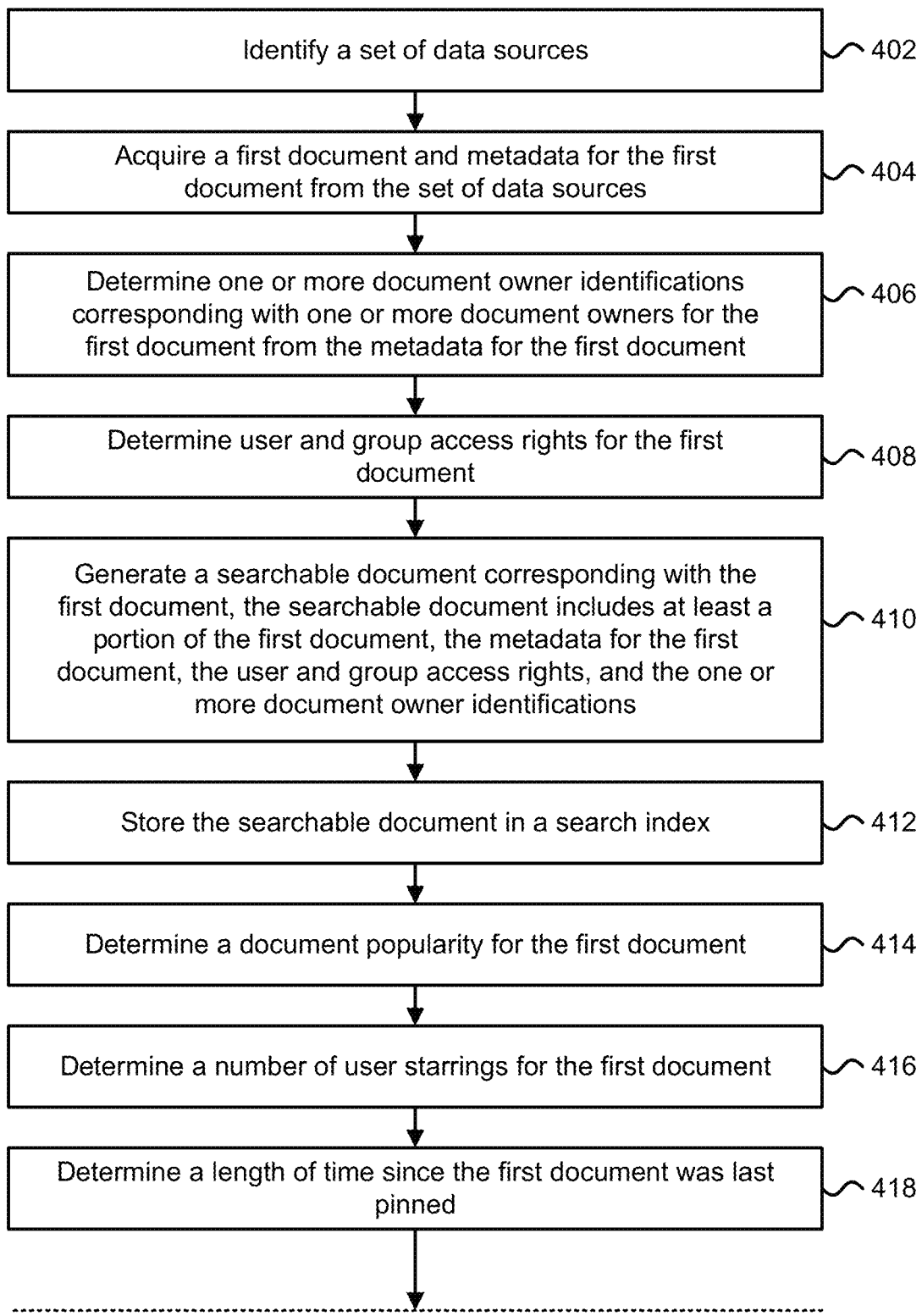
FIGS. 4A-4C depict a flowchart describing one embodiment of a process for aggregating, indexing, storing, and updating digital content that is searchable using a permissions-aware search and knowledge management system.
Figure 4B:
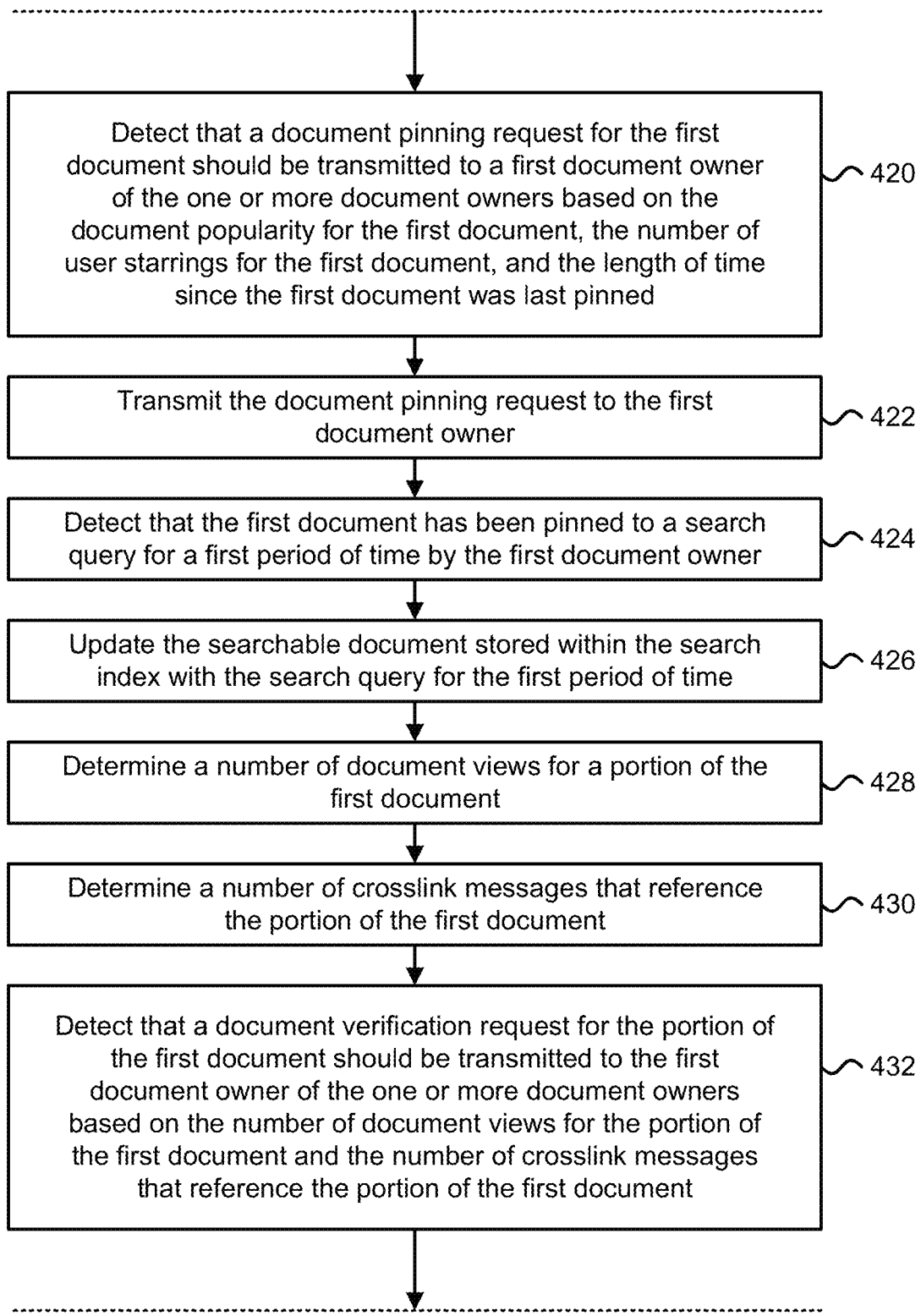
Figure 4C:
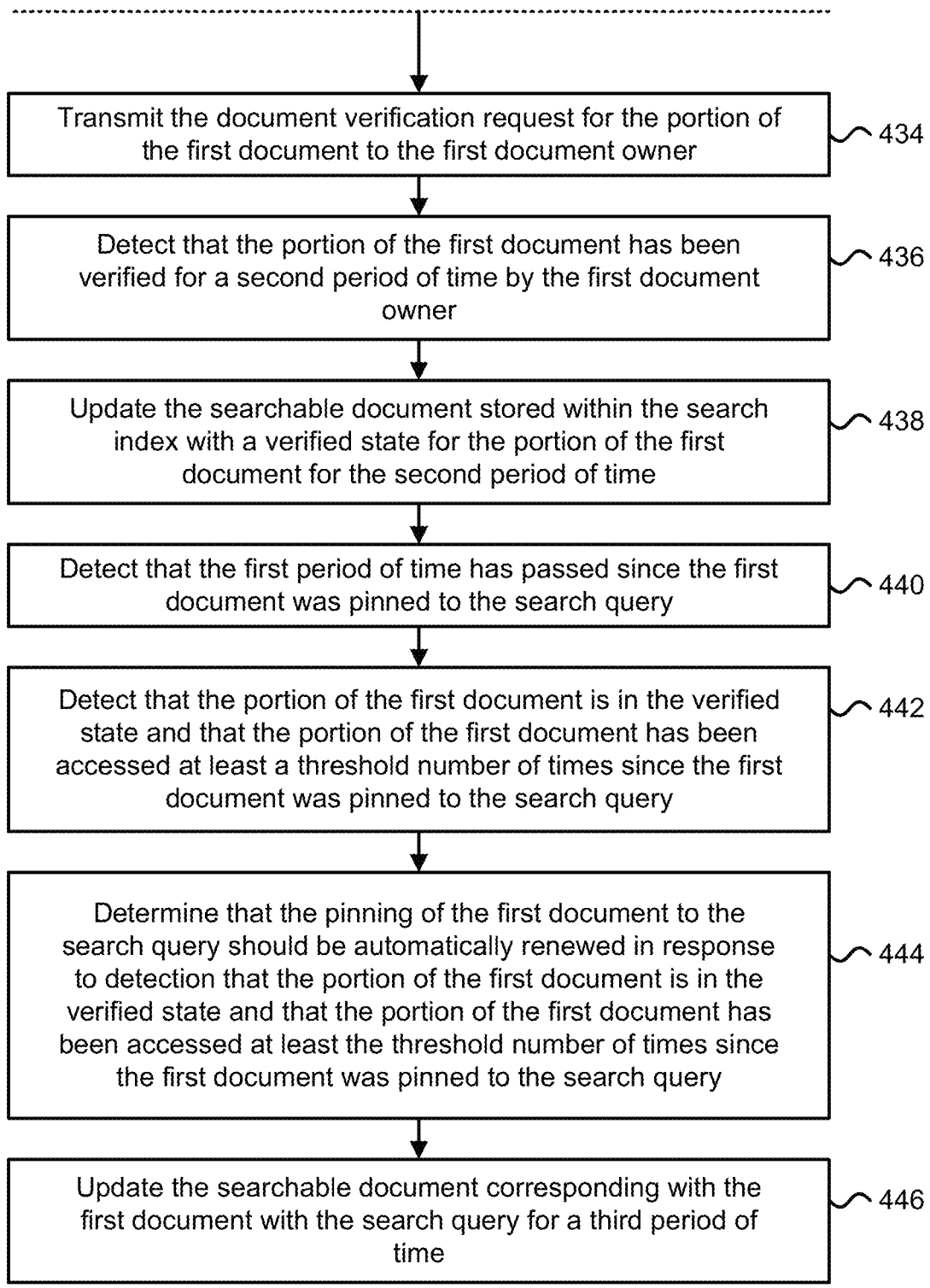

FIGS. 4A-4C depict a flowchart describing one embodiment of a process for aggregating, indexing, storing, and updating digital content that is searchable using a permissions-aware search and knowledge management system. Upon the detection of triggering conditions, the permissions-aware search and knowledge management system may automatically send or transmit document pinning requests and document verification requests to document owners to improve the quality of search results. In one embodiment, the process of FIGS. 4A-4C may be performed by a search and knowledge management system, such as the search and knowledge management system 120 in FIG. 1 or the search and knowledge management system 220 in FIG. 2A. In another embodiment, the process of FIGS. 4A-4C may be performed using a cloud-based computing platform or various cloud-based computing and data storage services.

In step 402, a set of data sources is identified. The set of data sources may correspond with data sources 140 in FIG. 1 or the data sources 240 in FIG. 2A. The set of data sources may comprise one or more sources of digital content including computers, servers, databases, document management systems, cloud-based file synchronization and storage services, cloud-based productivity applications, electronic messaging applications, and team collaboration applications. A search and knowledge management system, such as the search and knowledge management system 220 in FIG. 2A, may detect new data sources that are added to the set of data sources and periodically crawl or poll the set of data sources for new, updated, and deleted digital content. In step 404, a first document and metadata for the first document are acquired from the set of data sources. In one example, the first document may comprise an electronic document and the metadata may include data specifying the file size of the document, the number of words in the document, the number of pages in the document, an identification of the author of the document, a timestamp corresponding with when the document was last updated, and access rights or permissions for the document.

In step 406, one or more document owner identifications corresponding with one or more document owners for the first document are determined from the metadata for the first document. In one example, the one or more document owner identifications may comprise three different usernames associated with three users that have both read and write access to the first document. In another example, the one or more document owner identifications may comprise a single username associated with a user with ownership permissions for the first document. The one or more document owners for the first document may be specified in an access control list for the first document. In step 408, user and group access rights for the first document are determined. The access control list for the first document may specify the users and groups that have read access and write access to the first document. In step 410, a searchable document corresponding with the first document is generated. The searchable document may be generated by a document builder pipeline, such as the document builder pipeline 206 in FIG. 2B, that transforms or augments the first document. The searchable document may include portions of text from the first document, a summary of the contents of the first document, keywords from the first document, and a pinned search query for the first document. In the event that the first document includes two or more document owners, then two or more different pinned search queries corresponding with the two or more document owners may be written to the searchable document. In some cases, the searchable document may include at least a portion of the first document, the metadata for the first document, the user and group access rights for the first document, and the one or more document owner identifications corresponding with the one or more document owners for the first document.

In step 412, the searchable document is stored in a search index. In one example, the search index may correspond with the search index 204 in FIG. 2B. In step 414, a document popularity for the first document is determined. The document popularity may correspond with a number of different users that have accessed the first document within a particular period of time (e.g., within the past week). In step 416, a number of user starrings for the first document is determined. The number of user starrings may comprise the number of different users of the search and knowledge management system that have performed a search and then selected a star icon, such as the star icon 340 in FIG. 3D, to indicate the user's best search result for the entered search query for the search. In step 418, a length of time is determined since the first document was last pinned. In some cases, a document that has been recently pinned (e.g., within the past two days) may receive a boosted ranking or score.

In step 420, it is detected that a document pinning request for the first document should be transmitted to a first document owner of the one or more document owners based on the document popularity for the first document, the number of user starrings for the first document, and/or the length of time since the first document was last pinned. In one example, the document pinning request may correspond with the first suggested action 306 in FIG. 3A to set a document pin. In step 422, the document pinning request is transmitted to the first document owner. In step 424, it is detected that the first document has been pinned to a search query for a first period of time by the first document owner. In step 426, the searchable document stored within the search index is updated with the pinned search query for the first period of time. In one example, the first document may be pinned to a user-specified search query, such as the user-specified search query 344 in FIG. 3D, for a period of three months. In one embodiment, the pinned search query may include one or more terms that are added as heavily weighted keywords for the first document.

In step 428, a number of document views for a portion of the first document is determined. In one example, the number of document views for the portion of the first document may correspond with the number of document views (or document accesses) made by group members that belong to the same group as a user of the search and knowledge management system. In step 430, a number of crosslink messages that reference the portion of the first document is determined. In one example, the portion of the first document may correspond with one or more pages of the first document (e.g., pages two and three of the first document out of twenty pages total). In another example, the portion of the first document may correspond with one or more paragraphs of the first document less than all of the paragraphs within the first document. In step 432, it is detected that a document verification request for the portion of the first document should be transmitted to the first document owner of the one or more document owners based on the number of document views for the portion of the first document and/or the number of crosslink messages that reference the portion of the first document.

In step 434, the document verification request for the portion of the first document is transmitted to the first document owner. In step 436, it is detected that the portion of the first document has been verified for a second period of time by the first document owner. In one example, the document verification request may correspond with the second suggested action 308 in FIG. 3A to verify only a subset of pages of a document less than all of the pages of the document. In step 438, the searchable document stored within the search index is updated with a verified state for the portion of the first document for the second period of time. The portion of the first document may comprise one or more pages of the first document less than all the pages of the first document and the second period of time may comprise three weeks.

In step 440, it is detected that the first period of time has passed since the first document was pinned to the search query. In step 442, it is detected that the portion of the first document is in the verified state and that the portion of the first document has been accessed or viewed at least a threshold number of times since the first document was pinned to the search query. In one example, it may be detected that the portion of the first document has been accessed at least ten times by users with ten different usernames or user identifiers. In step 444, it is determined that the document pinning of the first document to the search query should be automatically renewed in response to detection that the portion of the first document is in the verified state and/or that the portion of the first document has been accessed at least a threshold number of times since the first document was pinned to the search query. In step 446, the searchable document corresponding with the first document is updated with the search query for a third period of time (e.g., for an additional week or a third period of time less than the first period of time). In this case, the updating of the first document with the pinned search query for the third period of time may correspond with the automatic renewal of the document pinning made in step 426.

Figure 5A:
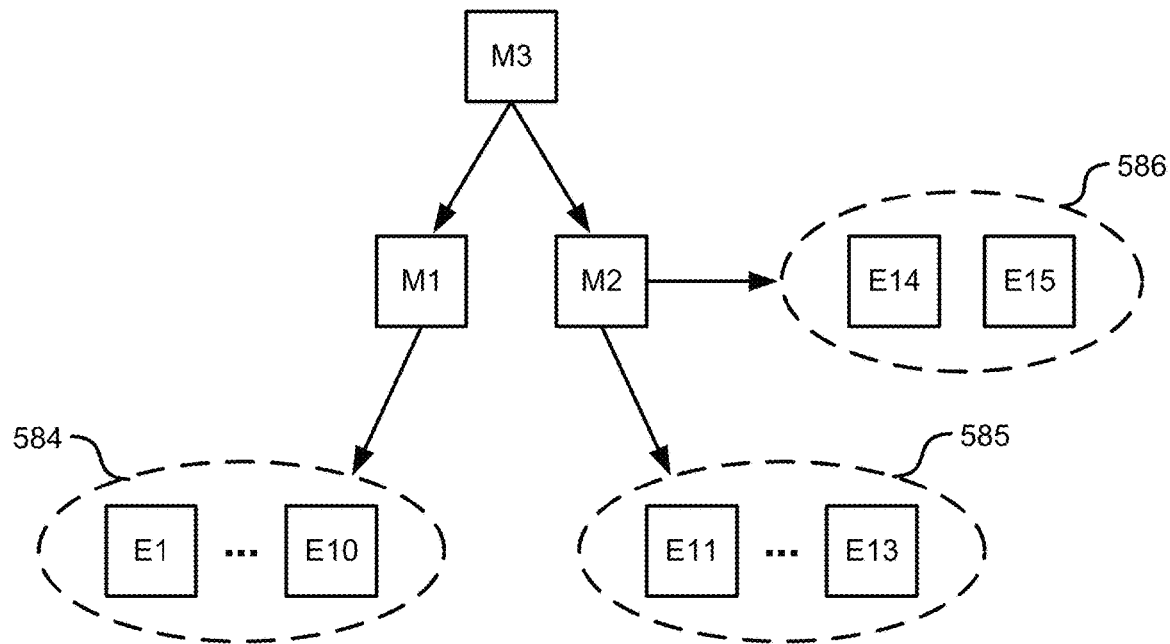
FIG. 5A depicts one embodiment of a directed graph with nodes corresponding with members or individuals of an organization.

FIG. 5A depicts one embodiment of a directed graph with nodes corresponding with members or individuals of an organization. The organization may comprise different groups of individuals. The directed graph may represent a group hierarchy of those different groups. As depicted, the organization includes employees E1 through E15 and managers M1 through M3. The directed edges from manager M3 to managers M1 and M2 represent a hierarchical structure in which managers M1 and M2 report to manager M3. Similarly, employees E1 through E10 report to manager M1 and employees E11 through E15 report to manager M2. Employees E1 through E10 have been assigned to a first group 584. Employees E11 through E13 have been assigned to a second group 585. Employees E14 and E15 have been assigned to a third group 586. As depicted in FIG. 5A, the number of individuals assigned to the first group 584 comprises ten individuals, the number of individuals assigned to the second group 585 comprises three individuals, and the number of individuals assigned to the third group 586 comprises two individuals. A relationship distance between two individuals (e.g., between two different employees) may correspond with the number of edges between the two individuals within the directed graph. In one example, the relationship distance between employee E1 and manager M3 is two. In another example, the relationship distance between employee E1 and employee E11 is four. In another example, the relationship distance between employee E1 and employee E11 is four. In another example, the relationship distance between employee E1 and employee E10 is zero.

In one embodiment, the ranking of documents that have been verified by individuals within the same group as a search query submitter may be ranked above other documents that have not been verified, that have not been set into a verified state, or that have been only verified by individuals outside the group (e.g., by individuals that have not been assigned to the same group). In one example, search results for a search query submitted by employee E1 may rank documents verified by employees E2 through E10 above other documents verified by employees E11 through E15. In another embodiment, the ranking of documents that have been verified by individuals within the same group or that are within a relationship distance of one (e.g., at most one edge separates the individuals) as a search query submitter may be ranked above other documents that have not been set into a verified state or that have been verified by other individuals that have a relationship distance of two or more from the search query submitter.

In one embodiment, during the ranking of relevant documents for a search query, the weighting of documents that have pinned search queries from individuals within the same group as a search query submitter may be ranked above other documents that have not been pinned or that have pinned search queries from individuals that do not belong to the same group as the search query submitter. In one example, search results for a search query submitted by employee E1 may rank a first document with a matching pinned search query by employee E2 higher than a second document with a matching pinned search query by employee E14. The matching pinned search query may comprise a semantic match between the pinned search query and the submitted search query. In another embodiment, the ranking of documents that have pinned search queries from individuals within the same group or that are within a relationship distance of two (e.g., at most two edges separates the individuals) of the search query submitter may be ranked above other documents that do not have pinned search queries or that have pinned search queries from other individuals that have a relationship distance of three or more from the search query submitter.

Figure 5B:
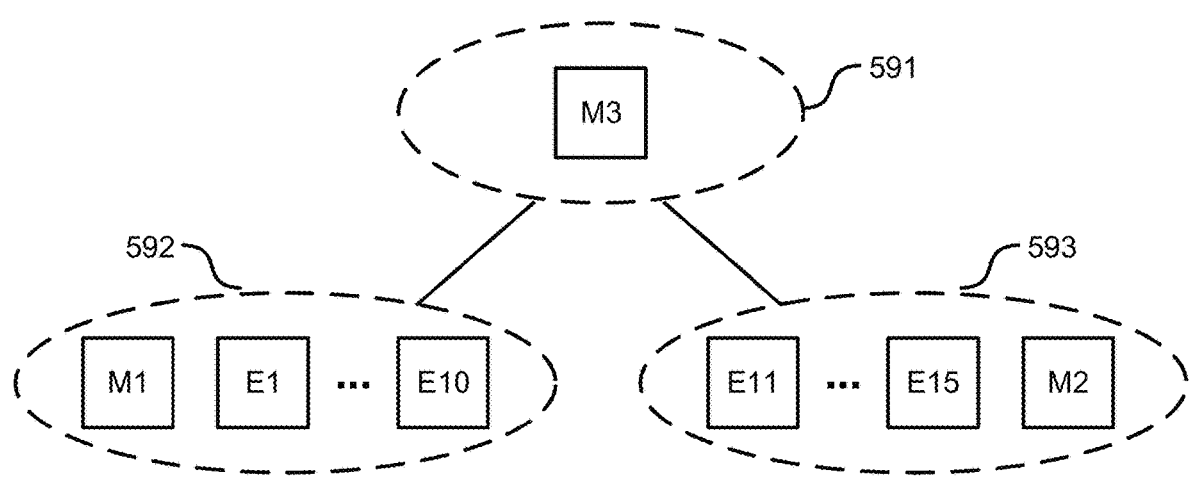
FIG. 5B depicts one embodiment of an undirected graph with nodes corresponding with the employees E1 through E15 and managers M1 through M3.

FIG. 5B depicts one embodiment of an undirected graph with nodes corresponding with the employees E1 through E15 and managers M1 through M3. The undirected edges represent group relationships between different groups of individuals (e.g., project groupings of individuals). As depicted, manager M1 and employees E1 through E10 may be assigned to a first project group 592 and manager M2 and employees E11 through E15 may be assigned to a second project group 593. The number of individuals assigned to the first project group 592 comprises 11 individuals and the number of individuals assigned to the second project group 593 comprises six individuals. Both the first project group 592 and the second project group 593 may comprise children groups under a parent group 591 that comprises manager M3. In this case, a relationship distance between manager M1 and manager M2 may correspond with the two edges separating the first project group 592 from the second project group 593.

In some embodiments, for a searchable document stored within a search index, the popularity of the document as a function of user activity may be determined based on the user activity of the search query submitter and the user activity of fellow group members over a period of time (e.g., over the past two weeks). The period of time over which the document popularity is determined may be set based on the number of individuals within the group assigned to the search query submitter. In one embodiment, the time period for gathering user activity statistics may be adjusted from a first number of days (e.g., 30 days) to a second number of days (e.g., 60 days) greater than the first number of days if a group has less than ten individuals assigned to it. If the size of the group that the search query submitter belongs to is less than ten people, then the user activity statistics for calculating document popularity may be taken over a longer time duration. In reference to FIG. 5A, the time period for gathering user activity statistics for determining document popularity may be set to 30 days if employee E1 performs a search because the first group 584 has ten or more individuals and set to 60 days if employee E14 performs a search because the third group 586 has less than ten individuals assigned to it.

In another embodiment, the number of groups used to calculate document popularity may be determined based on the number of individuals within the group assigned to the search query submitter. In one example, if the group size of the group assigned to the search query submitter is greater than or equal to ten individuals, then the user activity statistics may be acquired from only the immediate group to which the search query submitter is assigned; however, if the group size of the group assigned to the search query submitter is less than ten individuals, then the user activity statistics may be acquired from the immediate group to which the search query submitter is assigned and from other groups that are closely related to the immediate group (e.g., that have a relationship distance that is two or less). In reference to FIG. 5A, document popularity may be determined using the user activity statistics from only the first group 584 if employee E1 performs a search because the first group 584 has ten or more individuals, whereas document popularity may be determined using the user activity statistics from the second group 585 and the third group 586 if employee E11 performs a search because the second group 585 has less than ten individuals. In this case, the second group 585 and the third group 586 have a relationship distance of two (e.g., are separated by two edges).

In another embodiment, the number of groups used to calculate document popularity may be determined based on the total number of searches over a period of time (e.g., within the past week) performed by individuals within the group assigned to the search query submitter and/or other groups within an organization. In reference to FIG. 5A, if a search is performed by employee E11 and the number of searches performed by the individuals in the second group 585 over the past week is greater than 400, then document popularity may be determined using the user activity statistics from only the second group 585; however, if a search is performed by employee E11 and the number of searches performed by the individuals in the second group 585 over the past week is not greater than 400, then document popularity may be determined using the user activity statistics from both the second group 585 and the third group 586 (e.g., taking into consideration the user activity from groups that have a relationship distance of two or less). In some cases, if a search is performed by employee E11 and the number of searches performed by the individuals in the second group 585 and the third group 586 over the past week is not greater than 400, then document popularity may be determined using the user activity statistics from the second group 585, the third group 586, and the first group 584 (e.g., taking into consideration the user activity from groups that have a relationship distance of four or less). The relationship distance may be increased and groups added until the number of searches performed by individuals within the groups over the past week is greater than 400 (or some other threshold number of searches).

In another embodiment, the number of groups used to calculate document popularity may be determined based on the amount of user activity over a period of time (e.g., over the past two weeks) performed by individuals within the group assigned to the search query submitter and/or other groups within an organization. The amount of user activity may be associated with a user activity score for a particular individual or individuals within the group assigned to the search query submitter. The user activity score may comprise a summation of various user activity metrics, such as the summation of a first number of recent document downloads, a second number of likes, a third number of shares, and a fourth number of comments. In one example, the second number of likes and the fourth number of comments may correspond with likes and comments made in a persistent chat channel by individuals within a group assigned to the search query submitter. In reference to FIG. 5A, if a search is performed by employee E11 and the user activity score for the individuals in the second group 585 over the past two weeks is greater than 2000, then document popularity may be determined using the user activity statistics from only the second group 585; however, if a search is performed by employee E11 and the user activity score for the individuals in the second group 585 over the past two weeks is not greater than 2000, then document popularity may be determined using the user activity statistics from both the second group 585 and the third group 586 (e.g., by increasing the maximum relationship distance to two and taking into consideration the user activity from groups that have a relationship distance of at most two from the group assigned to the search query submitter). The maximum relationship distance from the group assigned to the search query submitter may be incrementally increased and groups added until the user activity score for individuals within the groups over the past two weeks is greater than 2000.

Figure 5C:
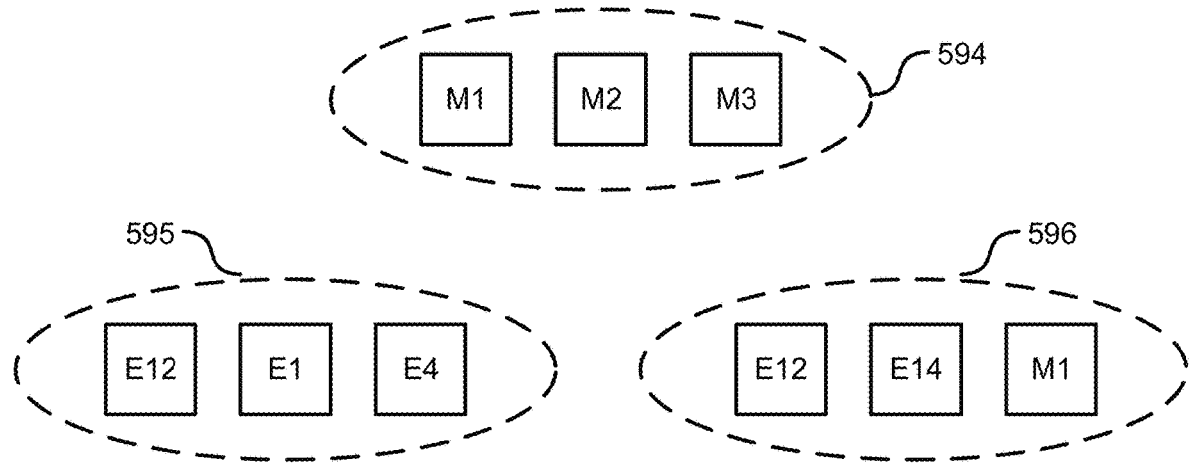
FIG. 5C depicts one embodiment of a plurality of people clusters.

FIG. 5C depicts one embodiment of a plurality of people clusters corresponding with subsets of the employees E1 through E15 and managers M1 through M3. The assignment of individuals to a particular people cluster may be determined based on collaboration activity. In some cases, a close working relationship may be inferred due to frequent collaboration on documents or tickets and/or frequent work-related communication within a communication channel. As depicted, managers M1-M3 have been assigned to a first people cluster 594 because they each co-edited or viewed a set of documents during a first time period. In one example, managers M1-M3 may have co-edited a spreadsheet for at least a week. Employees E12, E1, and E4 have been assigned to a second people cluster 595 because they have messaged each other within a persistent chat channel at least twenty times within the past three days. Manager M1, employee E12, and employee E14 have been assigned to a third people cluster 596 because they have co-edited a word processing document together for at least two weeks. Although the individuals within the third people cluster 596 do not all share the same manager or have not been assigned to the same group membership, the third people cluster 596 has been automatically created due to the degree of collaboration activity with the word processing document.

Figure 5D:
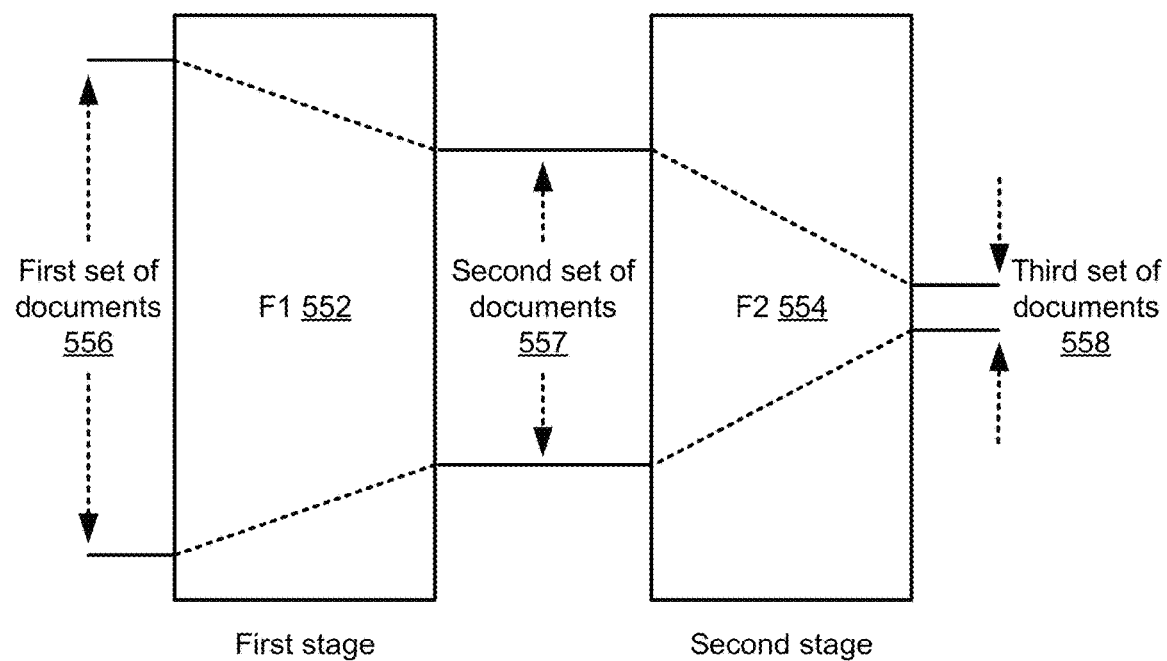
FIG. 5D depicts one embodiment of a staged approach for identifying sets of relevant documents for a given search query.

FIG. 5D depicts one embodiment of a staged approach for identifying sets of relevant documents for a given search query. The search query may include one or more search query terms. As depicted, a second set of documents 557 is selected from a first set of documents 556 using a first scoring function F1 552 to generate a first set of relevance scores for the first set of documents 556. The second set of documents 557 may comprise a subset of the first set of documents 556 that have relevance scores above a first threshold score. The first scoring function F1 552 may generate the first set of relevance scores using a first set of ranking factors, such as the presence of one or more search query terms within a title or summary of a document, how recently a document was updated with one or more search query terms, the term frequency or the number of times that one or more search query terms appear within a document, the source rating for a document, and a term proximity for one or more search query terms within a document. In one example, the first set of documents 556 may comprise searchable documents within a search index and a first set of relevance scores may be generated for the searchable documents within the search index using the first scoring function F1 552. The first set of documents 556 may then be ranked using the first set of relevance scores and a subset of the first set of documents 556 may be identified with at least the first threshold score. The first threshold relevance score may be set such that the second set of documents 557 comprises a particular percentage (e.g., ten percent) of the first set of documents 556.

Subsequently, a third set of documents 558 is selected from the second set of documents 557 using a second scoring function F2 554 to generate a second set of relevance scores for the second set of documents 557. The third set of documents 558 may comprise a subset of the second set of documents 557 that have relevance scores above a second threshold score. The second scoring function F2 554 may generate a second set of relevant scores using a second set of ranking factors. In one example, the number of ranking factors used for the second set of ranking factors may be greater than the number of ranking factors used for the first set of ranking factors. The second set of documents 557 may be ranked using the second set of relevance scores and a subset of the second set of documents 557 may be identified with at least the second threshold score.

In some embodiments, the first scoring function F1 552 may only consider a subset of the data associated with the first set of documents 556, such as a few lines of body text, titles, metadata descriptions, and incoming anchor text, while the second scoring function F2 554 may consider all data associated with the second set of documents 557. As the number of documents is reduced, the number of document elements or the amount of data associated with each document during application of a scoring function may be increased. In some cases, a third stage not depicted with a third scoring function may be used to further refine the third set of documents 558 to obtain a fourth set of relevant documents for the given search query.

Figure 5E:
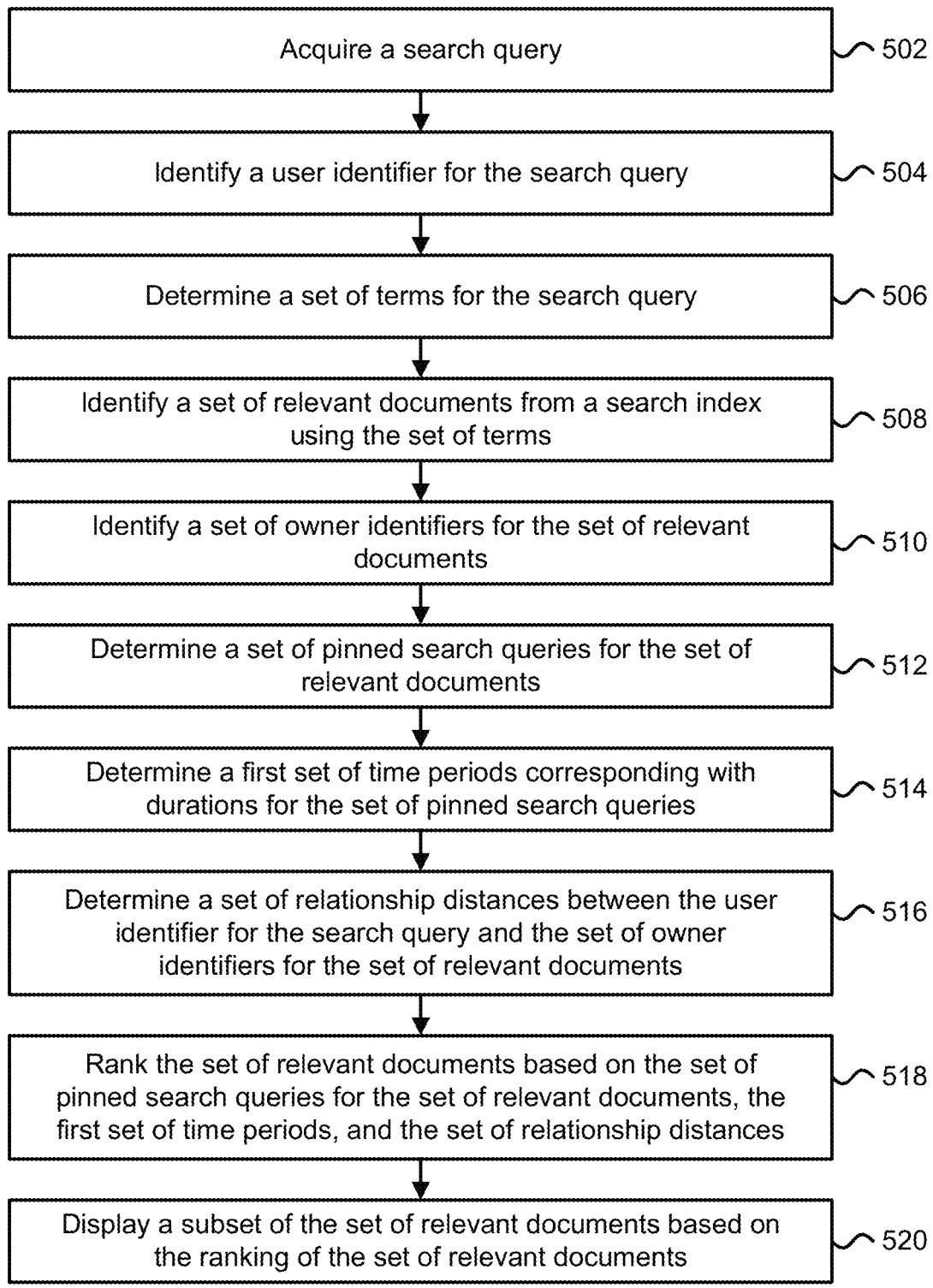
FIG. 5E depicts a flowchart describing one embodiment of a process for generating and displaying search results for a given search query.

FIG. 5E depicts a flowchart describing one embodiment of a process for generating and displaying search results for a given search query. In one embodiment, the process of FIG. 5E may be performed by a search and knowledge management system, such as the search and knowledge management system 120 in FIG. 1 or the search and knowledge management system 220 in FIG. 2A. In another embodiment, the process of FIG. 5E may be implemented using a cloud-based computing platform or cloud-based computing services.

In step 502, a search query is acquired. The search query may be acquired by a search and knowledge management system, such as the search and knowledge management system 220 in FIG. 2A. The search query may be acquired from a computing device, such as computing device 154 in FIG. 1. The search query may be entered on the computing device and submitted to a search and knowledge management system. In step 504, a user identifier for the search query is identified. The search query may be inputted and submitted by a user of a computing device, such as computing device 154 in FIG. 1, using a search bar, such as the search bar 312 in FIG. 3A. The user identifier may correspond with a username for the user, such as the username 314 in FIG. 3A. In step 506, a set of terms for the search query is determined. The set of terms may comprise a set of words or a set of tokens that derive from the search query. In one embodiment, the search query may be acquired as a string of characters and machine learning and/or natural language processing techniques may be used to determine the set of terms from the string of characters.

In step 508, a set of relevant documents is identified from a search index using the set of terms. The set of relevant documents may comprise searchable documents within the search index with at least a threshold relevance score or at least a threshold number of matching terms from the set of terms (e.g., at least two terms within the set of terms are found in each of the set of relevant documents). The relevance score may be calculated for each indexed document within the search index using a number of factors or criteria, such as the presence of one or more terms from the set of terms within a title or summary of an indexed document, whether one or more terms from the set of terms have particular formatting within an indexed document (e.g., whether a term has been underlined or italicized), how recently an indexed document was updated and whether one or more terms of the set of terms were added within a particular period of time (e.g., a searched term was added within the past week), the term frequency or the number of times that one or more terms from the set of terms appears within an indexed document, the source rating for an indexed document (e.g., a word processing document or presentation slides may have a higher source rating than an electronic message), and a term proximity for the set of terms within an indexed document.

In step 510, a set of owner identifiers for the set of relevant documents is identified. Each document within the search index may correspond with one or more document owners. The document owner of a particular document may be identified based on file permissions or access rights to the particular document. In one example, metadata for the particular document may specify a document owner or specify one or more document owners with read and write access to the particular document. In another example, an access control list for the particular document may specify the document owner or specify one or more usernames with read and write access to the particular document.

In step 512, a set of pinned search queries for the set of relevant documents is determined. In one embodiment, at least a subset of the set of relevant documents may have corresponding pinned search queries that were attached by their document owners. In one example, a pinned search query may correspond with the user-specified search query 344 depicted in FIG. 3D. Each pinned search query of the set of pinned search queries may correspond with a pin expiration date. In step 514, a first set of time periods corresponding with durations for the set of pinned search queries is determined. The first set of time periods may correspond with time durations during which the set of pinned search queries are valid. In one example, a first pinned search query of the set of pinned search queries may expire within a week while a second pinned search query of the set of pinned search queries may expire within a month. In another example, a first pinned search query of the set of pinned search queries may correspond with a first time period (e.g., for 15 days) of the first set of time periods during which the first pinned search query is valid and a second pinned search query of the set of pinned search queries may correspond with a second time period (e.g., for 60 days) of the first set of time periods during which the second pinned search query is valid.

In step 516, a set of relationship distances between the user identifier for the search query identified in step 504 and the set of owner identifiers for the set of relevant documents identified in step 510 is determined. In this case, the set of relationship distances may include a first relationship distance that corresponds with the number of edges between a first individual associated with the user identifier and a second individual associated with an owner identifier for one of the set of relevant documents. In step 518, the set of relevant documents is ranked based on the set of pinned search queries for the set of relevant documents, the first set of time periods, and/or the set of relationship distances. The set of relevant documents may be ranked based on search query affinity or similarity with the set of pinned search queries for the set of relevant documents. The ranking of the set of relevant documents may boost documents with recent pinned search queries over other documents with older pinned search queries, may boost documents with pinned search queries that match or have a high degree of similarity with the search query or the set of terms for the search query, and may boost documents with pinned search queries that have a high degree of similarity with the search query that were created by individuals assigned to the same group as the individual with the user identifier for the search query. A pinned search query may have a high degree of similarity with the search query if at least a threshold number of terms (e.g., at least two) appear in both the pinned search query and the search query submitted by the individual with the user identifier.

In one embodiment, documents with pinned search queries from individuals assigned to the same group as the user associated with the user identifier for the search query may be boosted over other documents without pinned search queries or that have pinned search queries from other individuals with relationship distances greater than one. In another embodiment, documents with pinned search queries that were pinned within a past threshold period of time (e.g., within the past week) may be boosted over other documents that were pinned prior to the past threshold period of time (e.g., that were pinned more than a month ago) or that have never been pinned.

In step 520, a subset of the set of relevant documents is displayed based on the ranking of the set of relevant documents. In one example, the subset of the set of relevant documents may comprise the first ten documents with the highest rankings. The subset of the set of relevant documents may be displayed using a display of a computing device, such as the computing device 154 in FIG. 1.

In some embodiments, the set of pinned search queries for the set of relevant documents may comprise one pinned search query for each of the set of relevant documents. In one example, each relevant document of the set of relevant documents may correspond with only one pinned search query (e.g., that was set by a document owner of a relevant document). In other embodiments, a relevant document may correspond with a plurality of pinned search queries that were set by a plurality of users of the search and knowledge management system. In one example, the relevant document may comprise a spreadsheet with a first document pin set by a document owner of the spreadsheet, a second document pin set by a co-worker of the document owner, and a third document pin set by another user of the search and knowledge management system different from the document owner and the co-worker. In some embodiments, a first set of relevant documents that each have at least a first number of document pins (e.g., at least five pins per document) may be boosted over a second set of relevant documents that each have less than the first number of document pins. A higher number of pins per document may correspond with documents with higher value or greater interest within an organization. In other embodiments, a first set of relevant documents that each have had at least a first number of document pins set within a first period of time (e.g., have had at least four pins set within the past week) may be boosted over a second set of relevant documents that have not had at least the first number of document pins set within the first period of time.

Figure 5F:
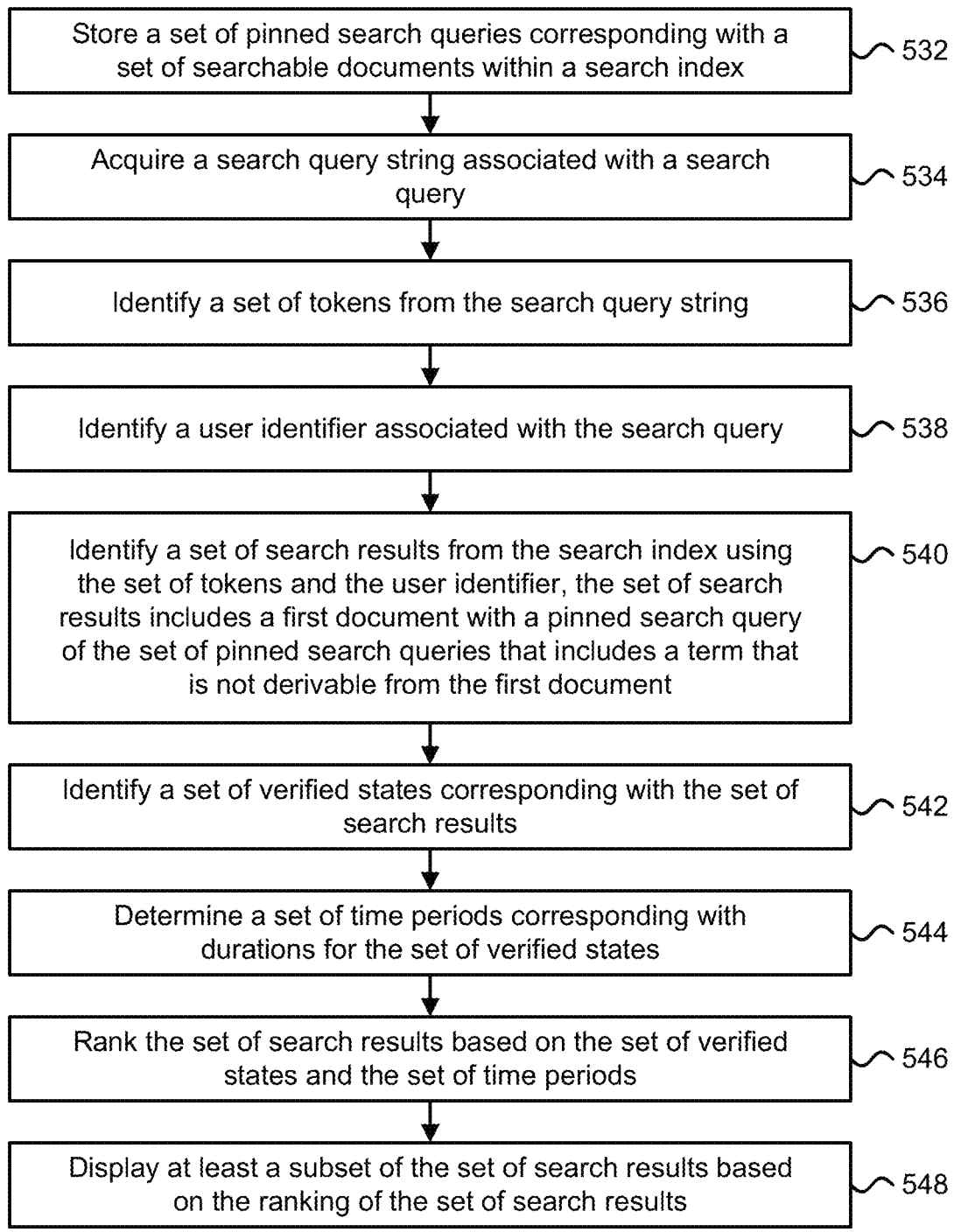
FIG. 5F depicts a flowchart describing an alternative embodiment of a process for generating and displaying search results for a given search query.

FIG. 5F depicts a flowchart describing an alternative embodiment of a process for generating and displaying search results for a given search query. In one embodiment, the process of FIG. 5F may be performed by a search and knowledge management system, such as the search and knowledge management system 120 in FIG. 1 or the search and knowledge management system 220 in FIG. 2A. In another embodiment, the process of FIG. 5F may be implemented using a cloud-based computing platform or cloud-based computing services.

In step 532, a set of pinned search queries corresponding with a set of searchable documents is stored within a search index. The search index may correspond with search index 204 in FIG. 2B. Each searchable document of the set of searchable documents may be pinned to one of the set of pinned search queries. The set of pinned search queries may comprise a first pinned search query that is attached to a first document of the set of searchable documents. The first pinned search query may correspond with the pinned user-specified search query 344 in FIG. 3D. In step 534, a search query string associated with a search query is acquired. The search query string may be entered and submitted via a search bar, such as the search bar 312 in FIG. 3A. In step 536, a set of tokens is identified from the search query string. The set of tokens may comprise a set of words or a set of terms that are derived from the search query string. Natural language processing techniques may be used to identify the set of tokens. In step 538, a user identifier associated with the search query is identified. The user identifier may correspond with a username for the user, such as the username 314 in FIG. 3A. In step 540, a set of search results is identified from the search index using the set of tokens and the user identifier. The set of search results may comprise a set of relevant documents that are classified as relevant to the search query. The set of search results may correspond with searchable content within the search index including electronic files, word processing documents, database records, web pages, and electronic messages. The set of search results may be identified by generating a relevance score for each document within the search index based on the set of tokens and the user identifier and then identifying documents within the search index with a relevance score above a threshold score (e.g., with a relevance score of at least 1500). The user identifier may be used to calculate relationship distances or to determine which documents are owned by other individuals with the same group assignment (e.g., that are in the same group) as the individual with the user identifier in order to boost their relevance scores.

The set of search results may include a first document with a pinned search query of the set of pinned search queries that includes at least one term that is not derivable from the first document. A technical benefit of allowing a search user or a document owner to pin a document to a user-specified search query is that terms that are not found in the document or that cannot be derived from the contents of the document may be specified and subsequently searched in order to find the document or increase the likelihood of finding the document within search results. A term may be deemed to not be derivable from the contents of the document if the term does not comprise a semantic match with at least a portion of the contents or if the term does not comprise a synonym for the contents of the document.

In step 542, a set of verified states corresponding with the set of search results is identified. Each search result (e.g., comprising a link to an electronic document, web page, or message) of the set of search results may be associated with one or more verified states that specify whether the content of the entire search result has been verified and is currently in a verified state or whether only a portion of the content of the search result is currently in the verified state. In step 544, a set of time periods corresponding with time durations for the set of verified states is determined. The set of time periods may be used to determine when a document was verified and how much longer the document will remain in a verified state before the document verification expires. In step 546, the set of search results is ranked based on the set of verified states and the set of time periods. In one embodiment, the ranking of the set of search results may comprise a ranked list of documents from the search index that are ranked based on whether the contents of a document are currently verified, the amount of time that remains until expiration of document verification, and/or the amount of time that has passed since expiration of document verification. In one example, the ranking of the set of search results may boost the ranking scores of documents that are currently verified. In another example, the ranking of the set of search results may boost the ranking scores of documents that are currently verified by a first amount and boost the ranking scores of other documents that were verified and that have not been expired for more than a threshold period of time (e.g., the document verification expired less than a week ago) by a second amount less than the first amount. In some embodiments, the ranking of the set of search results based on their document verification status may be performed as a last stage ranking that boosts the rank of highly relevant documents that were verified by individuals within the same group as the search query submitter.

In step 548, at least a subset of the set of search results is displayed. The subset of the set of search results may comprise the twenty highest ranking search results out of fifty search results. The subset of the set of search results may be displayed using a display of a computing device, such as computing device 154 in FIG. 1.

Figure 6A:
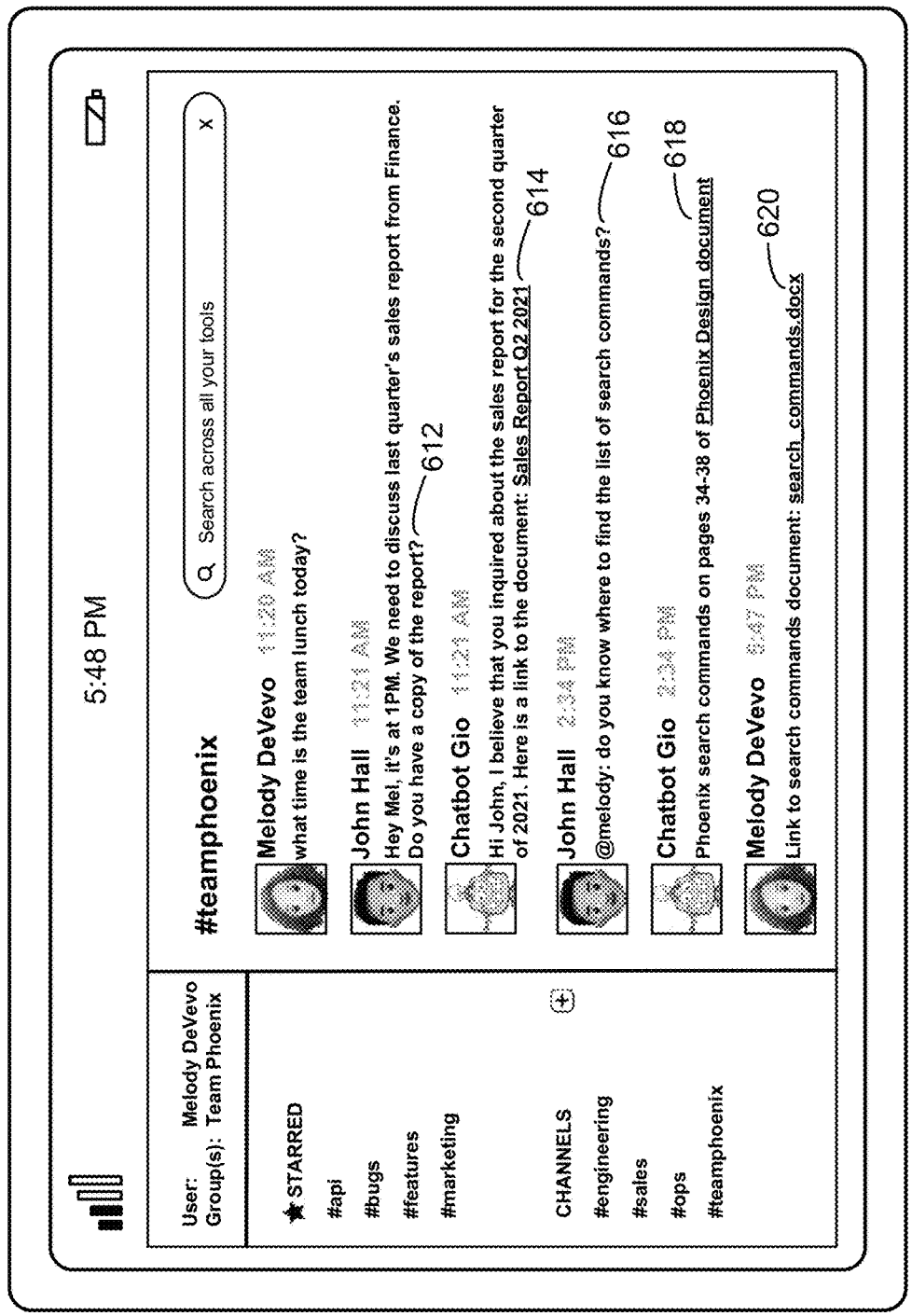
FIGS. 6A-6C depict various embodiments of a mobile device providing a user interface for interacting with messages within a chat channel that utilizes an enterprise knowledge assistant.

FIG. 6A depicts one embodiment of the mobile device 302 in FIG. 3A providing a user interface for interacting with messages within a chat channel that utilizes an enterprise knowledge assistant. One example of the enterprise knowledge assistant corresponds with the knowledge assistant 214 in FIG. 2B. The mobile device 302 may correspond with the computing device 154 in FIG. 1. As depicted, a user (Melody) of the mobile device 302 is viewing a chat channel corresponding with #teamphoenix. Within the #teamphoenix chat channel, a second user (John) has typed a question 612 regarding obtaining a copy of last quarter's sales report and in response the enterprise knowledge assistant (Gio) has automatically responded with an answer 614 that includes a link to a sales report document for Q2 2021. The second user (John) then types a question 616 regarding where to find a list of search commands; as the question 616 was typed within the #teamphoenix chat channel, the enterprise knowledge assistant assumes that the search commands are related to the Team Phoenix group and in response the enterprise knowledge assistant (Gio) displays an answer 618 referencing pages 34-38 of the Phoenix Design document. The enterprise knowledge assistant may automatically identify the pages within a reference document corresponding with an answer to a question by searching for phrases within the document that match or are semantically equivalent to language found within the question.

Referring to FIG. 6A, the user (Melody) provides an answer 620 to the question 616 that includes a second document (search_commands.docx) that is different from the Phoenix Design document referenced in the answer 618. As the answer 620 is not equivalent to or semantically equivalent to the answer 618, the enterprise knowledge assistant may store the answer 620 as a conflicting answer to the question 616 along with the answer 618 within a frequently asked questions database. In some cases, the enterprise knowledge assistant may simply replace the answer 618 within the frequently asked questions database with the answer 620 as the only answer to the question 616. In other cases, the enterprise knowledge assistant may store both the answer 618 and the answer 620 as two different pairings with the question 616. Along with the answer 620 and its reference to the second document (search_commands.docx), the frequently asked questions database may also store a user identifier for the user (Melody) as she was the one to provide the answer 620 within the chat channel.

Figure 6B:
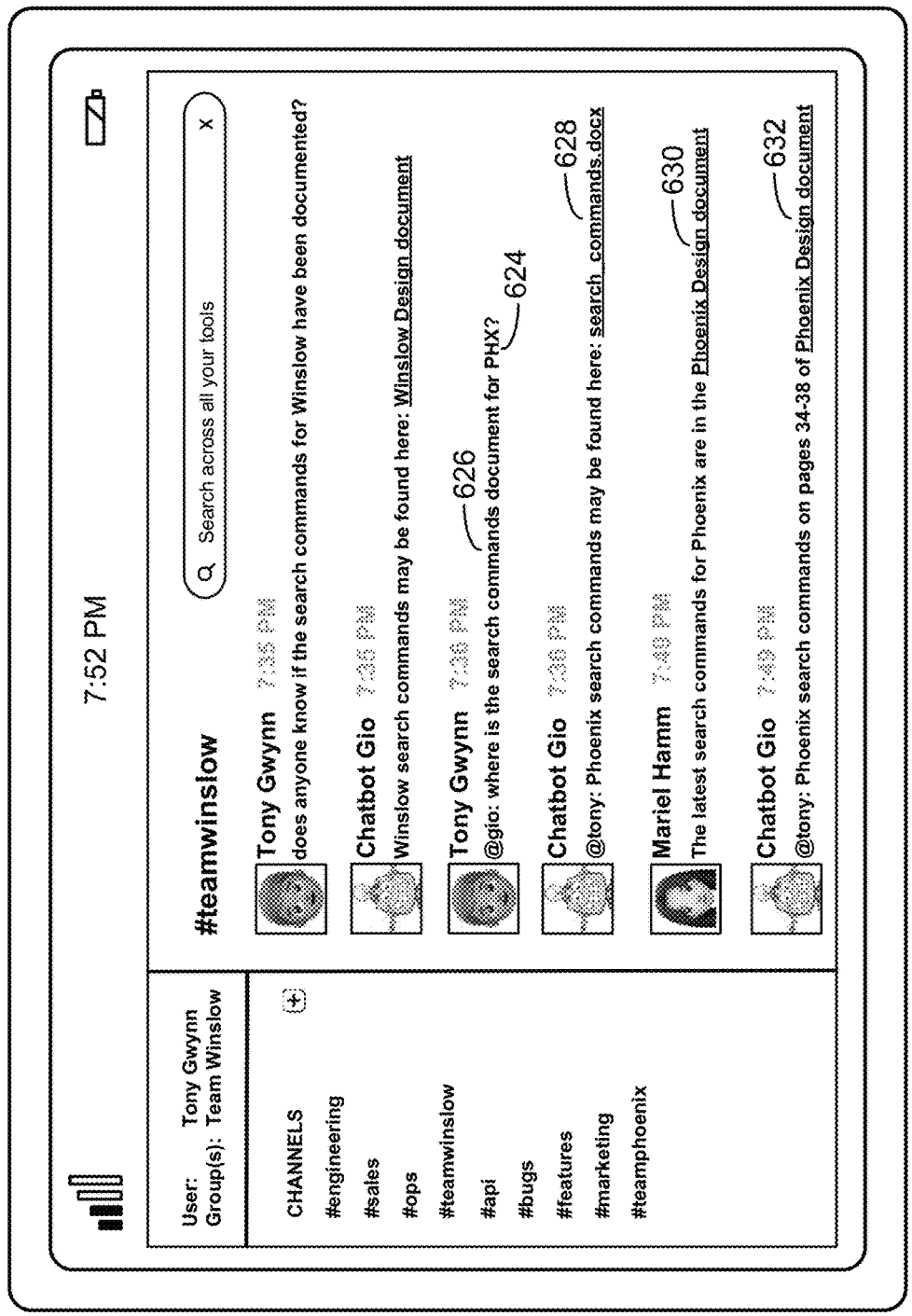
Figure 9E:
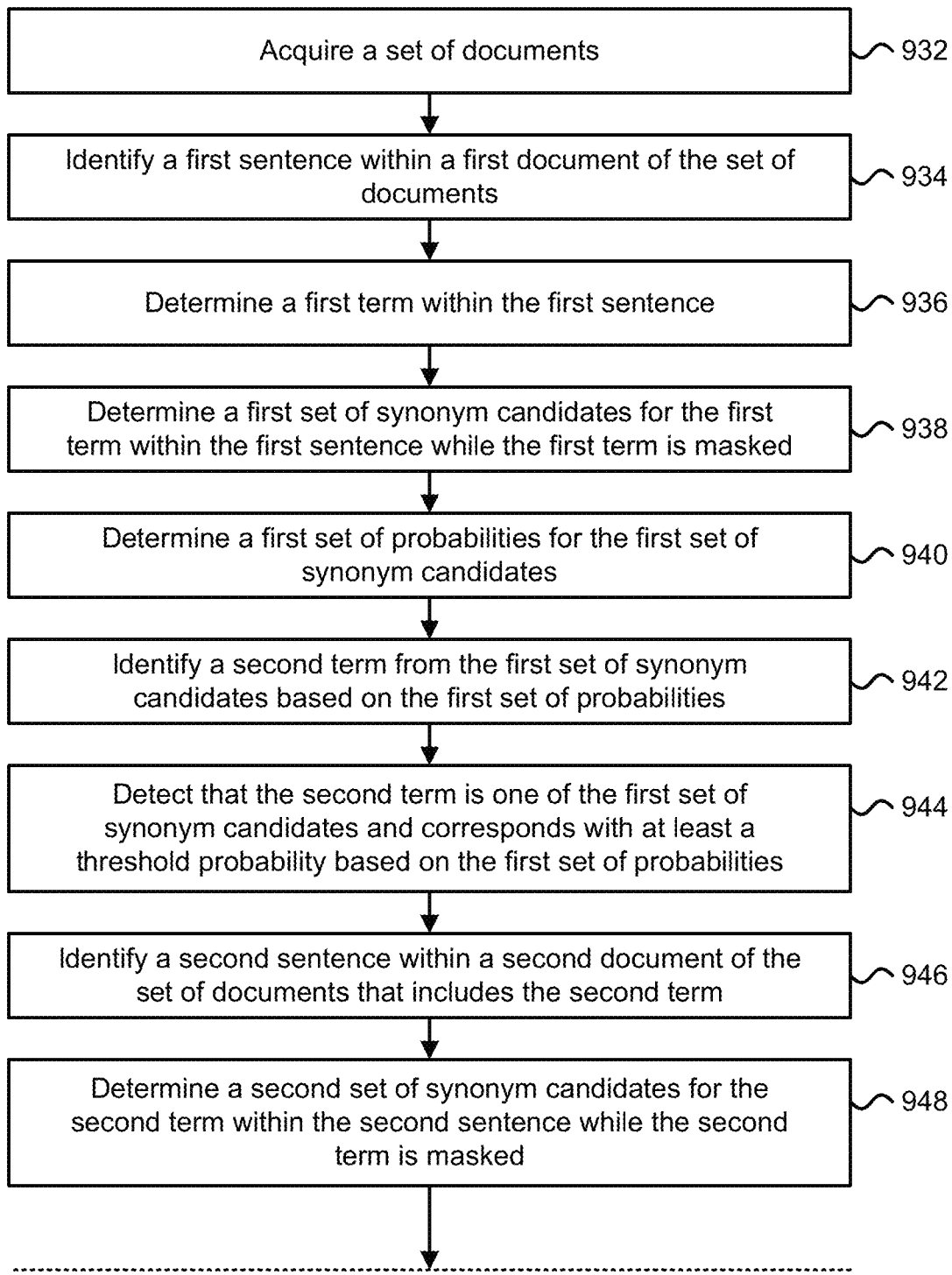
FIGS. 9E-9F depict a flowchart describing one embodiment of a process for identifying enterprise synonyms and leveraging the enterprise synonyms to improve search results.
Figure 9F:
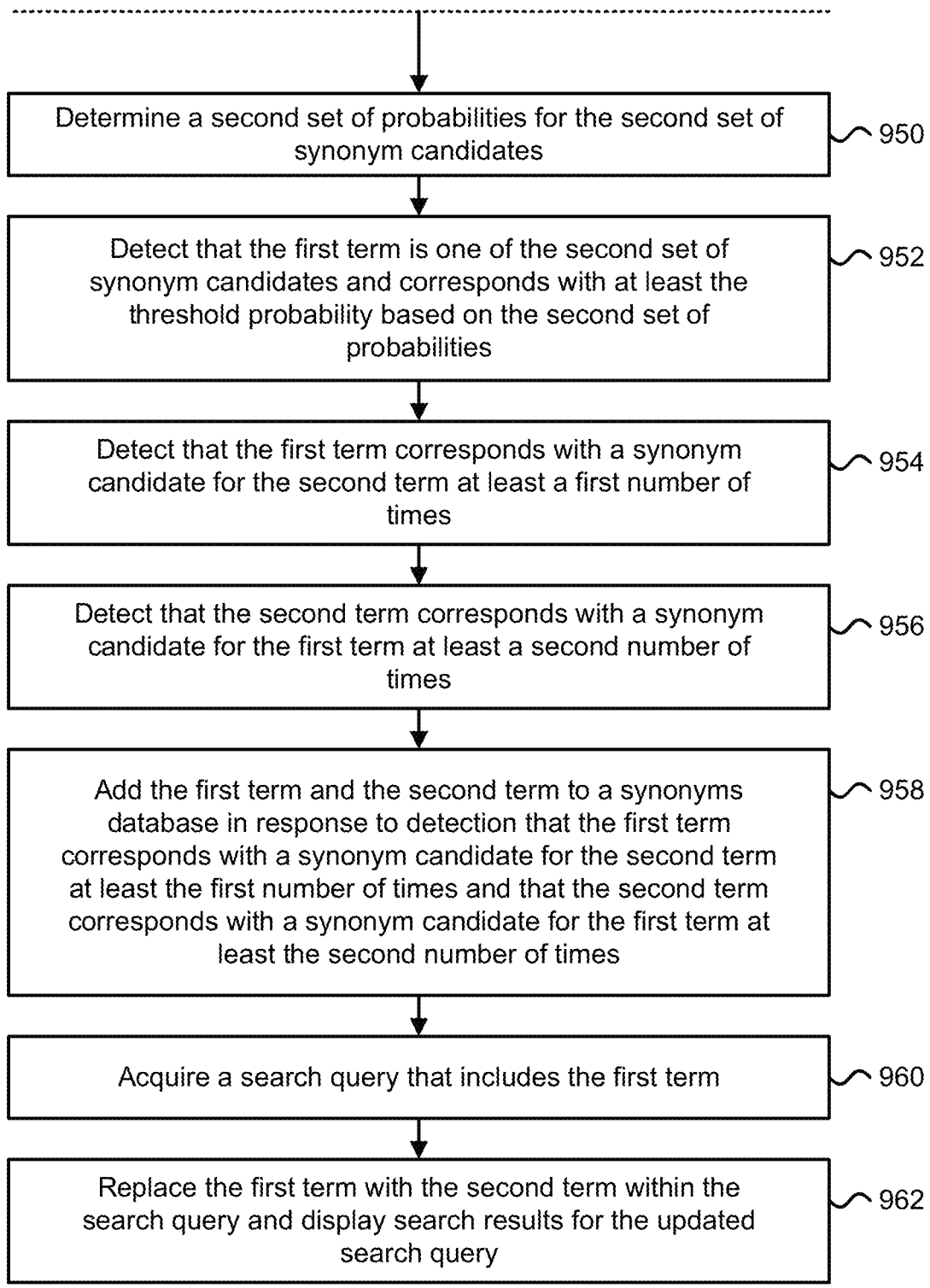

FIG. 6B depicts another embodiment of the mobile device 302 in FIG. 3A providing a user interface for interacting with messages within a chat channel that utilizes an enterprise knowledge assistant, such as the knowledge assistant 214 in FIG. 2B. As depicted, a user (Tony) has provided a question 626 to the enterprise knowledge assistant (Gio) regarding where the search commands document is for the enterprise-specific term PHX 624 that maps to the project name Phoenix (e.g., the synonym mapping may be specified using an enterprise synonyms database). The enterprise synonyms database may correspond with or be part of database DB 215 in FIG. 2B. One example of a process for identifying enterprise-specific synonyms to improve search results is depicted in FIGS. 9E-9F. In some cases, the most popular or most frequently used enterprise-specific synonym for a particular enterprise-specific term may be substituted for or replace the enterprise-specific term within a search query (e.g., Phoenix may comprise the most frequently used enterprise-specific synonym for the enterprise-specific term PHX).

In response to detecting the question 626, the enterprise knowledge assistant has provided an answer 628 that provides a link to the document search_commands.docx. In the answer 628, the enterprise knowledge assistant has mapped the enterprise-specific term PHX 624 to the term Phoenix. Subsequently, a third user (Mariel) has provided a second answer 630 to the question 626 that comprises a link to a different document and states that the latest search commands for Phoenix are in the Phoenix Design document. As the third user (Mariel) is associated with a user identifier of a subject matter expert for Phoenix and has a high degree of interactivity with the user (Tony), the enterprise knowledge assistant has ranked the answer 632 as a better answer for the user (Tony) than the answer 628. Subsequently, the enterprise knowledge assistant (Gio) displays the answer 632 to the user (Tony) as an update to the answer 628. In one embodiment, the enterprise knowledge assistant may provide updated answers to questions if the original question was transmitted within the past week.

Figure 6C:
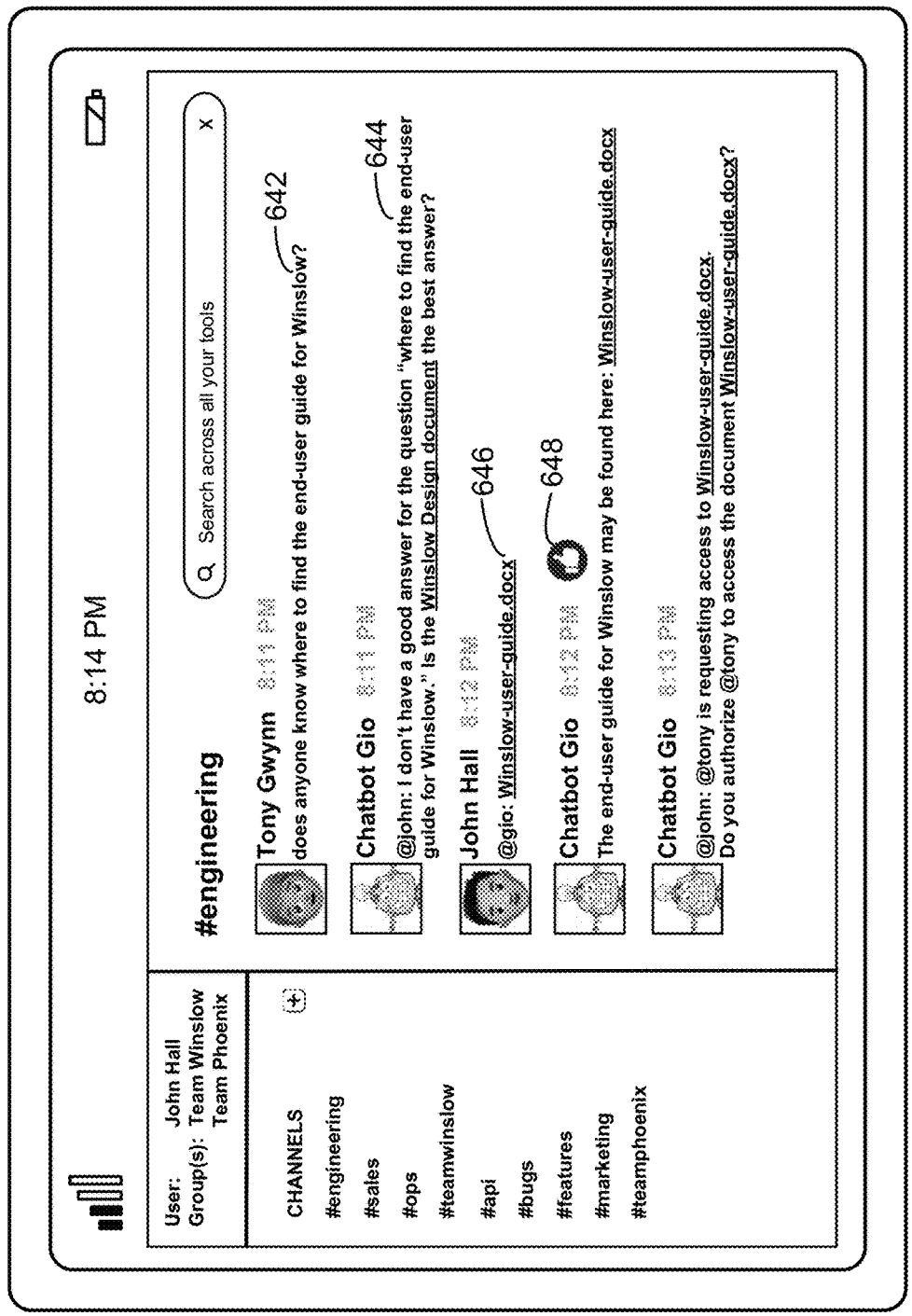

FIG. 6C depicts another embodiment of the mobile device 302 in FIG. 3A providing a user interface for interacting with messages within a chat channel that utilizes an enterprise knowledge assistant, such as the knowledge assistant 214 in FIG. 2B. As depicted, the enterprise knowledge assistant has identified a question 642 that is not semantically equivalent to a question stored within a frequently asked questions database and in response has sent a message 644 requesting the best answer to question 642 to a user (John) because he has been classified as a subject matter expert for Team Winslow. The user (John) provides the answer 646 and the enterprise knowledge assistant stores the question 642 and answer 646 pairing within the frequently asked questions database. The frequently asked questions database may correspond with DB 215 in FIG. 2B. The enterprise knowledge assistant subsequently displays the answer 646 and receives positive feedback 648 (e.g., a thumbs up approval) from the user (Tony) that the answer 646 is the correct answer to the question 642. The positive feedback 648 may cause a positive feedback counter for the answer 646 to be incremented. Answers with higher positive feedback counts may be boosted when the enterprise knowledge assistant ranks answers. Answers with higher negative feedback counts may be demoted when the enterprise knowledge assistant ranks answers.

In some embodiments, question and answer pairs may be extracted from a chat channel (e.g., a public or private messaging channel that allows messages and files to be posted, searched, and viewed by users with access to the channel) by acquiring messages from at least two different users of the chat channel and/or from non-chat documents (e.g., an HR FAQ document that was posted to the channel) that include text that has been classified as factual questions and corresponding answers. Text within a document may be classified as comprising a factual question using machine learning or NLP techniques. In some cases, question and answer pairs may be stored or added to a FAQ database based on user-generated question and answer pairs derived from messages within the chat channel and/or based on machine learning classified question and answer pairs derived from text within non-chat documents that have been linked to as containing at least a threshold number of answers. In one example, a non-chat document may be identified as including at least a threshold number of answers (e.g., at least three answers), if the document was referenced as an answer by at least three different question and answer pairs stored within the FAQ database. Once a document has been identified as a source of question and answer pairs (e.g., by detecting that at least three question and answer pairs have derived from text within the document), then that document may be mined to identify other question and answer pairs to be added to the FAQ database.

The extracted question and answer pairs from non-chat documents may be used to validate or boost pair confidence values of question and answer pairs stored within the FAQ database. In one embodiment, if a non-chat document was created or last modified within the past three months and the document includes a machine learning classified question and answer pair that were determined to be semantically equivalent to a question and answer pair stored within the FAQ database, then the pair confidence value for the question and answer pair stored within the FAQ database may be increased or boosted such that the question and answer pair is automatically displayed within the chat channel upon detection of a semantically equivalent question being asked within the chat channel. If the non-chat document was last modified more than three months ago, then the pair confidence value for the question and answer pair may not be boosted. For each question and answer pair within the FAQ database, a pair confidence value may be used to determine a likelihood that the question and answer pair is a correct question and answer pair and should be used in automatically generating and displaying suggested answers. In some cases, only answers for question and answer pairs with pair confidence values above a threshold confidence value (e.g., above 0.8) may be automatically displayed in response to a semantically equivalent question being asked within the chat channel. For user-created question and answer pairs generated from messages within the chat channel, the pair confidence value may be set to 1.0 or a maximum value.

Within a document, a question may be identified and added to the FAQ database if a sentence ends with a question mark or starts with a question term (e.g., where, what, when, or how). In some cases, a sentence that includes a question term and comprises headline text or text that has been underlined or highlighted may be identified as a potential question to be added to the FAQ database. A corresponding answer for the identified question may comprise either a link to a document immediately following the question or answer text that classifies as a possible answer to the identified question. In some cases, the extracted answer may include body text or the next one or two sentences under the identified question that comprises header text within the document.

In some embodiments, instead of having a pair confidence value for a question and answer pair stored within the FAQ database, an individual question confidence value and a corresponding answer confidence value may be utilized. The question confidence value may be set depending on the number of sentences comprising the question. For example, if a question comprising a single sentence is classified as a factual question via machine learning classification, then the question confidence value may be set to 1.0; however, if two sentences are required (e.g., a sentence with a question mark and its preceding sentence), then the question confidence value may be set to 0.8. Similarly, if an identified answer to an extracted question comprises a single sentence or a single referenced document, then the answer confidence value may be set to 1.0; however, if two sentences are required, then the answer confidence value may be set to 0.8 or a value lower than 1.0. In some cases, if the length of a sentence comprising an answer to an extracted question is greater than a threshold number of words (e.g., is greater than 25 words), then the answer confidence value may be reduced from 1.0 to 0.8. In other cases, if the number of characters in a single sentence comprising an answer to an extracted question is between 15 and 150, then the answer confidence value may be set to 1.0; otherwise, the answer confidence value may be set to 0.8. When messages are being exchanged over a chat channel, the presence of positive reply terms (e.g., "thanks" and "much appreciated") to an extracted answer may be used to boost the answer confidence value (e.g., by increasing the answer confidence value by 2×). The pair confidence value for both a question and answer pair may comprise the product of the question confidence value and the answer confidence value.

Figure 6D:
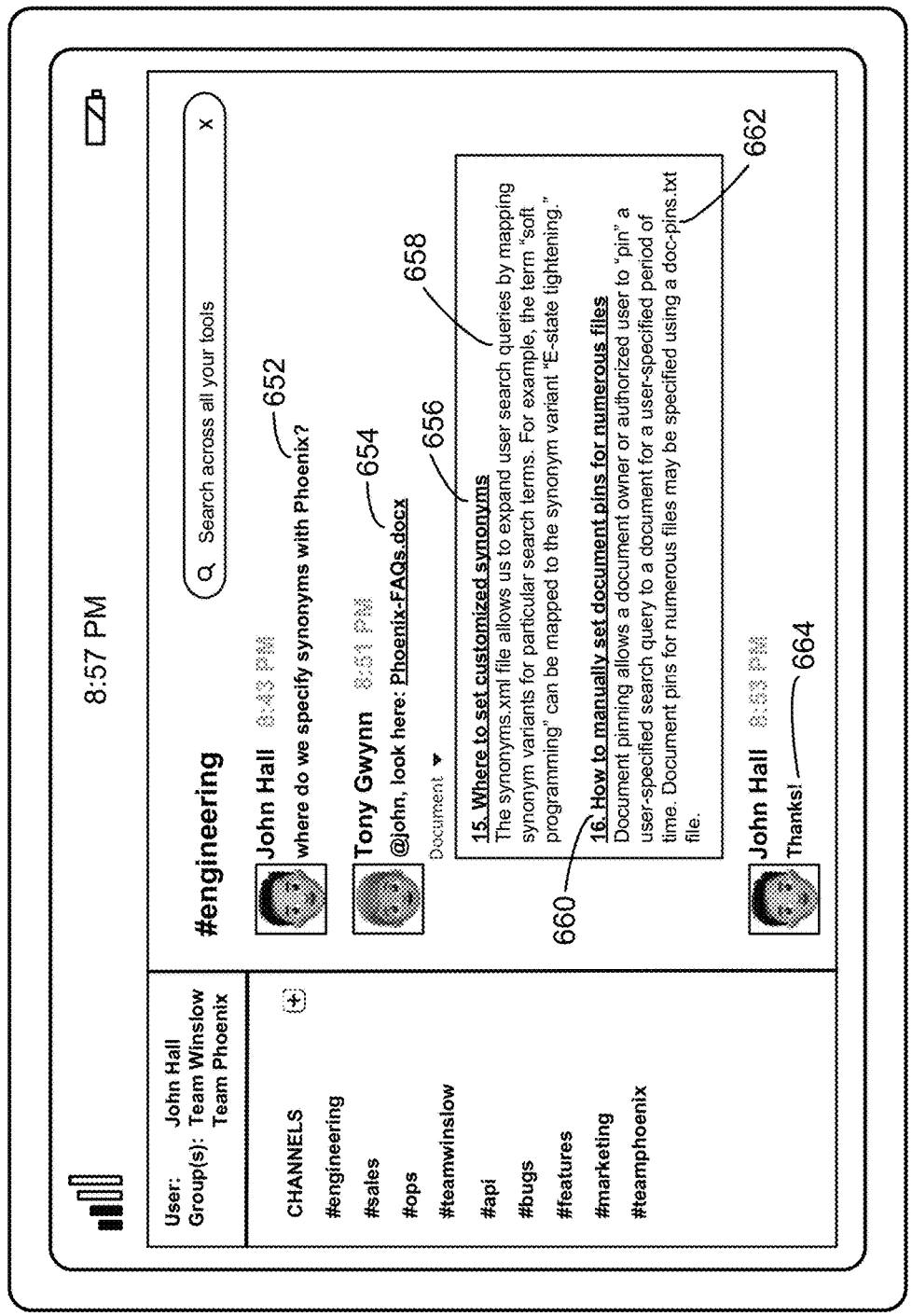
FIG. 6D depicts one embodiment of a mobile device providing a user interface for interacting with messages within a chat channel.

FIG. 6D depicts one embodiment of the mobile device 302 in FIG. 3A providing a user interface for interacting with messages within a chat channel. As depicted, the enterprise knowledge assistant has identified a question 652 that is not semantically equivalent to a question stored within a frequently asked questions database and has identified a potential answer 654 to the question 652 in a subsequent message that includes a link to the document Phoenix-FAQs.docx. The enterprise knowledge assistant has automatically displayed a portion of the linked document that includes language that comprises a potential answer to the question 652 within the linked document. The answer confidence value for the answer 654 may be increased due to the presence of the positive reply 664 provided as the subsequent message to the answer 654. In one example, the answer confidence value for the answer 654 may be doubled if a positive reply term or positive feedback exists within a subsequent message from the user who provided the question 652.

In some embodiments, upon detection that a document, such as the document linked with answer 654, has been referenced by more than a threshold number of answers stored within a FAQ database (e.g., the document has been linked to or referenced as an answer more than three times), the enterprise knowledge assistant may classify the document as a high value FAQ document and, in response, may parse through the document to identify other question and answer pairs. As depicted in FIG. 6D, the enterprise knowledge assistant has caused a portion of the document referenced by the answer 654 to be displayed that includes question 656 and answer 658. Question 656 may have been extracted from the non-chat document Phoenix-FAQs.docx because the sentence for question 656 includes a question term (where) along with the sentence comprising heading text. The answer 658 comprises the first sentence following the question 656. The question 660 may have been extracted from the non-chat document Phoenix-FAQs.docx because the sentence for question 660 includes a question term (how)

along with the sentence comprising heading text. The answer 662 comprises two sentences following the question 660 as the second sentence was required to answer the question 660 as a project name or a named entity doesn't exist in the first sentence. Machine learning techniques may be used to identify that an answer within the document comprises an adequate answer to an identified question within the document. In one example, a machine learning model may be trained by providing a test set of questions and corresponding answer pairs (e.g., 50,000 question and answer pairs) and training the machine learning model to automatically classify whether a future question and answer pair comprises a valid question and answer pair. In some embodiments, extraction of questions from a non-chat document (e.g., a text document) may include detecting one or more sentences that are contiguous and wherein at least one of the sentences includes a question mark or a question term (e.g., where, what, or how) and a different sentence includes a named entity that is required to have the one or more sentences be classified as a valid question.

Figures 7A, 7B:
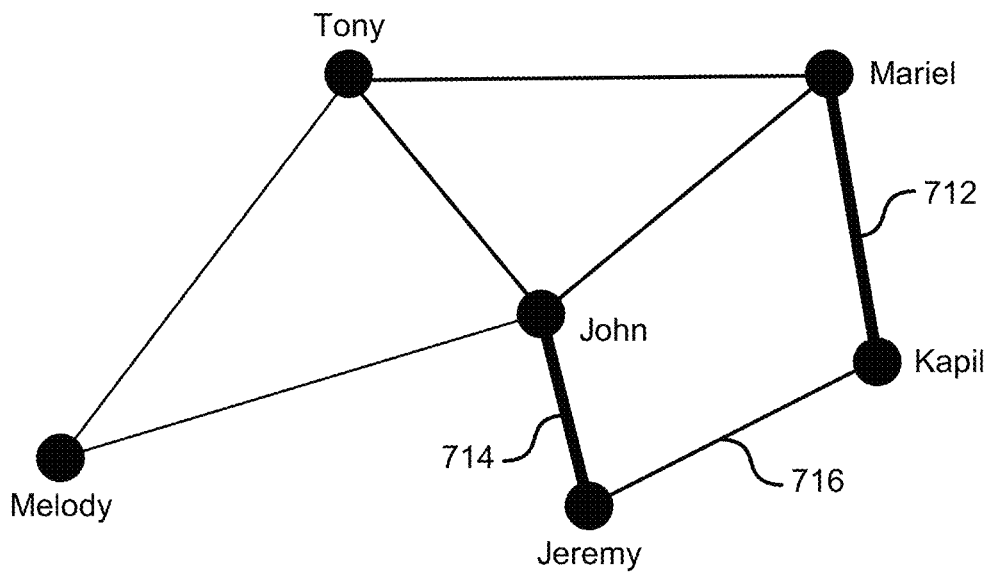

FIG. 7A depicts one embodiment of an enterprise social graph. The enterprise social graph comprises nodes corresponding with users of a permissions-aware search and knowledge management system. The edges between the nodes corresponds with a number of electronic interactions between the users. One technical benefit of determining a number of electronic interactions between users of a search and knowledge management system is that close working relationships may be identified that are not detectable from an enterprise's organizational charts. The number of electronic interactions between users may identify close working relationships between individuals positioned within different organizations or groups. In some embodiments, the co-edited documents and the chat channel messages for a pair of users may be searched for keywords in order to identify subject matter expert clusters. In one example, the messages submitted to one or more chat channels by a pair of users with at least a threshold number of electronic interactions (e.g., with at least 400 interactions) may be searched for keywords associated with engineering topics (e.g., project codenames or software tools) to identify Mariel and Kapil as subject matter experts for a particular engineering project (e.g., project SlackBot).

As depicted in FIG. 7A, bolder edges 712 and 714 indicate a higher degree of electronic interaction between the corresponding pairs of users. In one example, the edge 712 is associated with over 10K interactions between user Mariel and user Kapil, the edge 714 is associated with over 10K interactions between user John and user Jeremy, and the edge 716 is associated with less than 10K interactions between user Kapil and user Jeremy. The number of electronic interactions between a pair of users may comprise the sum of the number of documents that were co-edited by the pair of users and the number of question and answer interactions between the pair of users within a chat channel (or across a plurality of chat channels). In one example, the number of electronic interactions may comprise the number of electronic documents (e.g., documents associated with source code or wikis) that were digitally touched by the pair of users; digitally touched may refer to a document being created or modified by a user. In another example, the number of electronic interactions may comprise the number of adjacent messages (e.g., back-to-back messages without any intervening messages) or sequential messages between the pair of users within a chat channel.

FIG. 7B depicts one embodiment of a question and answer pair stored within a database, such as DB 215 in FIG. 2B. The chart depicted in FIG. 7B shows two columns with one column for semantically equivalent questions as deemed semantically equivalent via machine learning techniques and another column of answers to the semantically equivalent questions. In some cases, once a question has been stored within the database, if another semantically equivalent question is later identified, then only one of the semantically equivalent questions may be stored (e.g., the originally stored question may be preserved or the question with the fewest number of words may be stored). As depicted in FIG. 7B, a question 732 and a corresponding answer 722 have been stored as a question and answer pair within the database.

FIG. 7C depicts one embodiment of a new question and answer pair being added to the database depicted in FIG. 7B. The question 734 and answer 724 pairing may correspond with the question 616 in FIG. 6A and the answer 620 in FIG. 6A. The question 732 and the question 734 may be identified as semantically equivalent questions and in response only the question 732 may be stored within the database as depicted in FIG. 7D. As the answer 722 and the answer 724 are not semantically equivalent or include links to different documents, both answers may be stored within the database as potential answers to the question 732. The determination of whether the answer 722 or the answer 724 is automatically displayed in response to a question that is semantically equivalent to question 732 within a chat channel may depend on the number of electronic interactions between a user asking a question and another user that provided a stored answer. Another consideration as to whether the answer 722 or the answer 724 is automatically displayed in response to a question that is semantically equivalent to question 732 within a chat channel is whether the user asking the question is authorized to access a document associated with an answer. In some cases, the highest ranking answer in terms of the answer with the greatest amount of positive feedback (e.g., with the highest positive feedback count) or the answer that was provided by a subject matter expert may not be displayed to the user due to access rights and instead the highest ranking answer that is accessible by the user may be displayed.

FIG. 7D depicts one embodiment of a question and multiple answer pairs stored within a database. The question 732 maps to answer 722, answer 724, and answer 726. Answer 726 may have been added to the database directly by a subject matter expert and may be given the highest ranking among the answers but only for users belonging to a particular group (e.g., for users belonging to Team Phoenix).

Figure 7E:
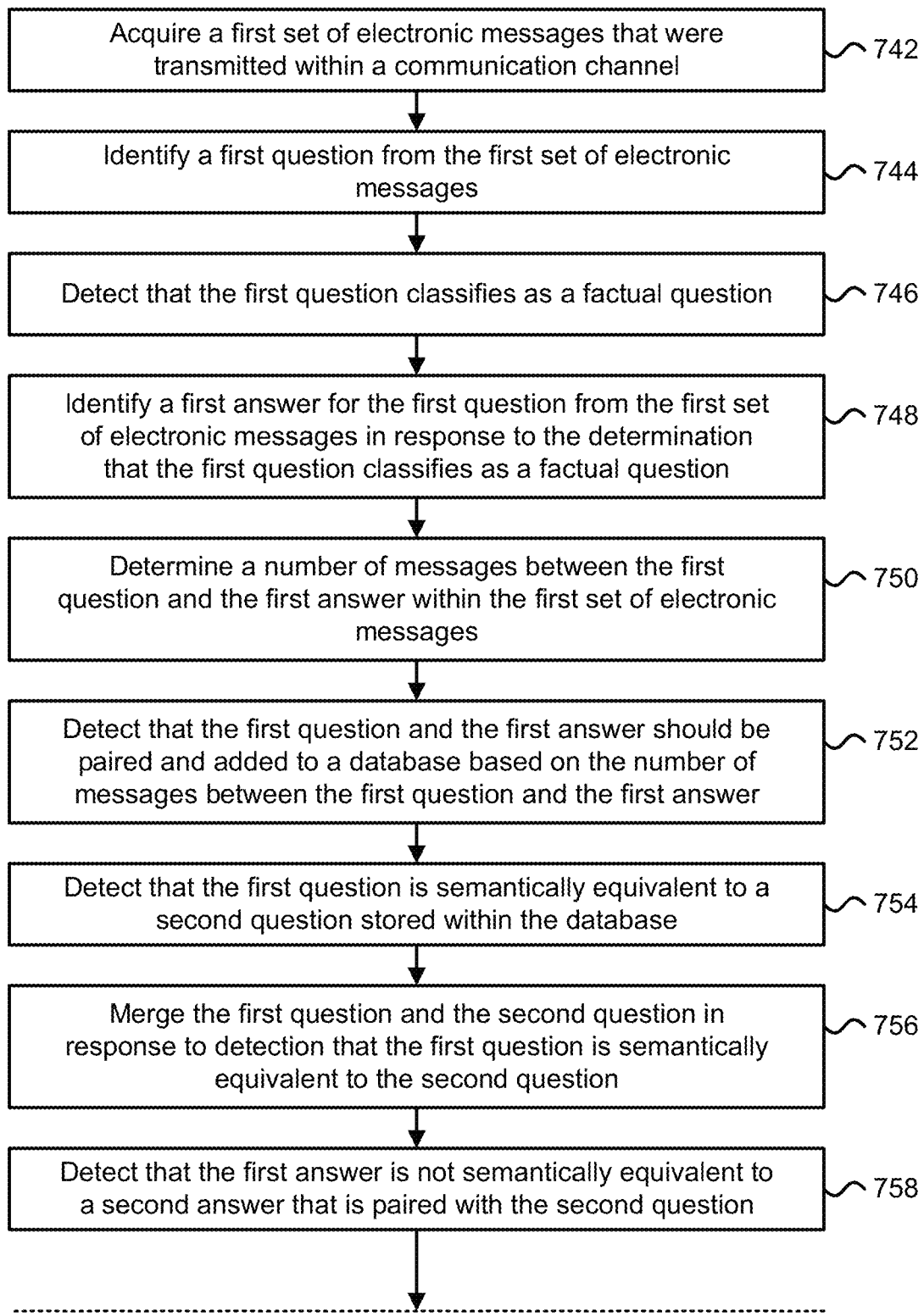
FIGS. 7E-7F depict a flowchart describing one embodiment of a process for generating and updating a frequently asked questions database.
Figure 7F:
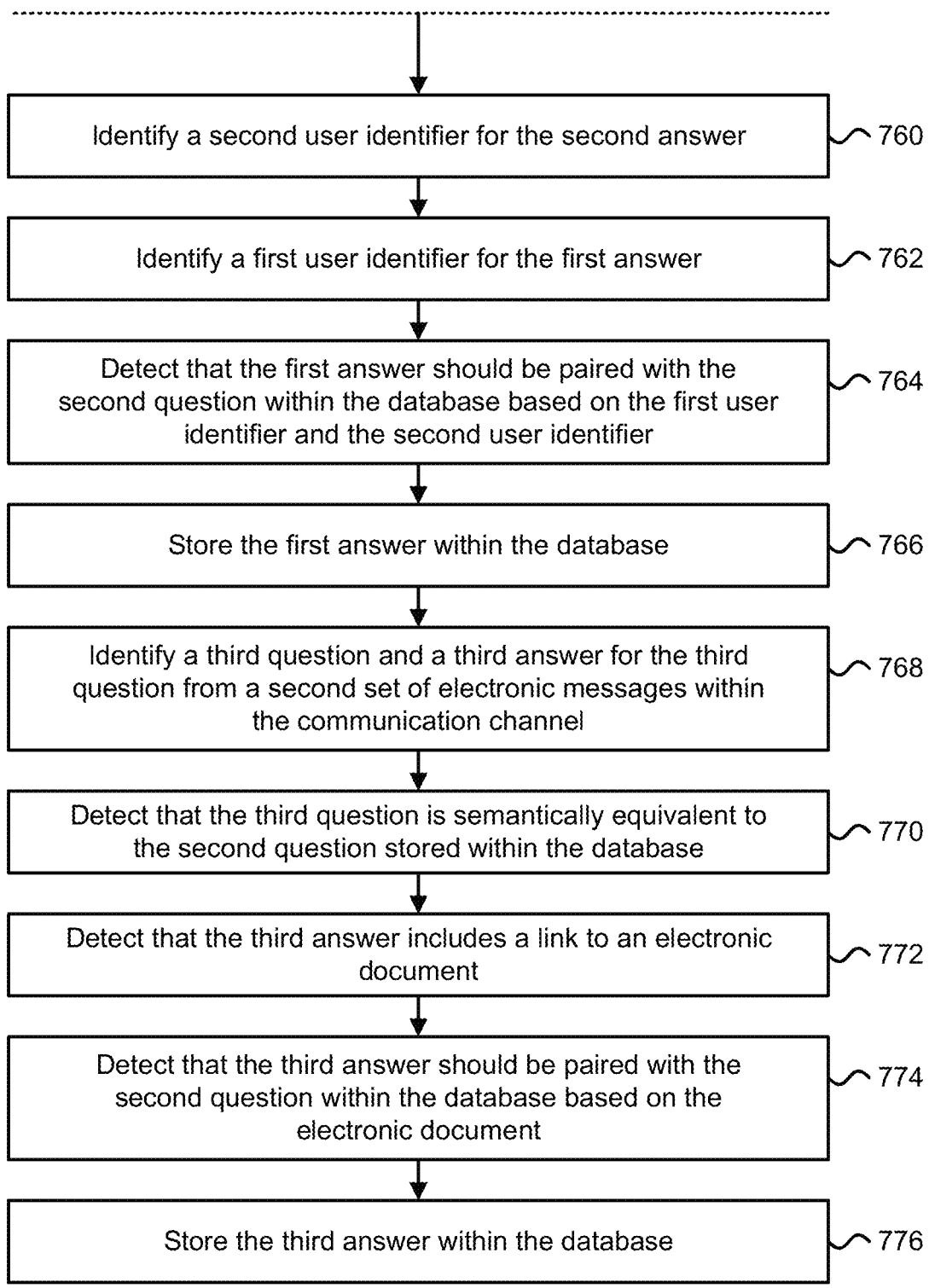

FIGS. 7E-7F depict a flowchart describing one embodiment of a process for generating and updating a frequently asked questions database. In one embodiment, the process of FIGS. 7E-7F may be performed by a search and knowledge management system, such as the search and knowledge management system 120 in FIG. 1 or the search and knowledge management system 220 in FIG. 2A. In another embodiment, the process of FIGS. 7E-7F may be implemented using a cloud-based computing platform or cloud-based computing services.

In step 742, a first set of electronic messages that were transmitted or displayed within a communication channel is acquired. The first set of electronic messages may comprise messages within a persistent chat channel, such as the messages corresponding with question 612 and answer 620 in FIG. 6A. The first set of electronic messages may comprise message exchanges within the persistent chat channel between different users of a search and knowledge management system. In step 744, a first question is identified from the first set of electronic messages. The first question may be identified due to the presence of keywords (e.g., "where") or symbols (e.g., a question mark). The first question may be identified from a portion of one of the first set of electronic messages as a factual question using a machine learning model that was trained by providing a test set of questions (e.g., 40,000 questions) in which each question was labeled as either an opinion question or a factual question and then training the machine learning model to automatically classify future questions as either opinion questions or factual questions.

In step 746, it is detected that the first question classifies as a factual question. In some embodiments, in order for a question and answer pair to be added to a FAQ database, the question must be classified as a factual question and the question must not include any terms that denote short-term relevance (e.g., a question regarding something only applicable today or tomorrow). In step 748, a first answer for the first question is identified from the first set of electronic messages in response to the determination that the first question classifies as a factual question. In one example, the first answer may be identified in a subsequent message within a threshold number of messages (e.g., within three messages) from the first question if the subsequent message includes a link to a document. In another example, the first answer may be identified in a subsequent message if the subsequent message includes a link to a document and positive feedback is received from the user who asked the first question.

In step 750, a number of messages between the first question and the first answer within the first set of electronic messages is determined. In step 752, it is detected that the first question and the first answer should be paired and added to a database based on the number of messages between the first question and the first answer. In one example, it may be detected that the first question and the first answer should be added to the database if the number of messages between the first question and the first answer is less than a threshold number of messages (e.g., is less than four messages). As the number of intervening messages increases, the likelihood of a subsequent message providing the correct answer may decrease. Moreover, as the amount of time that passes between the first question and a subsequent message increases, the less likely that the subsequent message provides the correct answer.

In step 754, it is detected that the first question is semantically equivalent to a second question that was previously stored within the database. Machine learning techniques may be used to determine whether the first question is semantically equivalent to another question stored within the database. The database may comprise a FAQ database and may correspond with database DB 215 in FIG. 2B. In step 756, the first question and the second question may be merged in response to detection that the first question is semantically equivalent to the second question. In some cases, rather than merging the two questions, one of the questions may be preserved while the other question is discarded. In one example, the question out of the first question and the second question with the fewest number of words may remain as the question stored within the database. In another example, the question out of the first question and the second question with the greatest number of words may remain as the question stored within the database.

If it is determined that the first question is semantically equivalent to another question stored within the database and the first answer is semantically equivalent to the answer for the other question stored within the database, then the first question and the first answer may not be added to the database and instead a counter of the number of times that the equivalent question and answer has been provided for the first question and the first answer pair may be incremented. A counter of the number of times that positive feedback has been received for a question and answer pair stored within the database may be stored along with the pairing. If it is determined that the first question is not semantically equivalent to another question stored within the database, then the first question and the first answer may be added to the database.

In step 758, it is detected that the first answer is not semantically equivalent to a second answer that is paired with the second question within the database. In reference to FIG. 7C, although question 732 and question 734 were determined to be semantically equivalent, the answer 722 and the answer 724 were not determined to be semantically equivalent as the two answers reference different documents. In step 760, a second user identifier for the second answer is identified. The second user identifier may correspond with the user who provided the second answer that is paired with the second question. In step 762, a first user identifier for the first answer is identified. In reference to FIG. 7C, the second user identifier may correspond with the user who provided the answer 722 and the first user identifier may correspond to the user who provided the answer 724. In step 764, it is detected that the first answer should be paired with the second question within the database based on the first user identifier and the second user identifier. In one example, it may be detected that the first answer should be paired with the second question due to a ranking of the user corresponding with the first user identifier within an organizational hierarchy or that the user corresponding with the first user identifier has been specified as a subject matter expert for a particular project or group. In another example, it may be detected that the first answer should be paired with the second question due to the age of the second answer. For example, if the age of the second answer is greater than a threshold number of days (e.g., is older than 90 days), then the newer first answer may take priority over the older second answer. In step 766, the first answer is stored within the database and paired with the second question.

In step 768, a third question and a third answer for the third question are identified from a second set of electronic messages within the communication channel. The communication channel may comprise a chat channel within an electronic messaging application. In step 770, it is detected that the third question is semantically equivalent to the second question stored within the database. In step 772, it is detected that the third answer includes a link to an electronic document. In step 774, it is detected that the third answer should be paired with the second question within the database based on the number of answer references to the electronic document and/or the contents of the electronic document. In one embodiment, an electronic document that comprises the answer for a large number of answers within the database may be deemed a high-value factual document and have its answer relevance boosted. For example, if an electronic document (e.g., an HR benefits document) is the same answer to more than ten different questions, then the electronic document may receive a boosted answer ranking when a corresponding question is subsequently identified. In step 776, the third answer is stored within the database. If the electronic document includes a plurality of pages, then a subset of the plurality of pages may be identified that includes language from the third question. Verifying that the electronic document includes textual information found within the third question increases the confidence that the electronic document answers the third question.

Figure 7G:
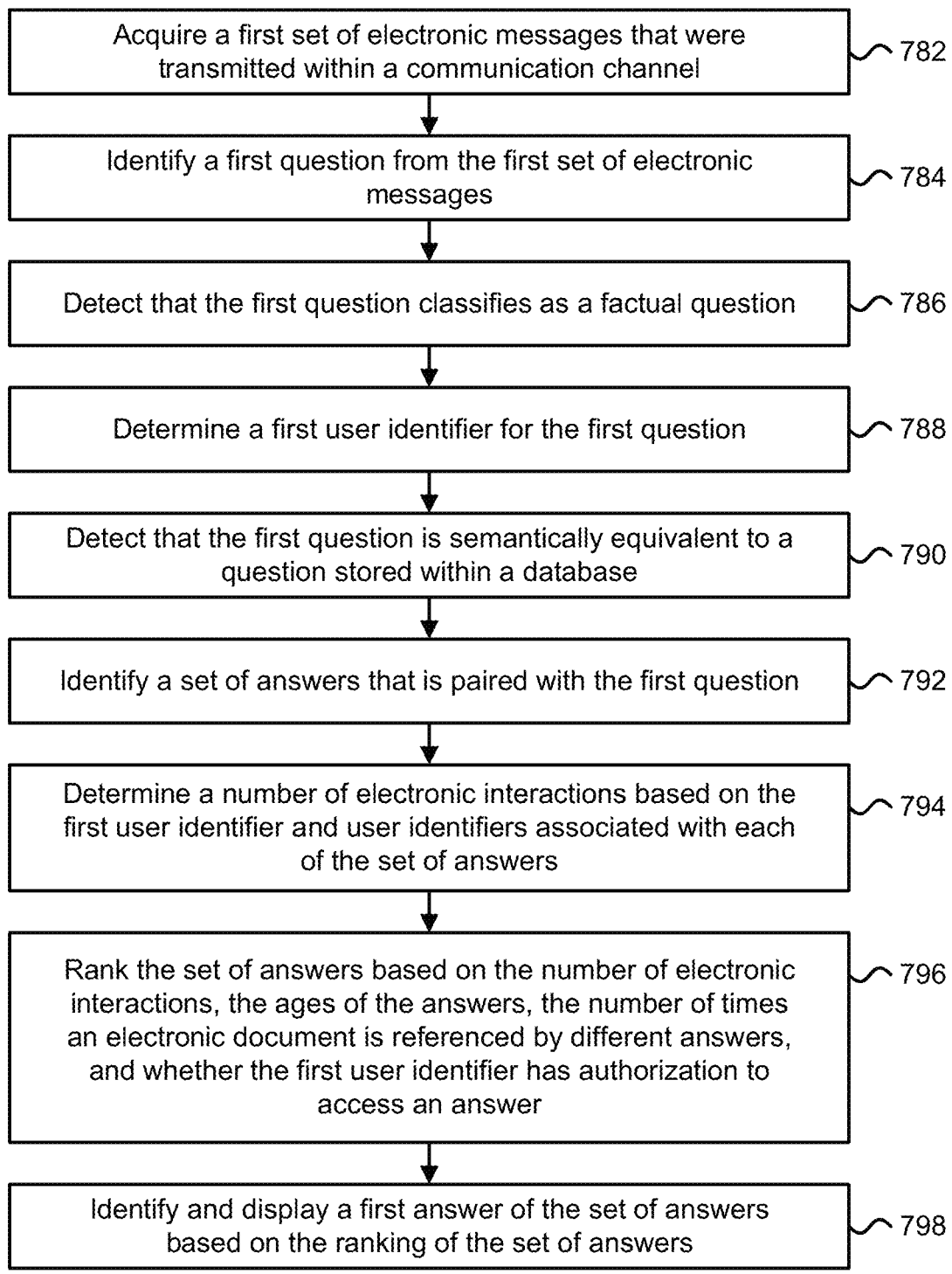
FIG. 7G depicts a flowchart describing one embodiment of a process for identifying a factual question and in response generating and displaying an automated response to the factual question.

FIG. 7G depicts a flowchart describing one embodiment of a process for identifying a factual question and in response generating and displaying an automated response to the factual question. In one embodiment, the process of FIG. 7G may be performed by a search and knowledge management system, such as the search and knowledge management system 120 in FIG. 1 or the search and knowledge management system 220 in FIG. 2A. In another embodiment, the process of FIG. 7G may be implemented using a cloud-based computing platform or cloud-based computing services.

In step 782, a first set of electronic messages is acquired. The first set of electronic messages may have been messaged by a plurality of users. The first set of electronic messages may have been transmitted or displayed within a communication channel or a messaging application. The communication channel may comprise a persistent chat channel. The first set of electronic messages may correspond with a subset of the chat messages depicted in FIGS. 6A-6C. In step 784, a first question is identified from the first set of electronic messages. In step 786, it is detected that the first question classifies as a factual question. In step 788, a first user identifier for the first question is determined. The first user identifier may correspond with the user who transmitted a message within the communication channel with text corresponding with the first question. In step 790, it is detected that the first question is semantically equivalent to a question already stored within a database. The database may comprise a FAQ database and may correspond with database DB 215 in FIG. 2B. In step 792, a set of answers that is paired with the first question is identified. The set of answers may be identified from the database by identifying one or more answers that map to the question already stored within the database.

In step 794, a number of electronic interactions is determined based on the first user identifier and user identifiers associated with each of the set of answers. Each answer of the set of answers may include textual information and/or a link to one or more documents. The number of electronic interactions between a pair of users may comprise the sum of the number of documents that were collaborated on or co-edited by the pair of users. The number of electronic interactions may comprise the number of question and answer interactions between a pair of users within the communication channel. In one example, the number of electronic interactions between a user associated with the first user identifier and another user associated with an answer of the set of answers may comprise the number of question and answer interactions between the pair of users within one or more chat channels.

In step 796, the set of answers is ranked based on the number of electronic interactions, the ages of the answers, the number of times an electronic document is referenced by different answers, and whether the first user identifier has authorization to access an answer of the set of answers. In one example, if the first user identifier is not authorized to view an answer or access a document referenced by an answer, then that answer will receive the lowest ranking and will not be displayed. In another example, the set of answers is ranked based on the number of electronic interactions between a first user associated with the first user identifier and other users associated with the set of answers. In another example, the set of answers is ranked based on the popularity referenced documents or the number of times that a document has been referenced by other answers within the database. A document that has been referenced by numerous answers may be deemed a high value factual document. In step 798, a first answer of the set of answers is identified based on the ranking of the set of answers and is subsequently displayed. The first answer may be displayed using a touchscreen display, such as the touchscreen display of mobile device 302 in FIG. 3A.

Figure 8A:
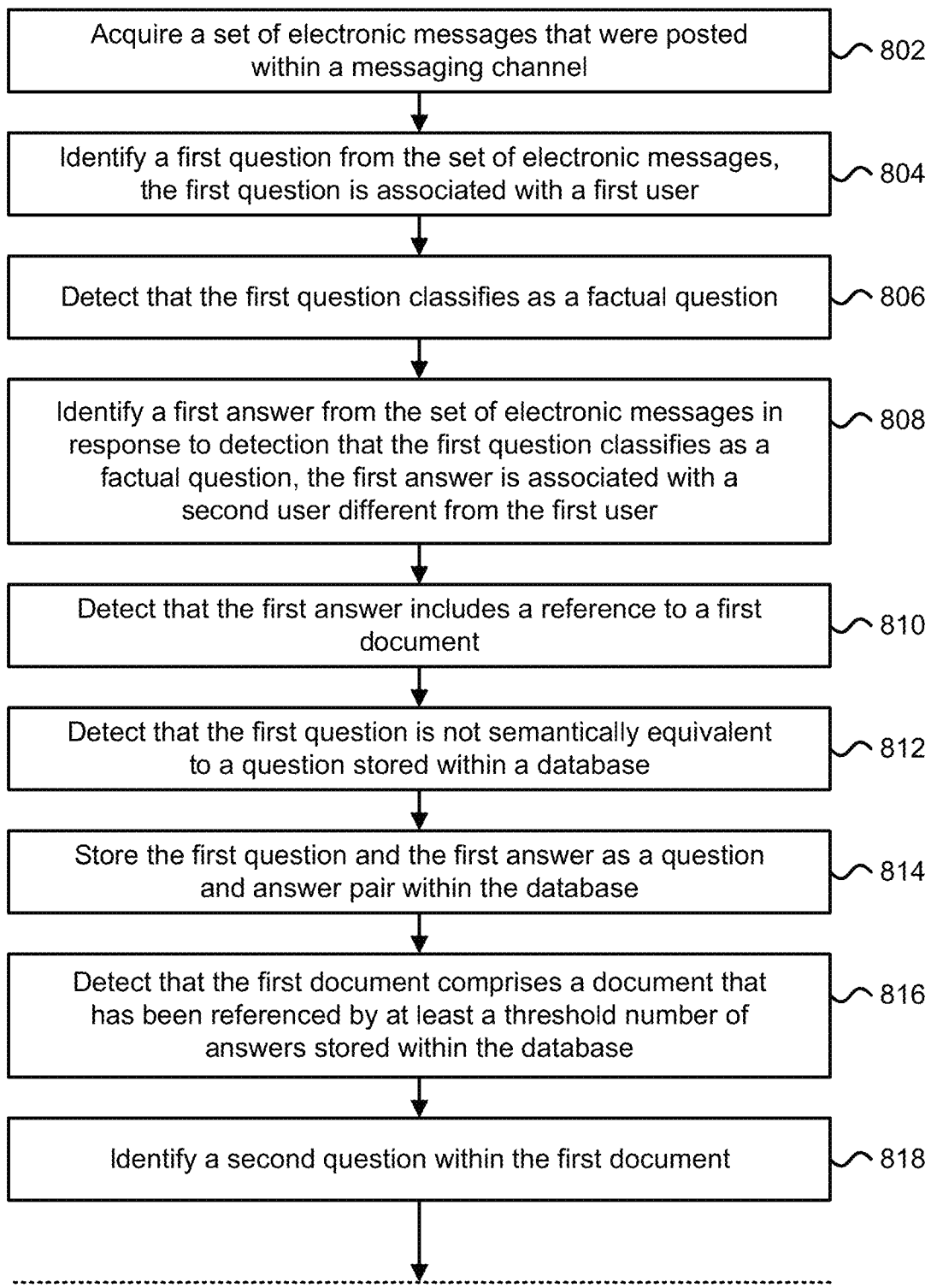
FIGS. 8A-8B depict a flowchart describing one embodiment of a process for updating a frequently asked questions database and automatically posting answers to questions within a messaging channel based on question and answer pairs stored within the frequently asked questions database.
Figure 8B:
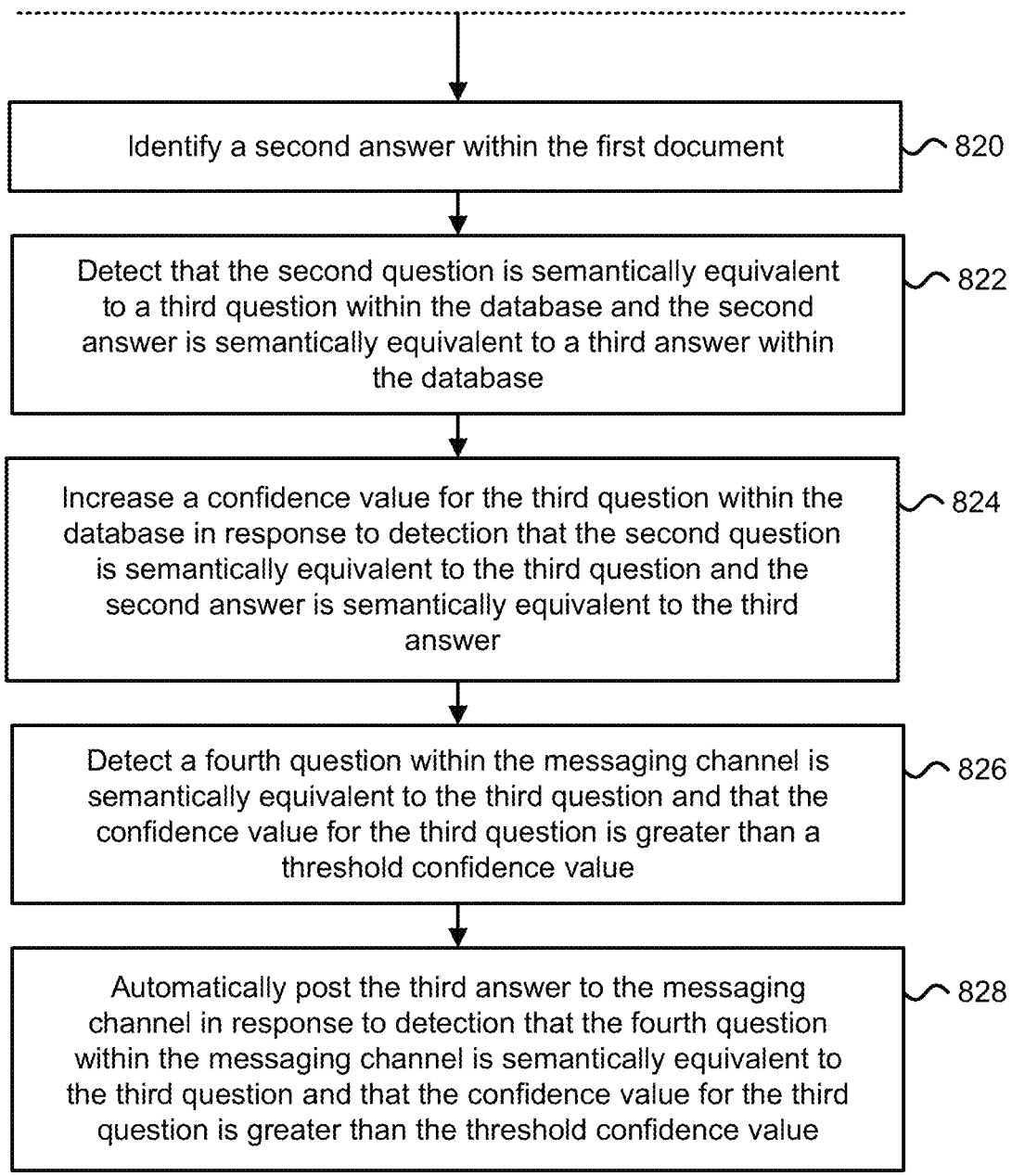

FIGS. 8A-8B depict a flowchart describing one embodiment of a process for updating a frequently asked questions database and automatically posting answers to factual questions within a messaging channel based on question and answer pairs stored within the frequently asked questions database. In one embodiment, the process of FIGS. 8A-8B may be performed by a search and knowledge management system, such as the search and knowledge management system 120 in FIG. 1 or the search and knowledge management system 220 in FIG. 2A. In another embodiment, the process of FIGS. 8A-8B may be implemented using a cloud-based computing platform or cloud-based computing services.

In step 802, a set of electronic messages that were posted or displayed within a messaging channel is acquired. In step 804, a first question is identified from the first set of electronic messages. The first question is associated with a first user. In step 806, it is detected that the first question classifies as a factual question. In step 808, a first answer is identified from the set of electronic messages in response to detection that the first question classifies as a factual question. The first answer is associated with a second user different from the first user. In step 810, it is detected that the first answer includes a reference to a first document. In step 812, it is detected that the first question is not semantically equivalent to a question stored within the database. In step 814, the first question and the first answer are stored as a question and answer pair within the database in response to detection that the first question is not semantically equivalent to any other question stored within the database.

In step 816, it is detected that the first document comprises a document that has been referenced by at least a threshold number of answers stored within the database. In one example, the first document may have been referenced by answers corresponding with five different question and answer pairs stored within the database. In step 818, a second question is identified within the first document. In one example, the first question may correspond with question 656 in FIG. 6D and the second question may correspond with question 660 in FIG. 6D. The second question may comprise a different question that is not semantically equivalent to the first question. In step 820, a second answer is identified within the first document. In one example, the first answer may correspond with answer 658 in FIG. 6D and the second answer may correspond with answer 662 in FIG. 6D.

In step 822, it is detected that the second question is semantically equivalent to a third question within the database and the second answer is semantically equivalent to a third answer within that database. In this case, the second question and the second answer that were extracted from the first document where semantically equivalent to the third question and third answer that already existed within the database. Upon detection that the second question is semantically equivalent to the third question already stored within the database and that the second answer is semantically equivalent to the third answer already stored within the database, the confidence values associated with the third question and third answer pair already stored within the database may be increased as a non-chat document source has confirmed or validated the third question and third answer pair. The third question and third answer pair may have been generated by user messages within the messaging channel prior to acquisition of the set of electronic messages.

In step 824, a confidence value for the third question is increased in response to detection that the second question is semantically equivalent to the third question and the second answer is semantically equivalent to the third answer. In one example, the confidence value for the third question may be doubled. In step 826, it is detected that a fourth question within the messaging channel is semantically equivalent to the third question and that the confidence value for the third question is greater than a threshold confidence value. In this case, a new question may have been asked by a user within the messaging channel and the new question has matched or has been found to be semantically equivalent to a question already stored within the database (e.g., within a frequently asked questions database). In step 828, the third answer may be automatically posted to the messaging channel in response to detection that the fourth question within the messaging channel is semantically equivalent to the third question and that the confidence value for the third question is greater than the threshold confidence value. The third answer being posted to the messaging channel may cause the third answer to be displayed within the messaging channel. In one example, if the confidence value for the third question is greater than 0.8, then the third answer may be automatically posted to the messaging channel in response to detection that the fourth question is semantically equivalent to the third question that already existed within the database. However, if the confidence value for the third question is not greater than 0.8, then the third answer may not be automatically posted to the messaging channel.

In some embodiments, a search and knowledge management system, such as the search and knowledge management system 120 in FIG. 1, may acquire a portion of a search query that has been entered into a search bar or field by a user of the search and knowledge management system and in response display a query suggestion to automatically add one or more terms to complete the search query. The suggested query terms to complete the search query may be determined based on information contained within documents that are accessible by the user per their user and group permissions. In response to a portion of a search query being entered into a search bar or field by a user of the search and knowledge management system, the system may automatically display a suggested enterprise-specific term for substitution with an entered search term, such as a more popular synonym for a search term entered by the user. The suggested enterprise-specific term may be displayed and the user may be asked to accept or reject the suggested enterprise-specific term as a replacement for the search term entered by the user. In some cases, the suggested enterprise-specific term may be automatically added to the search query unless explicitly rejected by the user.

The search and knowledge management system may identify term and phrase substitutions (e.g., enterprise-specific synonyms that do not share a common root word) by leveraging a self-supervised language model over the documents comprising an enterprise's corpus to identify the substitutions. In one example, the enterprise-specific phrase "soft programming" may be determined to be synonymous with the phrase "E-state tightening" as both phrases may be deemed to be semantically equivalent within the documents comprising the enterprise's corpus. In another example, the term "PHX" may be classified as a synonym of the term "Phoenix" among the documents comprising the enterprise's corpus. The enterprise-specific synonyms and semantically equivalent phrases generated by the search and knowledge management system may be automatically added as additional search terms to a search query to generate improved search results. A semantic similarity score may be computed for two different words or phrases (e.g., comprising a plurality of words) to determine whether the two different words or phrases are semantically equivalent; if the semantic similarity score is greater than a threshold score (e.g., is greater than 95), then the two different words or phrases may be deemed to be semantically equivalent.

In some cases, a language model (e.g., an English language model) may be adapted to understand enterprise-specific language that is specific to a particular enterprise by retraining the language model using the enterprise's corpus of documents and messages. During the retraining of the language model, a masking process may be performed in which a term (or a complete word) within a sentence of a document or message is randomly selected and then masked (or removed). After the selected term has been masked from the sentence, the language model may then predict the masked term and a label may be generated to indicate whether the language model correctly predicted the term that was masked. The masking process may be applied to each term within a sentence and then over numerous sentences within the enterprise's corpus of documents and messages. In cases where the retrained language model generates a probability that a second term that is different from the masked term is the correct term and that probability of being the correct term is greater than a threshold (e.g., is greater than 5%), then the second term that is different from the masked term may be identified as an enterprise synonym candidate. Upon detection that the second term has been identified as an enterprise synonym candidate for the masked term, other sentences within the enterprise's corpus of documents and messages that include the second term may be identified and the second term may be masked in order to determine if the originally masked term comprises an enterprise synonym candidate for the second term. In one example, a first sentence within a first document may include the term "PHX" that is masked to identify the term "Phoenix" as an enterprise synonym candidate for "PHX" and then a second sentence within a second document may include the term "Phoenix" that is masked to identify the term "PHX" as an enterprise synonym candidate for "Phoenix" within the second sentence. If the number of times that the term "PHX" comprises an enterprise synonym candidate for "Phoenix" and the number of times that the term "Phoenix" comprises an enterprise synonym candidate for "PHX" is greater than a threshold (e.g., the number of times is greater than three), then the terms "PHX" and "Phoenix" may be classified as enterprise synonyms for each other and added to an enterprise synonyms database.

FIG. 9A depicts one embodiment of a portion of a user interface that automatically displays suggested word substitutions for search terms in order to improve the quality of search results. As depicted, the user interface includes a search bar 912 that a user may use to enter and submit a search query. The user may be associated with a unique username 914. The suggested word substitutions 916 comprise enterprises synonyms for the search term "phx" that are either more popular in terms of their frequency of use (e.g., "Phoenix" may be used in more sentences over an enterprise's corpus of documents and messages than "phx") or comprise synonymous terms that contain a greater number of characters. The suggested word substitutions may be generated depending on a people cluster associated with the username 914. For example, the determination of which terms are deemed enterprises synonyms may be made using only sentences within documents and messages that are accessible by individuals assigned to the same people cluster, such as people cluster 595 in FIG. 5C.

FIG. 9B depicts one embodiment of a portion of a user interface that allows structured queries with search operators for custom fields associated with preliminary non-displayed search result documents. As depicted, a first set of search results is generated for the search query "sales report for Phoenix" and in response suggested custom fields 918 for further refinement of search results is automatically displayed within the search bar 912. As each document for a subset of the first set of search results has a corresponding Department field, the user may specify that only search result documents that have their Department field assigned to "FINANCE" be displayed with the displayed search results.

FIG. 9C depicts one embodiment of a first term within a first sentence being masked so that a language model can be used to generate a set of term replacements and their corresponding probabilities as the correct term replacement. As depicted, the term "Phoenix" has been randomly selected and then masked from the first sentence. The set of term replacements for the masked term 902 includes the term "Phoenix" with a probability of 85% of being the correct term, the term "PHX" with a probability of 10% of being the correct term, and the term "Winslow" with a probability of 2% of being the correct term. In some embodiments, terms that are different from the masked term 902 but have a probability of being the correct term that is greater than a threshold (e.g., a probability of being the correct term that is greater than 5%) may be identified as enterprise synonym candidates. In reference to the set of term replacements for the masked term 902 of "Phoenix," the term "PHX" has a probability of being the correct term that is greater than 5% and would be classified as an enterprise synonym candidate for the term "Phoenix."

FIG. 9D depicts one embodiment of a second term within a second sentence being masked so that the language model can be used to generate a second set of term replacements and their corresponding probabilities as the correct term replacement. As depicted, the second sentence has been identified because it includes the term "PHX" that was classified as an enterprise synonym candidate for the term "Phoenix" in FIG. 9C. After the second sentence has been identified (e.g., residing in a different document or message than the first sentence of FIG. 9C), the term "PHX" is then masked from the second sentence and the language model is used to generate the second set of term replacements. The second set of term replacements for the masked term 904 of "PHX" includes the term "PHX" with a probability of 80% of being the correct term, the term "Phoenix" with a probability of 10% of being the correct term, and the term "ProjPHX" with a probability of 7% of being the correct term. In some embodiments, terms that are different from the masked term 904 but have a probability of being the correct term that is greater than a threshold (e.g., a probability of being the correct term that is greater than 5%) may be identified as enterprise synonym candidates. In reference to the second set of term replacements for the masked term 904 of "PHX," the terms "Phoenix" and "ProjPHX" both have a probability of being the correct term that is greater than 5% and would therefore both be classified as enterprise synonym candidates for the term "PHX."

FIGS. 9E-9F depict a flowchart describing one embodiment of a process for identifying enterprise synonyms and leveraging the enterprise synonyms to improve search results. In one embodiment, the process of FIGS. 9E-9F may be performed by a search and knowledge management system, such as the search and knowledge management system 120 in FIG. 1 or the search and knowledge management system 220 in FIG. 2A. In another embodiment, the process of FIGS. 9E-9F may be implemented using a cloud-based computing platform or cloud-based computing services.

In step 932, a set of documents is acquired. The set of documents may comprise documents within an enterprise or accessible by individuals of the enterprise. The set of documents may all correspond with documents that have been touched or edited by individuals of a particular people cluster. In step 934, a first sentence within a first document of the set of documents is identified. In one example, the first sentence may correspond with the first sentence in FIG. 9C. The first sentence may be identified at random or due to the presence of a word or term that has been identified as an enterprise synonym candidate. In step 936, a first term within the first sentence is determined. In step 938, a first set of synonym candidates for the first term within the first sentence is determined while the first term is masked. In step 940, a first set of probabilities for the first set of synonym candidates is determined. In step 942, a second term from the first set of synonym candidates is identified based on the first set of probabilities. In one example, the second term from the first set of synonym candidates may correspond with the term "PHX" in FIG. 9C. The second term may be identified as the non-masked term within the first set of synonym candidates with the highest probability of being the correct term.

In step 944, it is detected that the second term is one of the first set of synonym candidates that corresponds with at least a threshold probability based on the first set of probabilities. In one example, it may be detected that the second term has a probability of being the correct term that is greater than 5%. In step 946, a second sentence within a second document of the set of documents that includes the second term is identified. In some cases, both the first document and the second document may correspond with documents that have been assigned to a particular group or are associated with a particular people cluster. The identification of enterprise synonym candidates among documents and messages used by individuals of a people cluster may allow terminology specific to the people cluster to be identified. In step 948, a second set of synonym candidates for the second term within the second sentence is determined while the second term is masked. In step 950, a second set of probabilities for the second set of synonym candidates is determined. In step 952, it is detected that the first term is one of the second set of synonym candidates that corresponds with at least the threshold probability based on the second set of probabilities. In one example, the first term from the second set of synonym candidates may correspond with the term "Phoenix" in FIG. 9D.

In step 954, it is detected that the first term corresponds with a synonym candidate for the second term at least a first number of times. In step 956, it is detected that the second term corresponds with a synonym candidate for the first term at least a second number of times. In step 958, the first term and the second term are added to a synonyms database in response to detection that the first term corresponds with a synonym candidate for the second term at least the first number of times and that the second term corresponds with a synonym candidate for the first term at least the second number of times. In one example, both the first term and the second term may be added to the synonyms database if the sum of the first number of times and the second number of times is greater than ten. In another example, both the first term and the second term may be added to the synonyms database as a pair of enterprise synonyms if the first number of times is greater than seven and the second number of times is greater than five. In some embodiments, both the first term and the second term may be added to the synonyms database as enterprise synonyms only if they were determined to be synonym candidates from at least a threshold number of documents associated with a particular people cluster.

In step 960, a search query that includes the first term is acquired. The search query may have been entered and submitted into a search bar by a user of a search and knowledge management system. In step 962, the first term is replaced with the second term within the search query and search results for the updated search query may be generated and displayed. In some cases, the first term may not be replaced within the search query and the second term may be added to the search query in order to generate search results that include both the first term and the second term. In one embodiment, the first term may be replaced by the second term within the search query if the second term has a higher frequency of usage compared with the first term within documents and messages of an enterprise's corpus. In another embodiment, the first term may be replaced by the second term within the search query if the second term includes a greater number of characters than the first term; a search term that comprises a greater number of letters or characters may convey greater information than a synonymous term with fewer letters or characters.

One embodiment of the disclosed technology includes acquiring a first set of electronic messages from a messaging application, identifying a first question from the first set of electronic messages, detecting that the first question classifies as a factual question and is semantically equivalent to a second question stored within a database, identifying a set of answers that is paired with the second question within the database in response to detecting that the first question classifies as a factual question and is semantically equivalent to the second question stored within the database, determining a first user identifier for the first question, ranking the set of answers based on the first user identifier, identifying a first answer of the set of answers based on the ranking of the set of answers, and displaying the first answer using a computing device.

One embodiment of the disclosed technology includes a storage device (e.g., a semiconductor memory) and one or more processors in communication with the storage device. The storage device configured to store a database (e.g., a FAQ database with question and answer pairs). The one or more processors in communication with the storage device configured to acquire a first set of electronic messages from a messaging application and identify a first question from the first set of electronic messages. The one or more processors configured to detect that the first question classifies as a factual question and is semantically equivalent to a second question stored within the database. The one or more processors configured to identify a set of answers that is paired with the second question within the database in response to detection that the first question classifies as a factual question and is semantically equivalent to the second question stored within the database. The one or more processors configured to determine a first user identifier for the first question and rank the set of answers based on the first user identifier. The one or more processors configured to identify a first answer of the set of answers based on the ranking of the set of answers and cause the first answer to be displayed.

One embodiment of the disclosed technology includes acquiring a set of documents and messages, detecting that a second term within the set of documents and messages corresponds with a synonym candidate for a first term within the set of documents and messages at least a first number of times, detecting that the first term within the set of documents and messages corresponds with a synonym candidate for the second term within the set of documents and messages at least a second number of times, adding the first term and the second term to a synonyms database in response to detection that the second term corresponds with a synonym candidate for the first term at least the first number of times and detection that the first term corresponds with a synonym candidate for the second term at least the second number of times, acquiring a search query that includes the first term, detecting that the search query includes the first term, acquiring the second term from the synonyms database in response to detection that the search query includes the first term, adding the second term to the search query, and displaying search results for the updated search query.

The term "document" may refer to an electronic document that is machine-readable and machine-storable. A document may comprise, for example, an electronic file, a database file, an email, or a file with embedded links to other files. A document may include textual information, as well as embedded information such as metadata, images, and hyperlinks.

The disclosed technology may be described in the context of computer-executable instructions, such as software or program modules, being executed by a computer or processor. The computer-executable instructions may comprise portions of computer program code, routines, programs, objects, software components, data structures, or other types of computer-related structures that may be used to perform processes using a computer. In some cases, hardware or combinations of hardware and software may be substituted for software or used in place of software.

Computer program code used for implementing various operations or aspects of the disclosed technology may be developed using one or more programming languages, including an object oriented programming language such as Java or C++, a function programming language such as Scala, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

For purposes of this document, it should be noted that the dimensions of the various features depicted in the Figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for operating a search and knowledge management system, comprising:
acquiring a set of electronic messages that were posted within a messaging channel;
identifying a first question within a first message of the set of electronic messages;
identifying a first answer to the first question within a second message of the set of electronic messages;
detecting that the first answer includes a reference to a first document;
detecting that the first document has been referenced by at least a threshold number of answers that are stored within a database;
identifying a second question and a corresponding second answer within the first document in response to detection that the first document has been referenced by at least the threshold number of answers that are stored within the database;
detecting that the second question is semantically equivalent to a third question stored within the database and that the second answer is semantically equivalent to a third answer corresponding with the third question stored within the database;
increasing a confidence value for the third question within the database in response to detection that the second question is semantically equivalent to the third question and that the second answer is semantically equivalent to the third answer;
detecting that a fourth question posted within the messaging channel is semantically equivalent to the third question and that the confidence value for the third question is greater than a threshold confidence value; and
automatically posting the third answer to the messaging channel in response to detection that the fourth question within the messaging channel is semantically equivalent to the third question and that the confidence value for the third question is greater than the threshold confidence value.

2. The method of claim 1, wherein:
the first question is posted by a first user within the first message of the set of electronic messages and the first answer is posted by a second user within the second message of the set of electronic messages.

3. The method of claim 1, further comprising:
detecting that the first question classifies as a factual question using machine learning techniques; and
the identifying the first answer within the second message is performed in response to detection that that the first question classifies as a factual question.

4. The method of claim 1, further comprising:
detecting that the first question is not semantically equivalent to any question stored within the database; and
storing the first question and the first answer as a question and answer pair within the database.

5. The method of claim 1, wherein:
the detecting that the first document has been referenced by at least the threshold number of answers that are stored within the database includes detecting that the first document is referenced by answers corresponding with different question and answer pairs stored within the database.

6. The method of claim 1, further comprising:
detecting that the first document was last modified within a past period of time; and
the increasing the confidence value for the third question within the database is performed in response to detection that the first document was last modified within the past period of time.

7. The method of claim 1, further comprising:
detecting that the first document was created within a past period of time; and
the increasing the confidence value for the third question within the database is performed in response to detection that the first document was created within the past period of time.

8. The method of claim 1, wherein:
the increasing the confidence value for the third question within the database includes increasing a pair confidence value for the third question and the third answer.

9. The method of claim 1, wherein:
the identifying the first question within the first message includes detecting that the first message ends with a question mark symbol and includes a question term.

10. The method of claim 1, wherein:
the second message is posted immediately after the first message within the messaging channel.

11. The method of claim 1, wherein:
the automatically posting the third answer to the messaging channel includes displaying the third answer within the messaging channel.

12. The method of claim 1, further comprising:
determining a number of sentences comprising the first question; and
determining the increase of the confidence value based on the number of sentences comprising the first question.

13. The method of claim 1, further comprising:
determining a number of characters comprising the first question; and
determining the increase of the confidence value based on the number of characters comprising the first question.

14. A search system, comprising:
a storage device configured to store a database; and
one or more processors in communication with the storage device configured to acquire a set of electronic messages that were posted within a messaging channel and identify a first question within a first message of the set of electronic messages, the one or more processors configured to identify a first answer to the first question within a second message of the set of electronic messages and detect that the first answer includes a reference to a first document, the one or more processors configured to detect that the first document has been referenced by at least a threshold number of answers that are stored within the database and identify a second question and a corresponding second answer within the first document in response to detection that the first document has been referenced by at least the threshold number of answers that are stored within the database, the one or more processors configured to detect that the second question is semantically equivalent to a third question stored within the database and that the second answer is semantically equivalent to a third answer corresponding with the third question stored within the database, the one or more processors configured to set a confidence value for the third question within the database in response to detection that the second question is semantically equivalent to the third question and that the second answer is semantically equivalent to the third answer, the one or more processors configured to detect that a fourth question posted within the messaging channel is semantically equivalent to the third question and that the confidence value for the third question is greater than a threshold confidence value and post the third answer to the messaging channel in response to detection that the fourth question within the messaging channel is semantically equivalent to the third question and that the confidence value for the third question is greater than the threshold confidence value.

15. The search system of claim 14, wherein:
the one or more processors configured to increase the confidence value for the third question within the database in response to detection that the second question is semantically equivalent to the third question and that the second answer is semantically equivalent to the third answer.

16. The search system of claim 14, wherein:
the first question is posted by a first user within the first message of the set of electronic messages and the first answer is posted by a second user within the second message of the set of electronic messages.

17. The search system of claim 14, wherein:
the one or more processors configured to detect that the first question classifies as a factual question using machine learning techniques.

18. The search system of claim 14, wherein:
the one or more processors configured to detect that the first document was last modified within a past period of time and increase the confidence value for the third question in response to detection that the first document was last modified within the past period of time.

19. The search system of claim 14, wherein:
the one or more processors configured to determine a number of sentences comprising the first question and increase of the confidence value based on the number of sentences comprising the first question.

20. One or more storage devices containing processor readable code for programming one or more processors to perform a method for operating a search system, the processor readable code comprising:
processor readable code configured to acquire a set of electronic messages that were posted within a messaging channel;
processor readable code configured to identify a first question within a first message of the set of electronic messages;
processor readable code configured to identify a first answer to the first question within a second message of the set of electronic messages;
processor readable code configured to detect that the first answer includes a reference to a first document;
processor readable code configured to detect that the first document has been referenced by at least a threshold number of answers that are stored within a database;
processor readable code configured to identify a second question and a corresponding second answer within the first document in response to detection that the first document has been referenced by at least the threshold number of answers that are stored within the database;
processor readable code configured to detect that the second question is semantically equivalent to a third question stored within the database and that the second answer is semantically equivalent to a third answer corresponding with the third question stored within the database;
processor readable code configured to increase a confidence value for the third question within the database in response to detection that the second question is semantically equivalent to the third question and that the second answer is semantically equivalent to the third answer;
processor readable code configured to detect that a fourth question posted within the messaging channel is semantically equivalent to the third question and that the confidence value for the third question is greater than a threshold confidence value; and
processor readable code configured to automatically post the third answer to the messaging channel in response to detection that the fourth question within the messaging channel is semantically equivalent to the third question and that the confidence value for the third question is greater than the threshold confidence value.

* * * * *